(12) United States Patent
Friedman

(10) Patent No.: US 10,885,411 B2
(45) Date of Patent: Jan. 5, 2021

(54) MACHINE-READABLE IMAGE ENCODING DATA

(71) Applicant: ALIBABA GROUP HOLDING LIMITED, George Town (KY)

(72) Inventor: Itamar Friedman, Tel Aviv (IL)

(73) Assignee: ALIBABA GROUP HOLDING LIMITED, Grand Cayman (KY)

(*) Notice: Subject to any disclaimer, the term of this patent is extended or adjusted under 35 U.S.C. 154(b) by 165 days.

(21) Appl. No.: 15/540,697

(22) PCT Filed: Oct. 15, 2015

(86) PCT No.: PCT/IL2015/051029
§ 371 (c)(1),
(2) Date: Jun. 29, 2017

(87) PCT Pub. No.: WO2016/108221
PCT Pub. Date: Jul. 7, 2016

(65) Prior Publication Data
US 2017/0357884 A1    Dec. 14, 2017

Related U.S. Application Data

(60) Provisional application No. 62/097,748, filed on Dec. 30, 2014.

(51) Int. Cl.
*G06K 19/06* (2006.01)

(52) U.S. Cl.
CPC . *G06K 19/06037* (2013.01); *G06K 19/06075* (2013.01); *G06K 19/06103* (2013.01); *G06K 19/06131* (2013.01)

(58) Field of Classification Search
CPC ....... G06K 19/06037; G06K 19/06075; G06K 19/06103; G06K 19/06131
See application file for complete search history.

(56) References Cited

U.S. PATENT DOCUMENTS 6,138,913 A    10/2000 Cyr et al.
8,094,870 B2   1/2012 Crookham et al.
(Continued)

FOREIGN PATENT DOCUMENTS

WO    2013/049281 A1    4/2013
WO    2014/002086 A2    1/2014
WO    2015/067725 A1    5/2015

OTHER PUBLICATIONS

Blasinski et al. "Per-Colorant-Channel Color Barcodes for Mobile Applications: An Interference Cancellation Framework." IEEE Transactions on Image Processing, vol. 22, No. 4, Apr. 2013. (Year: 2013).*

(Continued)

*Primary Examiner* — Thien M Le
*Assistant Examiner* — Asifa Habib
(74) *Attorney, Agent, or Firm* — Browdy and Neimark, P.L.L.C.

(57) ABSTRACT

There is provided a non-transitory computer readable storage medium tangibly embodying a machine-readable image having data encoded therein and embedded with a graphic, the machine-readable image adapted to be detected by a reader for decoding said encoded data, including: the graphic associated with an image descriptor calculated based on a chosen area of the graphic, the image descriptor being used in a reading process of said machine-readable image; a plurality of function patterns; and a plurality of dot modules having decoded values corresponding to at least said encoded data, the dot modules being positioned in one or more encoding regions of the machine-readable image relative to the function patterns and the chosen area of the graphic.

20 Claims, 24 Drawing Sheets

(56) References Cited

U.S. PATENT DOCUMENTS

| | | | |
|---|---|---|---|
| 8,144,922 | B2 | 3/2012 | Kawabe et al. |
| 8,978,989 | B2 | 3/2015 | Friedman et al. |
| 10,146,971 | B1* | 12/2018 | Cansizoglu .......... G06K 7/10722 |
| 2006/0097062 | A1 | 5/2006 | Cheong et al. |
| 2008/0002853 | A1* | 1/2008 | Kawabe ............ G06K 19/06037 382/100 |
| 2009/0057420 | A1 | 3/2009 | Onoda et al. |
| 2009/0255992 | A1 | 10/2009 | Shen |
| 2011/0179989 | A1 | 7/2011 | Biscarini et al. |
| 2013/0026241 | A1* | 1/2013 | Sakahashi ........ G06K 19/06037 235/494 |
| 2013/0240621 | A1 | 9/2013 | Everett |
| 2013/0278622 | A1 | 10/2013 | Sun et al. |
| 2013/0301870 | A1 | 11/2013 | Mow et al. |
| 2014/0061316 | A1 | 3/2014 | Narayanaswami et al. |
| 2014/0144996 | A1* | 5/2014 | Friedman ......... G06K 19/06037 235/494 |
| 2014/0263642 | A1 | 9/2014 | Mesh-Iliescu et al. |
| 2015/0324678 | A1* | 11/2015 | Simske ................ G06K 7/1473 235/375 |

OTHER PUBLICATIONS

Garateguy et al. "QR Images: Optimized Image Embedding in QR codes." IEEE Transactions on Image Processing, Jul. 2014. (Year: 2014).*

Dabrowski, A., Krombholz, K., Ullrich, J., & Weippl, E. R. (Nov. 2014). QR inception: Barcode-in-barcode attacks. In Proceedings of the 4th ACM Workshop on Security and Privacy in Smartphones & Mobile Devices (pp. 3-10). ACM.

* cited by examiner

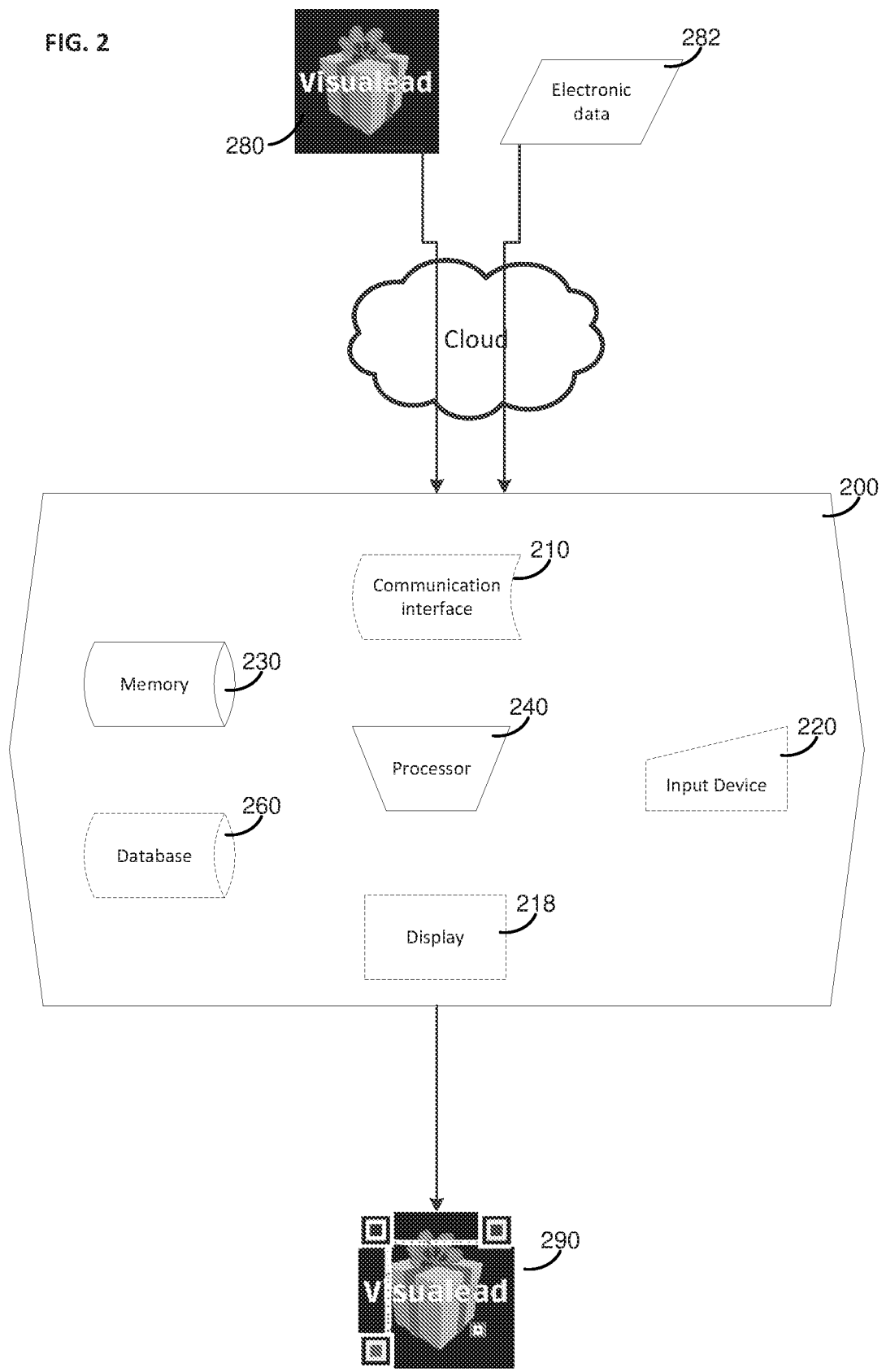

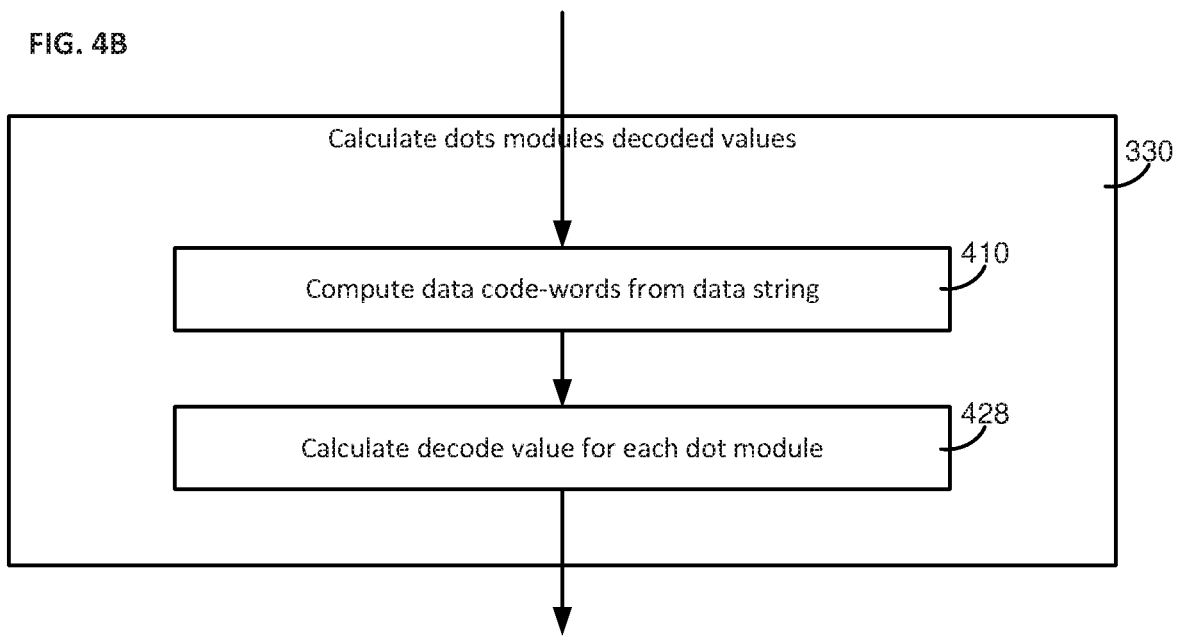

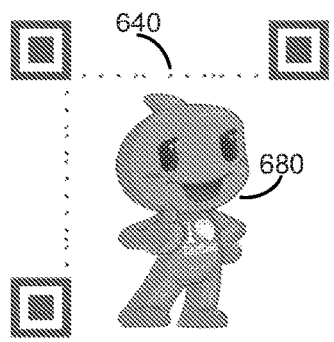
Fig. 6A
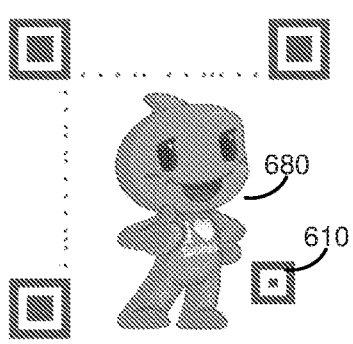
Fig. 6B
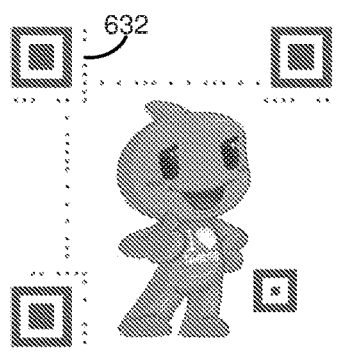
Fig. 6C
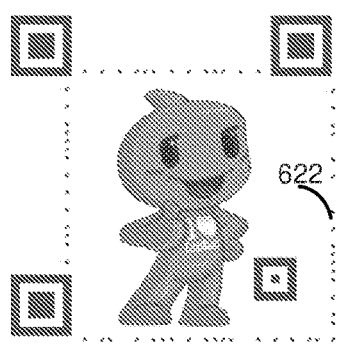
Fig. 6D
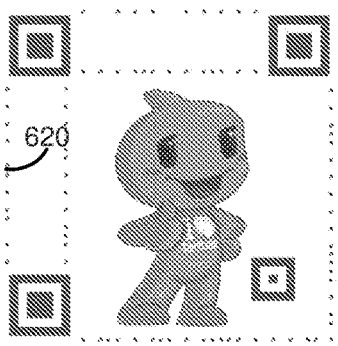
Fig. 6E
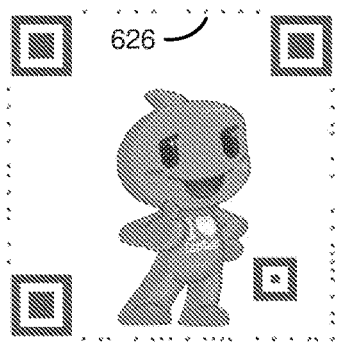
Fig. 6F
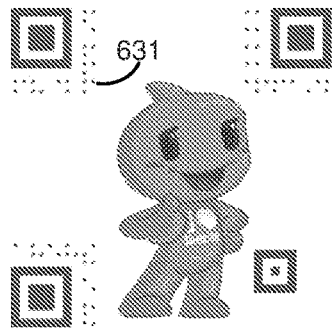
Fig. 6G
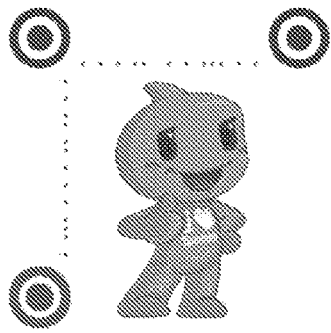
Fig. 6H
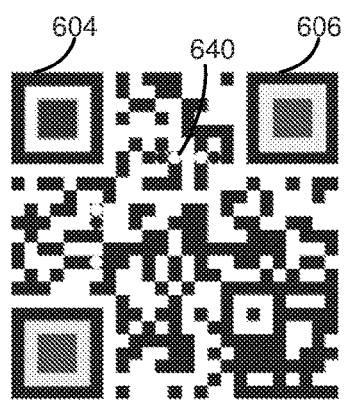
Fig. 6K
Fig. 6I
Fig. 6J

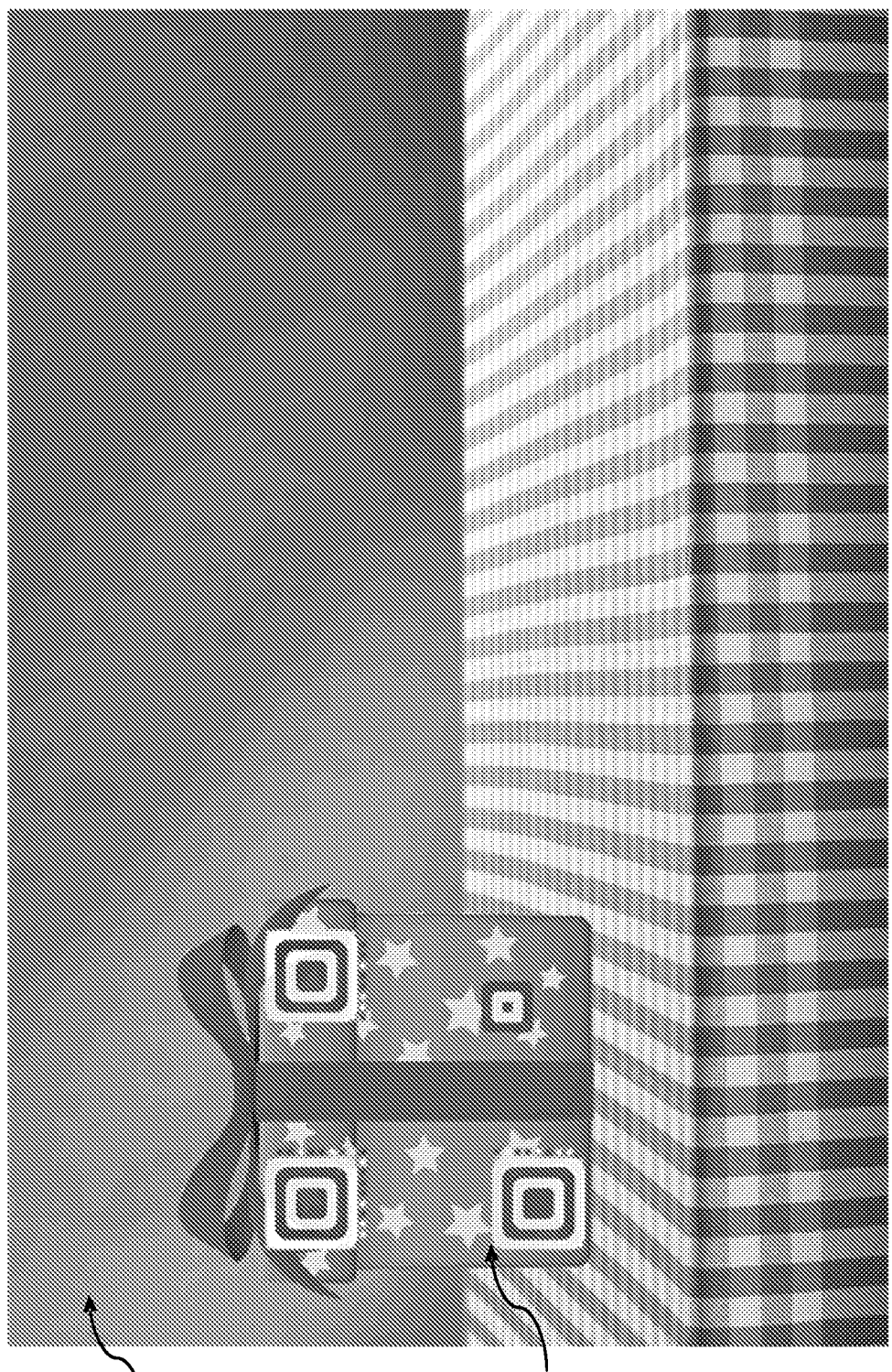

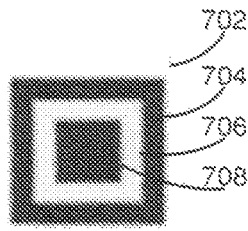
FIG. 7A
FIG. 7B
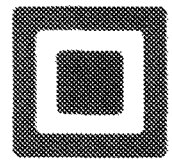
FIG. 7C
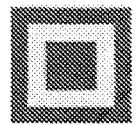
FIG. 7D
FIG. 7D1
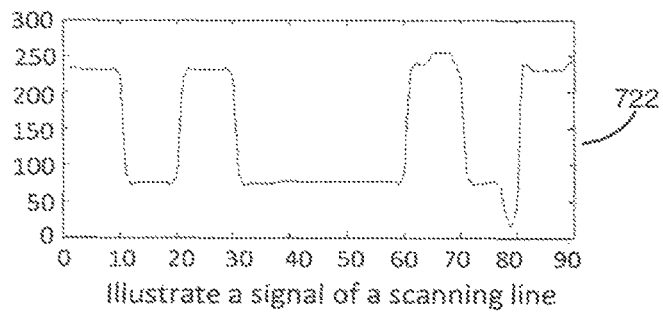
Illustrate a signal of a scanning line
FIG. 7D2
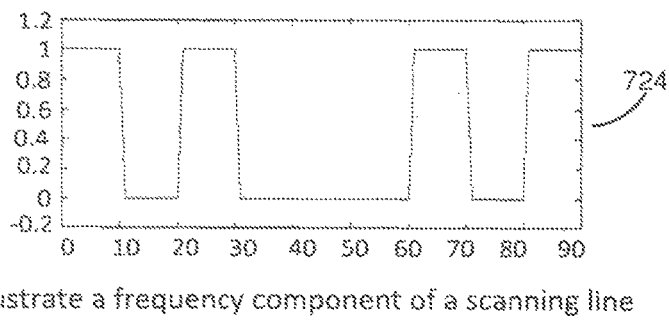
Illustrate a frequency component of a scanning line
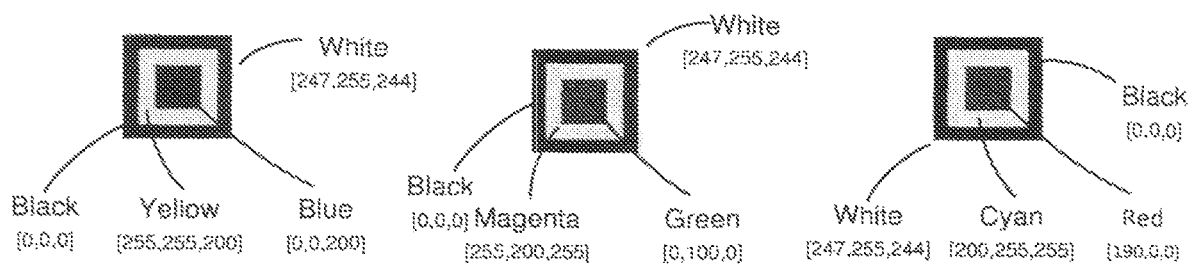
FIG. 7E1          FIG. 7E2          FIG. 7E3

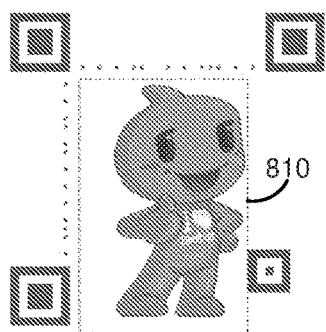
FIG. 8A1
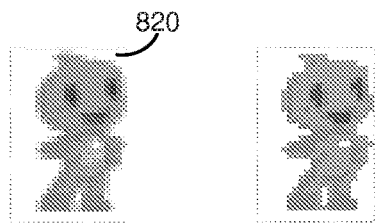
FIG. 8A2  FIG. 8A3  FIG. 8A4
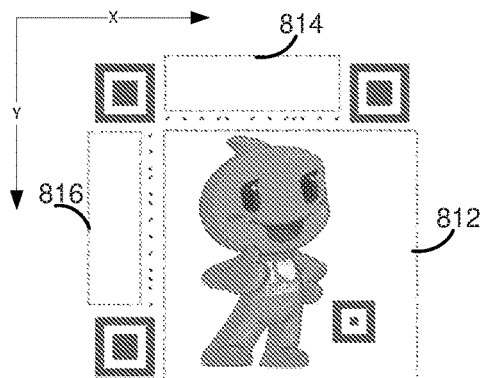
FIG. 8B1
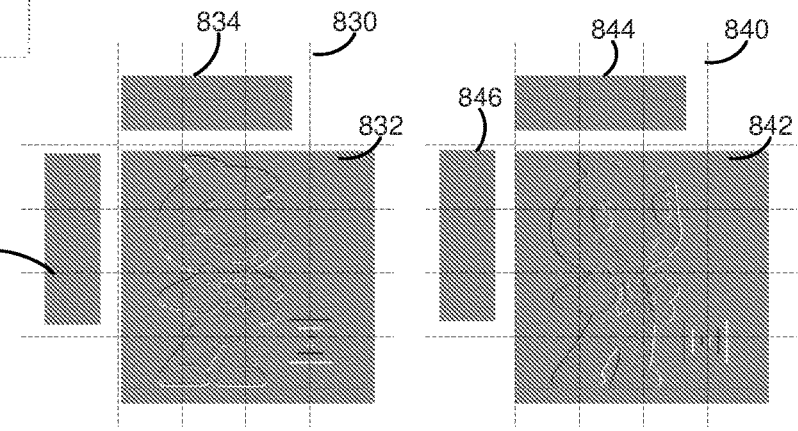
Gradient Y   Gradient X
FIG. 8B2
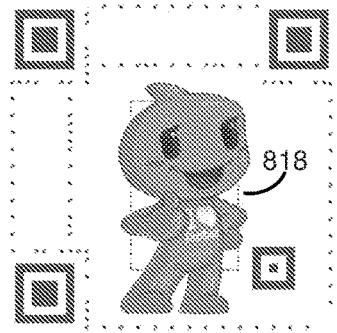
FIG. 8C
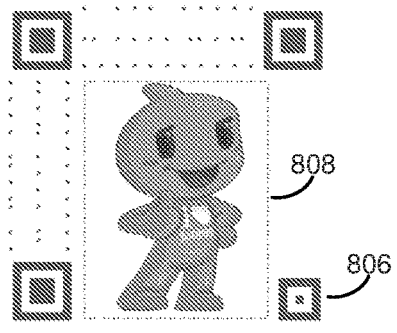
FIG. 8D

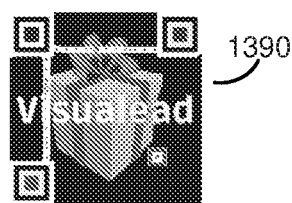
FIG. 13
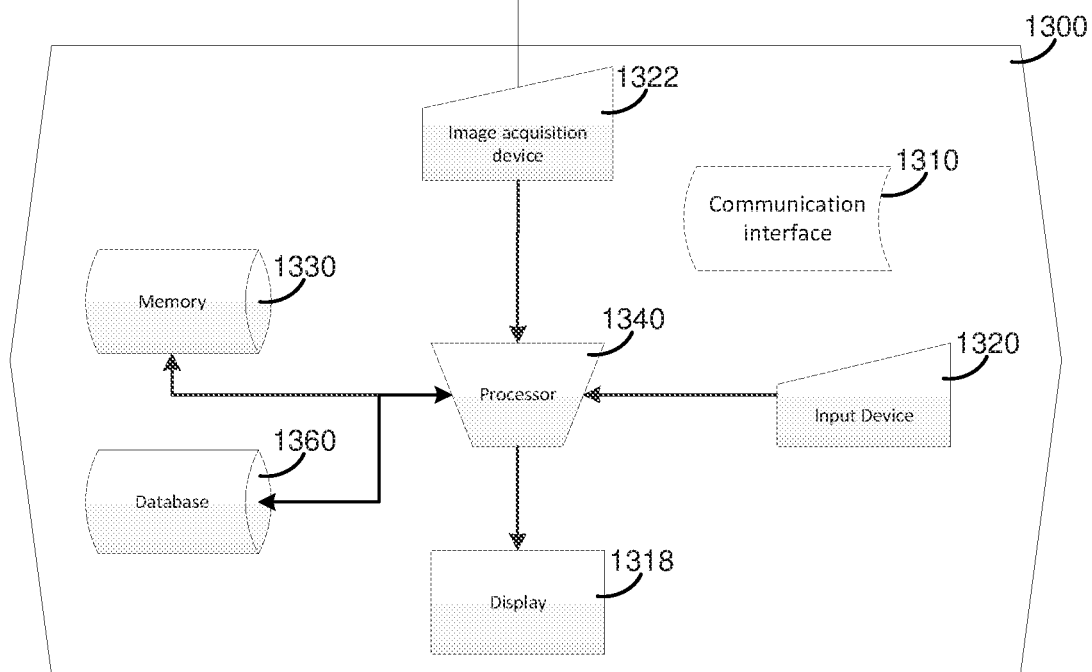

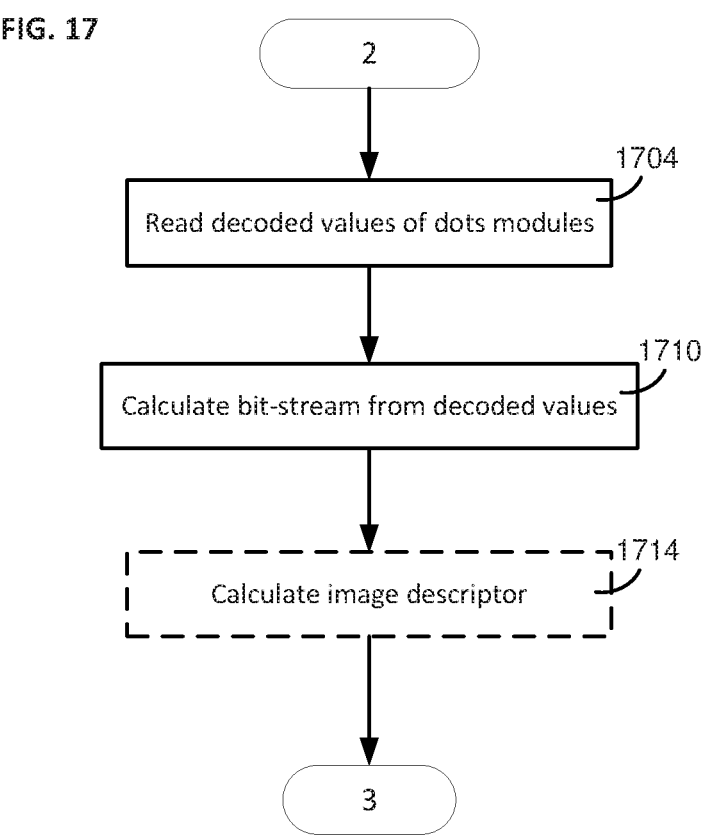

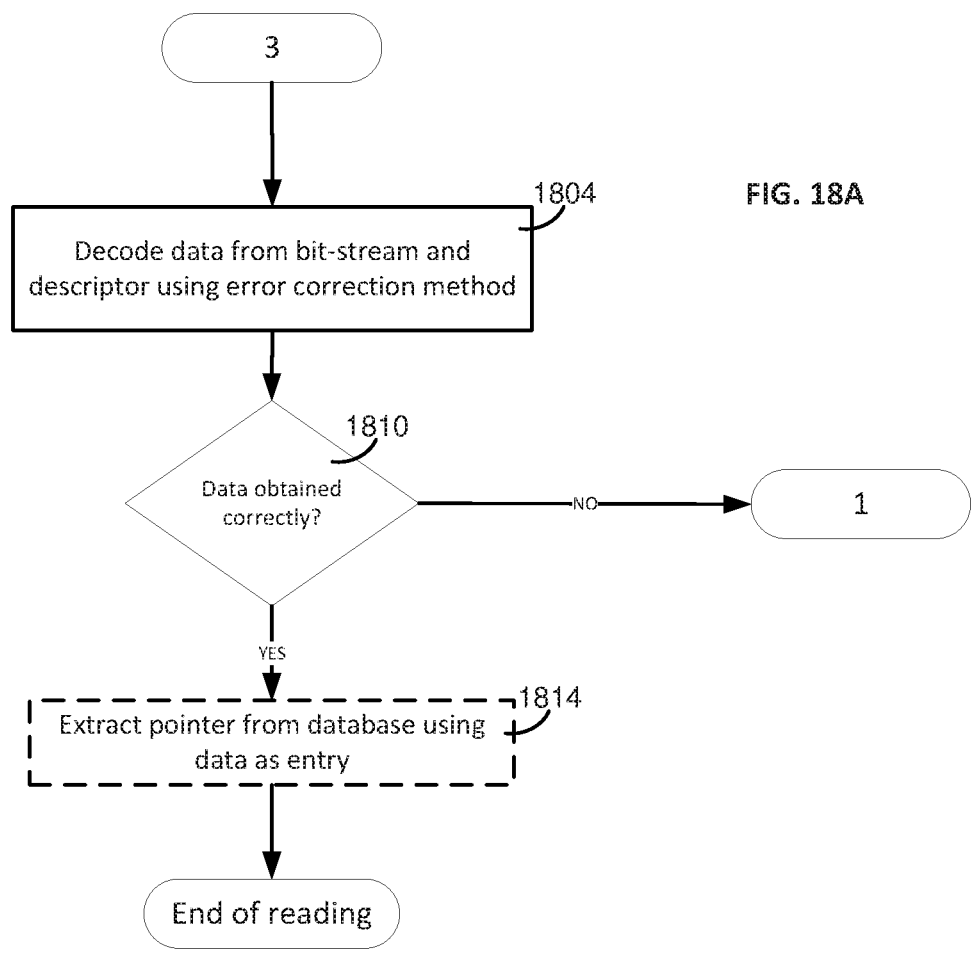

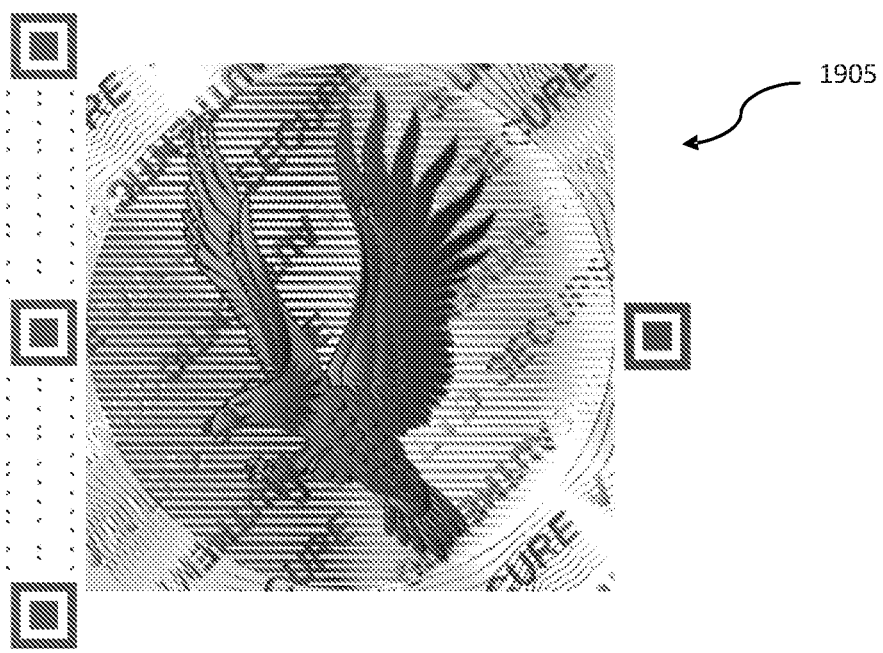
1905
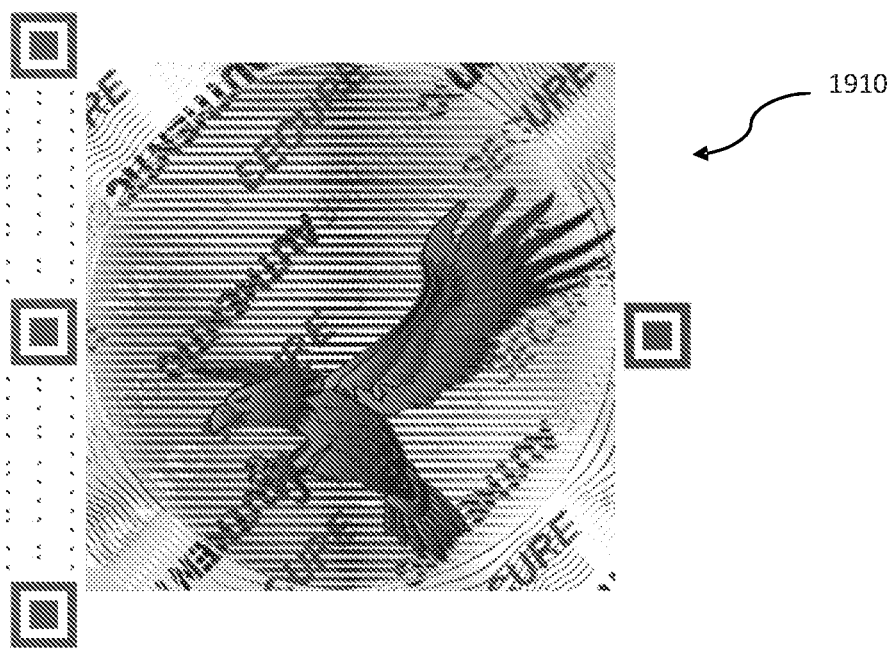
1910
FIG. 19

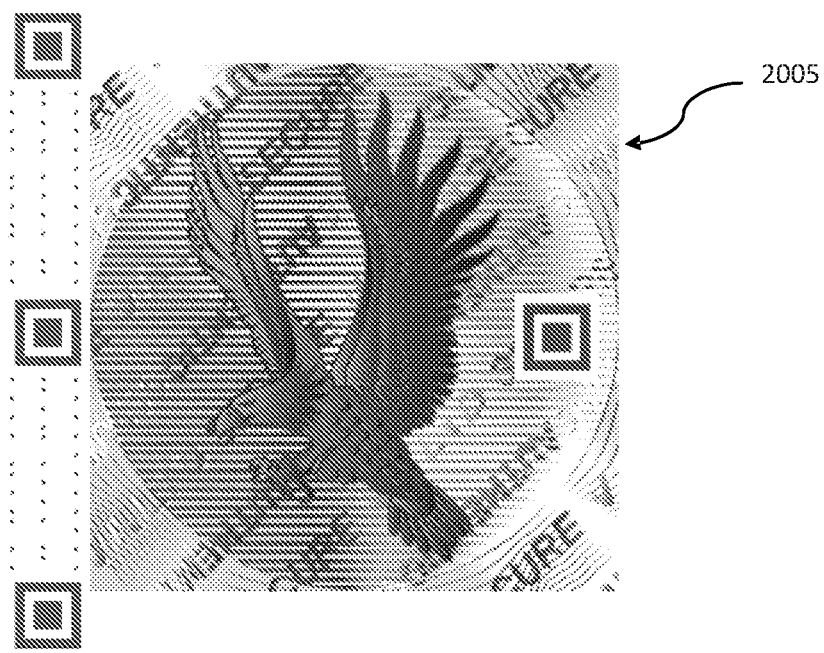
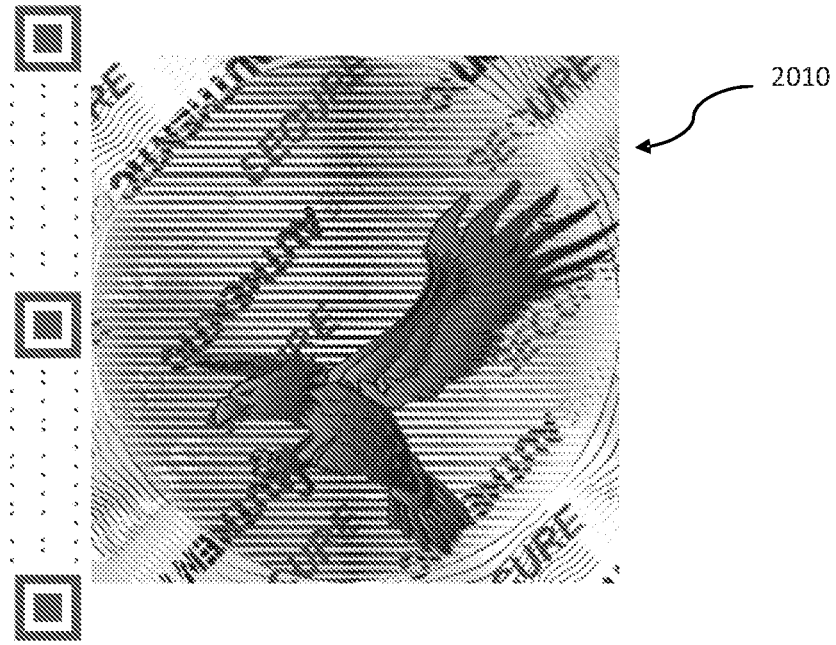
FIG. 20

MACHINE-READABLE IMAGE ENCODING DATA

TECHNOLOGICAL FIELD

The presently disclosed subject matter relates to machine-readable images and codes, and more particularly, relates to machine-readable image encoding data.

BACKGROUND

One dimensional barcodes and two dimensional codes have been developed as machine readable image representations of information. Many two dimensional codes represent data by means of dots distribution in a matrix grid and therefore sometimes are referred to as matrix code.

One common matrix code is the QR (Quick Response) Code. A QR Code consists of an array of black cells (square dark dots) and white cells (square light dots) arranged in a square pattern on a white background. Other embodiments exist, e.g. a negative option is valid also, where the background is black. In one embodiment of the QR Code, the processor locates three distinctive squares, known as finder patterns, at the corners of the matrix code, and normalizes image size, orientation, and angle of viewing. Other functional patterns, such as the alignment and timing patterns, enhance this process.

Another common matrix code is the EZcode. A typical EZCode consists of an 11×11 array of cells (large dark or light pixels/dots) arranged in a grid. In the most common embodiment, the data that is stored in the EZcode is mainly used as a key to a central database owned by Scanbuy.

Two dimensional codes have become common in consumer marketing, advertising and packaging because most Smartphones having a camera can be used to scan a matrix code. It can provide quick and rather effortless access to the brand's online materials or other designated call to action. Matrix codes have additionally found a wide range of applications, including entertainment and transport ticketing.

The abstract appearance of a typical matrix code, such as a QR Code, means that the proprietor of a QR Code cannot readily be identified by visual inspection of the code. This is a disadvantage in marketing, and it would be desirable to have the proprietor of a matrix code readily identifiable by a casual observer. The use of QR Codes in marketing has given rise to methods in which a trademark or company logo of the proprietor is somehow associated with the QR Code as part of the QR Code.

U.S. Pat. No. 8,144,922 to Kawabe et al discloses a method in which a two-dimensional code that represents information by means of a cell dot distribution pattern formed by having a plurality of colored cells and a logo mark, are superimposed.

US Patent Publication 2009/0255992 to Shen discloses a system for synthesizing a two dimensional code and a logo. At least a part of the logo is overlapped with the two dimensional code. If the two dimensional code has a code error rate larger than an error correction rate, the size of the logo and/or the location of the logo is adjusted with respect to the two dimensional code.

US Patent Publication 2009/0057420 to Onoda et al discloses two-dimensional code merged with an image. Base cells and data cells in the two-dimensional code are arranged in a matrix, and either the base cells or the data cells are clear. The clear two-dimensional code can be read only when a color shown on the clear cells consisting of either the base cells or the data cells and a color shown or non-clear cells consisting of either the base cells or the data cells have a contrast which can be read by a code decoder apparatus.

US Patent Publication 2014/0144996 to Friedman et al discloses a method of generating a readable matrix code image encoding a message based on an input image and a readable matrix coding specification: calculating function areas readable to comply with a function patterns specification; determining an extent of free cells and derived cells according to a code word specification; calculating decode input values for free cells such that the appearance of the free cells compared to respective areas of the input image complies with a visual perceptual similarity criterion and with the code word specification; and calculating decode input values for derived cells based on the free cells decode input values and in compliance with the code word specification. Further fusing the input image and each of the calculated functions areas, the free cells, and the derived cells forms a readable matrix code.

U.S. Pat. No. 8,094,870 to Crookham et al discloses a graphically based encoded image, symbol or icon that can serve as a link from physical material or visual displays to electronic data to retrieve specific or general information. A numeric value may be encoded to form an encoded image by providing a primary image, such as a logo, and by positioning one or more secondary images or shapes in reference to the primary image, wherein the position of the secondary image relative to the primary image corresponds or relates to the numeric value.

SUMMARY OF THE INVENTION

According to certain aspects of the presently disclosed subject matter, there is provided a computerized method of generating a machine-readable image encoding data, the machine-readable image embedded with a graphic, the method comprising: positioning a plurality of function patterns; calculating an image descriptor based on a chosen area of the graphic, the image descriptor being used in a reading process of the machine-readable image; calculating decoded values for dot modules based on at least the encoded data, and positioning the dot modules in one or more encoding regions relative to the function patterns and the chosen area of the graphic.

According to other aspects of the presently disclosed subject matter, there is provided a computerized method of generating a machine-readable image encoding data, the machine-readable image embedded with a graphic, the method comprising: positioning a plurality of function patterns; calculating decoded values for dot modules based on the encoded data, and positioning the dot modules in one or more encoding regions selected to be disjoint from a chosen area of the graphic.

According to other aspects of the presently disclosed subject matter, there is provided a computerized method of generating a machine-readable symbol mask having data encoded therein and embedded with a graphic, the symbol mask being an image mask used to be superimposed over a non-functional graphic to generate a machine-readable image, the method comprising: positioning a plurality of function patterns; calculating an image descriptor based on a chosen area of the graphic, the image descriptor being used in a reading process of the machine-readable image; calculating decoded values for dot modules based on the encoded data; positioning the dot modules in one or more encoding regions relative to the function patterns and the chosen area of the graphic; and applying transparency values to the symbol mask to be used in the superimposing over the non-functional graphic such that the machine-readable image is readable.

According to other aspects of the presently disclosed subject matter, there is provided a computerized method of generating a machine-readable image having data encoded therein, the machine-readable image to be embedded with a hologram that presents different appearances when viewing from different viewpoints, the method comprising: positioning a plurality of function patterns and allocating a position for the hologram relative to position of the function patterns; calculating an image descriptor based on a chosen area of a first appearance of the hologram from a first viewpoint, the image descriptor being used in a reading process of the machine-readable image; calculating decoded values for dot modules based on at least the encoded data, and positioning the dot modules in one or more encoding regions relative to the position of the function patterns and the hologram, giving rise to the machine-readable image including the function patterns and the dot modules to be embedded with the hologram.

According to other aspects of the presently disclosed subject matter, there is provided a computerized system for generating a machine-readable image encoding data, the machine-readable image embedded with a graphic, the system comprising a processing unit configured to: position a plurality of function patterns; calculate an image descriptor based on a chosen area of the graphic, the image descriptor being used in a reading process of the machine-readable image; calculate decoded values for dot modules based on at least the encoded data, and position the dot modules in one or more encoding regions relative to the function patterns and the chosen area of the graphic.

According to other aspects of the presently disclosed subject matter, there is provided a computerized system for generating a machine-readable image encoding data, the machine-readable image embedded with a graphic, the system comprising a processing unit configured to: position a plurality of function patterns; calculate decoded values for dot modules based on at least the encoded data, and position the dot modules in one or more encoding regions selected to be disjoint from a chosen area of the graphic.

According to other aspects of the presently disclosed subject matter, there is provided a computerized system for generating a machine-readable symbol mask having data encoded therein and embedded with a graphic, the symbol mask being an image mask used to be superimposed over a non-functional graphic to generate a machine-readable image, the system comprising a processing unit configured to: position a plurality of function patterns; calculate an image descriptor based on a chosen area of the graphic, the image descriptor being used in a reading process of the machine-readable image; calculate decoded values for dot modules based on at least the encoded data, position the dot modules in one or more encoding regions relative to the function patterns and the chosen area of the graphic; and apply transparency values to the symbol mask to be used in the superimposing over the non-functional graphic such that the machine-readable image is readable.

According to other aspects of the presently disclosed subject matter, there is provided a computerized system for generating a machine-readable image having data encoded therein, the machine-readable image to be embedded with a hologram that presents different appearances when viewing from different viewpoints, the system comprising a processing unit configured to: position a plurality of function patterns and allocating a position for the hologram relative to position of the function patterns; calculate an image descriptor based on a chosen area of a first appearance of the hologram from a first viewpoint, the image descriptor being used in a reading process of the machine-readable image; calculate decoded values for dot modules based on the encoded data, and position the dot modules in one or more encoding regions relative to the position of function patterns and the hologram, giving rise to the machine-readable image including the function patterns and the dot modules to be embedded with the hologram.

According to further aspects of the presently disclosed subject matter, and optionally, in combination with any of the above aspects, the positioning can further include fusing the graphic and the decoded values of the dot modules to form the machine-readable image. The calculating decoded values for dot modules can further include: computing data code-words from the encoded data; and calculating decoded values for the dot modules based on the data code-words. The calculating decoded values for dot modules can further include: computing one or more error correction code-words derived from the data code-words, the error correction code-words including error correction information which is used to correct errors which occurred in a reading process of the encoded data; combining the data code-words with corresponding error correction code-words, giving rise to full code words; and calculating decoded values for the dot modules based on the full code-words. The calculating decoded values for dot modules can further include: computing image descriptor code-words from the image descriptor; wherein the calculating one or more error correction code-words further includes calculating error correction code-words for the image descriptor code-words including error correction information which is used to correct errors which occurred in a reading process of the image descriptor. The calculating decoded values for dot modules can further include: computing format code-words; and calculating decoded values for the dot modules based on the format code-words.

According to further aspects of the presently disclosed subject matter, and optionally, in combination with any of the above aspects, the dot modules can include data dot modules and error correction dot modules, and the calculating decoded values for dot modules can include: calculating decoded values for the data dot modules based on the encoded data, and calculating decoded values for the error correction dot modules based on error correction information of the encoded data and the image descriptor. The graphic embedded in the machine-readable image can be a two-dimensional code such that the two-dimensional code and the machine-readable image both can be detectable by a reader and decoded separately, wherein the machine-readable image and the two-dimensional code share common function patterns, the method can comprise: positioning the common function patterns; calculating an image descriptor based on a chosen area of the two-dimensional code; calculating decoded values for dot modules based on said encoded data; and positioning the dot modules in one or more encoding regions relative to the function patterns and the chosen area of the two-dimensional code.

According to other aspects of the presently disclosed subject matter, there is provided a non-transitory computer readable storage medium tangibly embodying a machine-readable image having data encoded therein and embedded with a graphic, the machine-readable image adapted to be detected by a reader for decoding the encoded data, the machine-readable image including: the graphic associated with an image descriptor calculated based on a chosen area of the graphic, the image descriptor being used in a reading process of the machine-readable image; a plurality of function patterns; and a plurality of dot modules having decoded values corresponding to at least the encoded data, the dot modules being positioned in one or more encoding regions of the machine-readable image relative to the function patterns and the chosen area of the graphic.

According to other aspects of the presently disclosed subject matter, there is provided a non-transitory computer readable storage medium tangibly embodying a machine-readable image having data encoded therein and embedded with a graphic, the machine-readable image adapted to be detected by a reader for decoding the encoded data, including: the graphic; a plurality of function patterns; and a plurality of dot modules having decoded values corresponding to the encoded data, the dot modules being positioned in one or more encoding regions of the machine-readable image selected to be disjointed from a chosen area of the graphic.

According to other aspects of the presently disclosed subject matter, there is provided a non-transitory computer readable storage medium tangibly embodying a machine-readable symbol mask having data encoded therein and embedded with a graphic, the symbol mask being an image mask used to be superimposed over a non-functional graphic to generate a machine-readable image, the symbol mask including: the graphic associated with an image descriptor calculated based on a chosen area of the graphic, the image descriptor being used in a reading process of the machine-readable image; a plurality of function patterns; and a plurality of dot modules having decoded values corresponding to at least the encoded data, the dot modules being positioned in one or more encoding regions of the machine-readable symbol mask relative to the function patterns and the chosen area of the graphic; wherein the symbol mask includes transparency values to be used when superimposed on the non-functional graphic such that the machine-readable image is readable.

According to other aspects of the presently disclosed subject matter, there is provided a printed medium having a machine-readable image printed thereon, the machine-readable image having data encoded therein and embedded with a graphic, the machine-readable image adapted to be detected by a reader for decoding the encoded data, the machine-readable image including: the graphic associated with an image descriptor calculated based on a chosen area of the graphic, the image descriptor being used in a reading process of said machine-readable image; a plurality of function patterns; and a plurality of dot modules having decoded values corresponding to at least the encoded data, the dot modules being positioned in one or more encoding regions of the machine-readable image relative to the function patterns and the chosen area of the graphic.

According to other aspects of the presently disclosed subject matter, there is provided a printed medium having a machine-readable image printed thereon, the machine-readable image having data encoded therein and embedded with a graphic, the machine-readable image adapted to be detected by a reader for decoding the encoded data, the machine-readable image including: the graphic; a plurality of function patterns; and a plurality of dot modules having decoded values corresponding to at least the encoded data, the dot modules being positioned in one or more encoding regions of the machine-readable image which are selected to be disjoint from a chosen area of the graphic.

According to other aspects of the presently disclosed subject matter, there is provided a printed medium having a machine-readable image printed thereon, the machine-readable image having data encoded therein and embedded with a graphic, the machine-readable image adapted to be detected by a reader for decoding the encoded data, the machine-readable image including: the graphic associated with an image descriptor calculated based on a chosen area of the graphic, the image descriptor being used in a reading process of said machine-readable image; a plurality of function patterns; and a plurality of dot modules including i) data dot modules having decoded values corresponding to the encoded data, and ii) error correction dot modules having decoded values corresponding to error correction information of the encoded data and the image descriptor, wherein the plurality of dot modules are positioned in one or more encoding regions of the machine-readable image relative to the function patterns and the chosen area of the graphic.

According to other aspects of the presently disclosed subject matter, there is provided a printed medium having a machine-readable image printed thereon, the machine-readable image having data encoded therein, the machine-readable image being embedded with a two-dimensional code such that the two-dimensional code and the machine-readable image both being detectable by a reader and decoded separately, wherein the machine-readable image and the two-dimensional code share common function patterns, the machine-readable image including: the two-dimensional code associated with an image descriptor calculated based on a chosen area of the two-dimensional code, the image descriptor being used in a reading process of the machine-readable image; the common function patterns; and a plurality of dot modules having decoded values corresponding to at least the encoded data, the dot modules being positioned in one or more encoding regions of the machine-readable image relative to the function patterns and the chosen area of the two-dimensional code.

According to other aspects of the presently disclosed subject matter, there is provided a computerized method of decoding a machine-readable image encoded with data and embedded with a graphic, the method comprising: detecting a plurality of function patterns positioned in the machine-readable image; obtaining position information of one or more encoding regions of the machine-readable image containing dot modules; obtaining decoded values of the dot modules from the encoding regions based on the position information; calculating an image descriptor from a chosen area of the graphic; and decoding the encoded data based on the decoded values of dot modules.

According to other aspects of the presently disclosed subject matter, there is provided a computerized system for decoding a machine-readable image encoded with data and embedded with a graphic, the system comprising a processing unit configured to: detect a plurality of function patterns positioned in the machine-readable image; obtain position information of one or more encoding regions of the machine-readable image containing dot modules; obtain decoded values of the dot modules from the encoding regions based on the position information; calculate an image descriptor from a chosen area of the graphic; and decode the encoded data based on the decoded values of dot modules.

According to further aspects of the presently disclosed subject matter, and optionally, in combination with any of the appropriate above aspects, the function patterns can be indicative of characteristics of the machine-readable image including position, size and inclination. The function patterns can include finder pattern, separator pattern, timing pattern, and alignment pattern. The machine-readable image can include a reference area for calibrating color and shade values in a reading process of the machine-readable image. The reference area can include at least three color and shade values that are used to estimate original color and shade values of remaining areas of the machine-readable image. The reference area can overlap a region of a finder pattern. The reference area can include CMYK colors. The reference area can include RGB colors. The data can be selected from a group including: a URL, and an index to a database. The chosen area can be indicated by version information included in format information of the dot modules. The chosen area can be determined in accordance with relative positions of the function patterns. The chosen area can be determined in accordance with a relative position of an alignment pattern with respect to positions of finder patterns. The chosen area can be determined in accordance with a position indicated by coordinate information included in format information of the dot modules. Different chosen areas of the graphic can result in respectively different machine-readable images. The dot modules can include data dot modules and error correction dot modules. The error correction dot modules can be used to correct errors occurred in a reading process of the encoded data, the decoded values of the error correction dot modules being derived from the encoded data. The error correction dot modules can be used to correct errors which occurred in a reading process of the image descriptor, the decoded values of the error correction dot modules being derived from the image descriptor. The error correction dot modules can be used to correct errors which occurred in a reading process of the encoded data and the image descriptor, the decoded values of the error correction dot modules being derived from the encoded data and the image descriptor. The dot modules can further include format dot modules having decoded values indicating format information including: error correction level, error correction mode, version information, and image descriptor method used to calculate the image descriptor.

According to further aspects of the presently disclosed subject matter, and optionally, in combination with any of the appropriate above aspects, the encoding regions are selected to be disjoint from the chosen area. The encoding regions can be determined such that the encoding regions do not have a mutual area with the graphic. The encoding regions can be determined such that the encoding regions have a mutual area with the graphic, the mutual area being chosen based on saliency values computed for the graphic. The mutual area can have low saliency values with respect to a computed saliency map computed for the graphic. A machine-readable image symbol can be a part of the machine-readable image, and include: (i) the function patterns, (ii) the dot modules, and (iii) the chosen area. Structure of the machine-readable image symbol can be determined according to the relative position of at least one pattern with respect to at least one other pattern. The function patterns can include three finder patterns and one alignment pattern, and the structure is determined according to the relative position of the alignment pattern with respect to the three finder patterns. The three finder patterns can be aligned in one line. Alternatively, the three finder patterns can be positioned in three corners of the machine-readable image symbol. A symbol mask can be generated based on the machine-readable image symbol. The symbol mask is an image mask used to mask the machine-readable image symbol and to be superimposed over a non-functional graphic to generate a second machine-readable image. The superimposing can be performed by using a linear combination of color values of at least one color channel of the non-functional graphic and the symbol mask according to alpha values of one alpha channel of the symbol mask. The alpha values include transparency values. The symbol mask can be superimposed on a plurality of non-functional graphics giving rise to a respective second machine-readable image for each non-functional graphic. The alpha values of the symbol mask can include low transparency values when superimposed on the plurality of non-functional graphics such that the second machine-readable image is readable. The symbol mask can be superimposed over physical media and digital media. The digital media can include an image, an animation, a video, a webpage, and a document.

According to further aspects of the presently disclosed subject matter, and optionally, in combination with any of the appropriate above aspects, the graphic can include part of a two-dimensional code such that the two-dimensional code and the machine-readable image can both be detected by a reader and decoded separately. The machine-readable image and the two-dimensional code can share common patterns. The dot modules of the machine-readable image can cover one or more regions of the two-dimensional code that are not essential in a process of reading the two-dimensional code, such that an error rate of reading the two-dimensional code is not increased. The one or more regions of the two-dimensional code are selected from the following regions: timing pattern, remainder bits, remainder code-words, parts of the quiet-zone and dot modules representing format information. The dot modules of the machine-readable image can cover one or more regions of the two-dimensional code that are essential in the process of reading the two-dimensional code, and the two-dimensional code can be decoded by the reader utilizing error correction mechanism included in the two-dimensional code. The graphic can be selected from a group comprising: a photo, a logo, a mark, an icon, an animation or hologram. The graphic can be a hologram that presents different appearances when viewing from different viewpoints, and the image descriptor can be calculated based on a chosen area of a first appearance of the hologram from a first viewpoint. The appearances other than the first appearance cannot enable a reader to decode the encoded data while performing a reading process of the machine-readable image. The first viewpoint can be different from a perpendicular viewpoint such that a photo-copy of the machine-readable image performed from the perpendicular viewpoint is not readable by a reader. The machine-readable image can be embedded on a product and is used to indicate whether the product is genuine. The graphic can be an animation including a plurality of frames, and a machine-readable image can be generated respectively for each frame. The decoded values can be selected from a set that includes a plurality of values. The set can include more than two values each representing a different color, and wherein a reference area included in the machine-readable image can be used to calibrate each the different color in a reading process of the machine-readable image. The position information of the encoding regions can be indicated by version information included in format information of the dot modules. The function patterns can be positioned relative to the graphic. The function patterns can be positioned in predetermined positions and the graphic is positioned relative to the function patterns. In the case that the graphic is a hologram, the chosen area can include a function pattern. The machine-readable image can be a two-dimensional code.

According to further aspects of the presently disclosed subject matter, and optionally, in combination with any of the appropriate above aspects related to decoding a machine-readable image, decoding the encoded data can be performed by using error correction information included in the dot modules. The error correction information can be used to correct errors which occurred when reading the data and the image descriptor. The calculated image descriptor can be compared with a plurality of image descriptors which are stored in a database during a generation process of the machine-readable image. A pointer can be extracted from a database in case of a match in the comparison. The machine-readable image can be combined with a two-dimensional code, and the machine-readable image and the two-dimensional code can be both decoded. Two pointers can be extracted respectively for the machine-readable image and the two-dimensional code from the database. The detecting can further include aligning the machine-readable image by calculating an estimated position of an alignment pattern based on the position of finder patterns and refining the position of finder patterns by the estimated position. The color and shade values of the machine-readable image can be calibrated based on a reference area. The graphic can be a hologram that presents different appearances when viewing from different viewpoints, and the calculating an image descriptor can be based on a chosen area of a first appearance of the hologram from a first viewpoint. In case the graphic is a hologram, the match in the comparison can indicate whether a product embedded with the machine-readable image is genuine.

According to further aspects of the presently disclosed subject matter, various reading processes of the machine-readable image and corresponding systems thereof can be constructed to read respectively any machine-readable images as described above or appropriate combinations thereof, and correspond to respective generation processes of the machine-readable images.

According to further aspects of the presently disclosed subject matter, there is provided a computer program product comprising a computer-readable non-transient memory storing instructions for performing the method steps of any method as described above.

Among advantages of certain embodiments of the presently disclosed subject matter is that the machine-readable image presents a combination of data representation in dots and data representation by an image (such as an image including a logo, icon or a face, etc), thereby combining the advantage of representing data by both a human recognizable object (included in the image) and a highly machine-readable object (i.e., the dots). Another advantage of the above is that both the image area and the dots area are exploited to decode data resulting in high capacity visual representation while enabling a human recognizable object to take part in the machine-readable image.

A further advantage is the ability to correct the data represented by the image (i.e., the image descriptor) using an error correction mechanism, wherein the error correction data is represented by dots, which enables an easier and accurate extraction of the image descriptor in a reading process, thereby enable accurate decoding of the data encoded in the machine-readable image. It also ensures the image included in the machine-readable image being intact thus enhance the safety of the encoded data.

BRIEF DESCRIPTION OF THE DRAWINGS

In order to understand the disclosure and to see how it may be carried out in practice, embodiments will now be described, by way of non-limiting example only, with reference to the accompanying drawings, in which:

FIG. 2 shows a possible system for executing the process of generating a machine-readable image, in accordance with one embodiment of this aspect of the disclosed subject matter; FIG. 4B shows another possible flow chart for calculating the dots modules decoded value to be used in the process of generating a machine-readable image, in accordance with one embodiment of this aspect of the disclosed subject matter; FIGS. 6A-6K show a few examples of a machine-readable image as the process of FIG. 3A is being executed, in accordance with a few embodiments of this aspect of the disclosed subject matter; and FIG. 6L illustrates an example of a machine-readable image and a machine-readable image symbol; and FIGS. 7A-7D show illustrations of various finder patterns that can be used in the process of generating a machine-readable image, in accordance with a few embodiments of this aspect of the disclosed subject matter; and FIG. 7D1-2 shows illustrations of the line scanning process executed on the finder pattern illustrated in FIG. 7D, in accordance with a few embodiments of this aspect of the disclosed subject matter; and FIG. 7E1-3 shows more illustrations of various finder patterns that can be used in the process of generating a machine-readable image, in accordance with a few embodiments of this aspect of the disclosed subject matter; and FIGS. 8A1-8A4, 8B1, 8B2, 8C and 8D show illustrations of possible areas from which the image descriptor can be computed image as the process of FIG. 3 is being executed, in accordance with one embodiment of this aspect of the disclosed subject matter.

FIG. 13 shows a block diagram illustration of computer, or a system of computers used to read a machine-readable image, according to examples of the presently disclosed subject matter; and FIG. 14, FIG. 17, FIG. 18A and FIG. 18B show flowchart illustrations of methods of reading a machine-readable image, according to examples of the presently disclosed subject matter; FIGS. 19 and 20 show illustrations of two viewpoints of a machine-readable image which includes a hologram, according to examples of the presently disclosed subject matter.

DETAILED DESCRIPTION OF PREFERRED EMBODIMENTS

Figure 1:
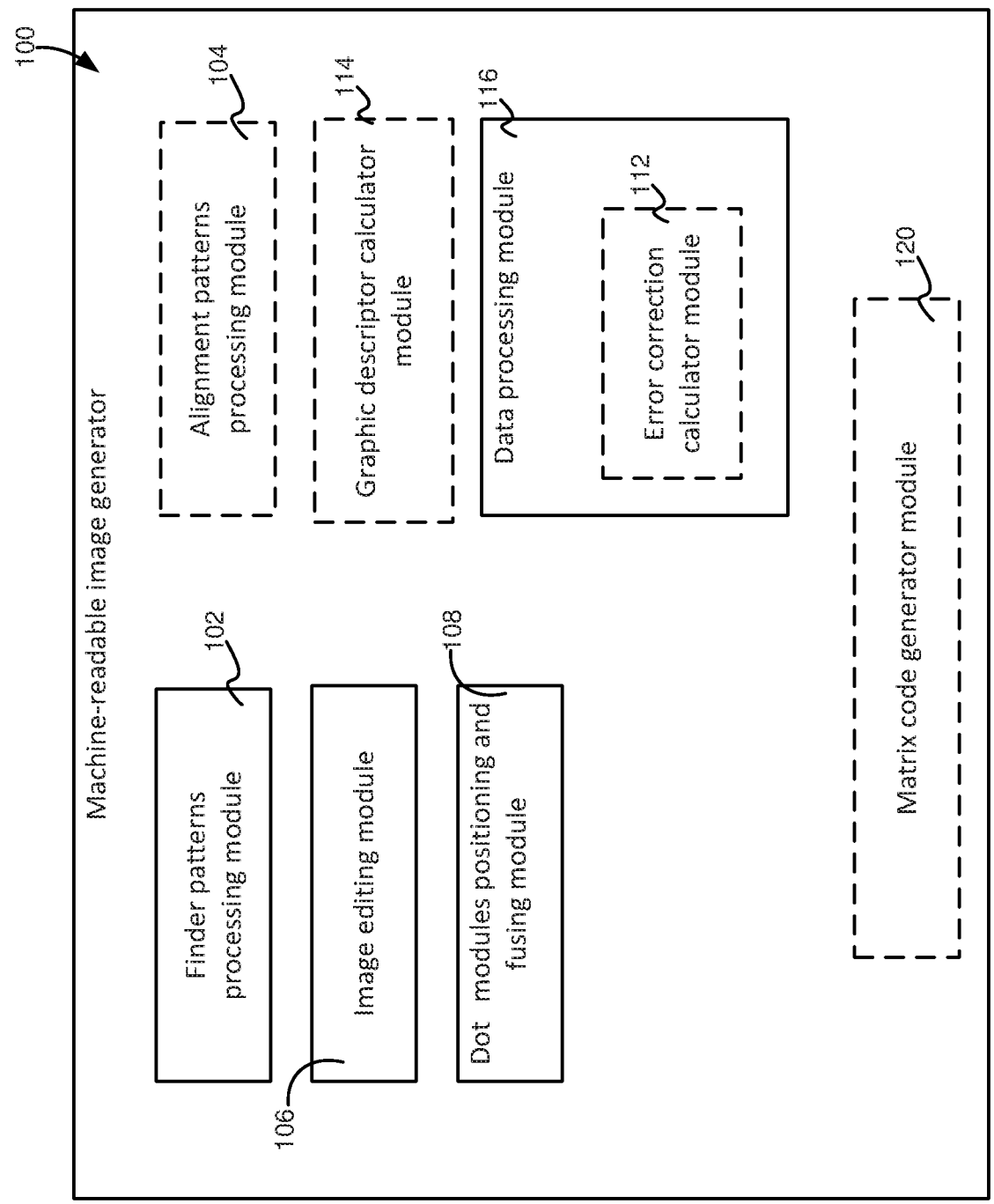
FIG. 1 shows a possible generator for generating a machine-readable image, in accordance with one embodiment of this aspect of the disclosed subject matter.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

In the drawings and descriptions set forth, identical reference numerals indicate those components that are common to different embodiments or configurations.

Unless specifically stated otherwise, as apparent from the following discussions, it is appreciated that throughout the specification discussions utilizing terms such as "positioning", "calculating", "computing", "determining", "generating", "applying", "detecting", "obtaining", "decoding", or the like, include actions and/or processes of a computer that manipulate and/or transform data into other data, said data represented as physical quantities, e.g. such as electronic quantities, and/or said data representing the physical objects. The terms "computer", "processor", and "processing unit" should be expansively construed to cover any kind of electronic device with data processing capabilities, including, by way of non-limiting example, a personal computer, a server, a computing system, a communication device, a processor (e.g. digital signal processor (DSP), a microcontroller, a field programmable gate array (FPGA), an application specific integrated circuit (ASIC), etc.), any other electronic computing device, and or any combination thereof.

The operations in accordance with the teachings herein may be performed by a computer specially constructed for the desired purposes or by a general purpose computer specially configured for the desired purpose by a computer program stored in a non-transitory computer readable storage medium.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus the appearance of the phrase "one case", "some cases", "other cases" or variants thereof does not necessarily refer to the same embodiment(s).

It is appreciated that, unless specifically stated otherwise, certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

In embodiments of the presently disclosed subject matter one or more stages illustrated in the figures may be executed in a different order and/or one or more groups of stages may be executed simultaneously and vice versa.

The term "two-dimensional code" is used herein to refer to two dimensional code of a cell dot distribution pattern that is used to encode data. Each cell has a color selected from a predetermined set of colors. Cell dot distribution can include also bars, rings and other shapes. A two-dimensional code is detected as a two-dimensional digital image by a two-dimensional image detector and is then digitally analyzed by a programmed processor. The cells are read and processed to obtain the full code-words and validity checked and interpreted with an error-correcting code, if it exists. Then, the data encoded can be extracted. An example of a two-dimensional code is matrix code, also termed as "optical readable data matrix code" or "data matrix code" or "readable matrix code" or "matrix code" throughout the description. The use of matrix codes, such as the QR Code, has become popular in many environments due to their fast readability and large data storage capacity compared to standard UPC barcodes.

The term "optical readable image" or "optical machine-readable image" or "machine-readable image" is used herein in reference to a two-dimensional image that includes a human recognizable graphic (including but not limited to one of the following: a photo, logo, marks or/and icons, etc.), which can be detected by a machine-readable image detector and then digitally analyzed by a machine-readable image processor to provide associated data (including numerical data, strings, pointers and/or any digital data). The use of machine-readable images can be used in many environments due to their ability to involve graphics as a prominent part of the machine-readable image compared to known matrix code standards such as the standard QR Code and UPC barcodes.

Throughout the description and the claims, reference is made to the term, "dot module", "dots module" or "dot" which are used herein interchangeably. The terms, dot module, dots module and dot, are known in the art of machine-readable coding, and the following definition is provided as a non-limiting example only for convenience purposes. Accordingly, the interpretation of the term dots module, dot module, module in the claims, unless stated otherwise, is not limited to the definitions below and should be given its broadest reasonable interpretation. Dots module, dot module, dot, as used herein relates to a group of image elements, which include at least one image element in the two dimensional code, matrix code or machine-readable image, which together provides at least one value or function when it is read as part of a machine-reading process. This value will be called herein the decode value or decoded value of the dot module. It should be appreciated that the image element can be, for example, a pixel or a vector element.

According to certain embodiments, dot modules can include i) data dot modules having decoded values corresponding to the encoded data, and ii) error correction dot modules having decoded values corresponding to error correction information of the encoded data and/or the image descriptor calculated for a chosen area of the graphic.

Throughout the description and the claims, reference is made to the term, "cell". The term cell is known in the art of machine-readable coding, and the following definition is provided as a non-limiting example only for convenience purposes. Accordingly, the interpretation of the term cell in the claims, unless stated otherwise, is not limited to the definitions below and should be given its broadest reasonable interpretation. Cell, as used herein, relates to an area of a machine-readable image or a two-dimensional code, which can accommodate one dot module.

Disclosed herein are various embodiments of a machine-readable image, methods for encoding data into an image to form a machine-readable image, methods for decoding the machine-readable image to extract data therefrom, and methods to use an encoded machine-readable image for a variety of uses. The machine-readable image may include a human recognizable graphic.

According to certain embodiments, there is provided a non-transitory computer readable storage medium tangibly embodying a machine-readable image having data encoded therein and embedded with a graphic, the machine-readable image adapted to be detected by a reader for decoding the encoded data, including: the graphic associated with an image descriptor calculated based on a chosen area of the graphic, the image descriptor being used in a reading process of said machine-readable image; a plurality of function patterns; and a plurality of dot modules having decoded values corresponding to the encoded data, the dot modules being positioned in one or more encoding regions of the machine-readable image relative to the function patterns and the chosen area of the graphic.

According to one aspect of embodiments of the disclosed subject matter, disclosed herein is a machine-readable image that includes (i) patterns, (ii) dots modules and (iii) graphic (such as a photo, logo, marks and/or icons). The machine-readable image can be detected by a machine-readable image detector and then digitally analyzed by a machine-readable image processor. The patterns can include finder patterns which are used by the machine-readable image detector to detect the machine-readable image, and possibly align it. Additional patterns, as well as the graphic, can facilitate the detection and/or alignment process. The graphic can be one image, or alternatively can be composed of a plurality of images. The graphic can be read by the machine-readable image processor, and an image descriptor can be calculated, e.g., based on a chosen area of the graphic. The image descriptor can then be converted to code-words (including numbers, bit-stream, string, descriptor and/or other digital data), e.g., image descriptor code-words. Dot modules can be read by the machine-readable image processor to be converted to code-words, e.g., data code words, or some derived code words, such as error correction code-words, etc.

In various embodiments of the disclosed subject matter, some of the code-words obtained from the dot modules, such as, e.g., error correction code-words, may be used for validity checks, possibly with the code-words obtained from the graphic. Such validity checks can include an error-correcting method.

In various embodiments of the disclosed subject matter, the machine-readable image includes a reference area which provides at least three colors or shade cells that can be used to calibrate or estimate the colors and shade values of various parts of the machine-readable image.

The term "machine-readable image symbol" or in short "symbol" is used herein in reference to the parts of the machine-readable image that includes the machine-readable image's (i) function patterns, (ii) dots modules and (iii) part of the graphic that is considered in the reading process, e.g., a chosen area of the graphic which an image descriptor is extracted based on. The above parts of the machine-readable image together can be detected by a machine-readable image detector and then digitally analyzed by a machine-readable image processor, in accordance with one broad aspect of the disclosed subject matter. By a way of example, the machine-readable image symbol can include the entire machine-readable image. By a way of another example, the machine-readable image symbol can include a part of the machine-readable image of which it is a part.

FIG. 6L shows an example of a machine-readable image 692, and a symbol 694 which is part of the machine-readable image 692. The machine-readable image 692 includes the entire image, supposedly the background, table map, and the symbol 694. The symbol 694 includes the present (or part thereof) and other symbol parts including function patterns and dot modules which are needed in order to read the encoded data. It is to be noted, in some cases, that a machine-readable image symbol can include the entire machine-readable image 692. In some cases, the symbol 694 as shown can be a machine-readable image itself.

As disclosed herein, a graphic, which can be provided as an input image to a machine-readable image generator, may be incorporated in a machine-readable image, and the machine-readable image may be incorporated into a printed substrate or printed medium or any other kinds of medium such as, e.g., digital displays that can be captured with a camera equipped mobile phone or any other camera equipped electronic device. The captured machine-readable image may be processed by a processor executing reader software. Alternatively, the reading process, which may include a detecting and decoding process, may be processed by a combination of dedicated hardware which may include reader software. Alternatively, the captured machine-readable image may be communicated through wireless communication protocols, to a remote server, and may be processed by a server.

When a user/customer/consumer camera equipped mobile phone is used to capture the machine-readable image and decode it, the encoded data can be extracted. In some cases, the encoded data can include direct information as will be provided to the user, such as, e.g., a name, a code, a number, a password, a message, etc. In some cases the encoded data can include a link that can be used to automatically direct an application in the user's mobile phone to additional information. For example, the encoded data can include a URL which will be accessed and presented in a web browser interface. In some further cases, the encoded data can include an index that may be used to access a database containing information associated with the machine-readable image. For example, the database can be located on a remote system or locally on the mobile phone and may be accessed through the encoded data in order to obtain additional data to be presented to the user or to be used in any other way to present additional information or perform an associated action. For instance, consumers can use their mobile phone to read and decode a machine-readable image, and read information obtained from the Internet. They may also initiate transactions that are associated with the machine-readable image.

As described herein, each machine-readable image can be encoded with data which can be a unique value, such as a unique short URL or a unique alphanumeric value. In this way a plurality of unique machine-readable images can be formed, each encoded with a different and unique value. According to examples of certain embodiments of the disclosed subject matter, the same graphic can be used to generate different machine-readable images. According to an embodiment of the disclosed subject matter, the disclosed subject matter may be used to generate numerous machine-readable images that encode different data, which, with an unaided eye, the machine-readable images can appear very similar one to another.

According to an embodiment of the disclosed subject matter, the machine-readable image may encode data that are associated with a plurality of additional information located in a remote database. The database may further be accessible to manage this plurality of additional information. According to an embodiment of the disclosed subject matter, when the user's mobile phone performs an action to retrieve additional information from the remote database which is associated with the encoded data, information about the user's mobile phone or the user itself can be transferred and stored at a remote database.

According to certain embodiments of the disclosed subject matter, a machine-readable image may encode data that are associated with one or more of the following: an advertisement, a website, product information, a digital coupon, an action in a mobile application, phone number, email, map location, an event in a calendar, a digital chat room, photos stored in the cloud, a digital presence of a person, etc.

According to certain embodiments of the disclosed subject matter, a machine-readable image may be a component in an anti-counterfeit solution. For example, the graphic used as part of the symbol or part of the machine-readable image may be a hologram. Alternatively, the graphic may be a simplified 2D version of the hologram in accordance with one view of the hologram, while the 3D-like hologram itself will be used in the printing or assembling process. An example of such a case is described below with respect to FIGS. 19 and 20. In another example, the encoded data can be used in order to check if a certain product, on which the symbol was assembled, is likely to be genuine or fake.

In one embodiment, the machine-readable image can be used or printed on a printed substrate or medium such as, e.g., a product packaging, product label, a tag, and other items. The machine-readable image may be used as part of an anti-counterfeit system. A unique encoded data can be associated with the product and used to identify it. The retrieved data can be a message indicating whether the product is most likely fake or not, according to an estimation calculated by an anti-counterfeit system. In a different embodiment, the machine-readable image can be embedded in an animation or video. For example, the machine-readable image can be incorporated on a streamed video presented on a digital screen. When a mobile phone is used to read and decode the machine-readable image, then, for example, the encoded data can be used to open an appropriate video streaming application and present the same streamed video. By way of example, a machine-readable image can be embedded on each frame of the animation's frames. In another example, a machine-readable image can be embedded on a plurality of frames of the animation's frames. In yet another example, each frame of the animation can serve as an input graphic, and a respective machine-readable image can be generated accordingly for each frame.

According to certain embodiments of the disclosed subject matter, the structure of the symbol, including the position of the encoding regions, may be determined according to the relative position of at least one pattern to at least one other pattern such that the symbol is flexible and can be generated in various shapes.

According to certain embodiments of the disclosed subject matter, a machine-readable image can be created by superimposing or overlaying a symbol mask over an image. Such a symbol mask can be represented as an image containing values such that when superimposed or overlaid over another image a machine-readable image is generated. Such a symbol mask can include transparency properties or values. This may be useful, for example, for generating machine-readable videos, as a tool in image editing software, and for images in layers of image elements.

According to certain embodiments of the disclosed subject matter, the machine-readable image may combine a matrix code (as an example of a two-dimensional code) as part of the machine-readable image symbol, such that both the matrix code and the machine-readable image can each be detected and decoded by an apt reader. In one example, the matrix code can serve as the graphic which is used in the process of generating the machine-readable image. In another example, the matrix code and the symbol may share common or similar function patterns and/or dot modules. According to certain embodiments, the matrix code and the symbol can share common function patterns such that the function patterns of the symbol are positioned at the same position as the function patterns of the matrix code. In the latter case, if not enough patterns and dots modules are shared between the matrix code and the symbol such that the matrix code can be read, then part of the matrix code can serve as the graphic which is used in the process of generating the machine-readable image.

It is to be noted that the present disclosure is not bound by the specific sequence of operation steps described with reference to the methods illustrated in FIGS. 3A, 3B, 4A, 4B, 14, 17, 18A, and 18B. One or more stages or steps illustrated in the figures may be executed in a difference order and/or one or more groups of stages may be executed simultaneously or vice versa.

Reference is now made to FIG. 1, which is a block diagram illustration of a generator for generating a machine-readable image, according to examples of certain embodiments of the presently disclosed subject matter. According to examples of certain embodiments of the presently disclosed subject matter, a generator 100 for generating a machine-readable image can include: a finder patterns processing module 102, a dot modules positioning and fusing module 108, an image editing module 106 and a data processing module 116.

In examples of certain embodiments of the presently disclosed subject matter, a generator 100 for generating a machine-readable image can also include some or all of the following modules: an alignment patterns processing module 104, a two-dimensional code or a matrix code generator module 120, such as a QR Code specification module and graphic descriptor calculator module 114.

In examples of certain embodiments of the presently disclosed subject matter, data processing module 116 can include an error correction calculator module 112. In some cases, the matrix code generator module 120 can include a sub-module such as a matrix code specification module that can be used to generate a matrix code which can serve as an input graphic of the machine-readable image, as described below in further detail.

An example of the operation of the generator 100 for generating a machine-readable image shown in FIG. 1 shall be discussed in further detail below. Before continuing with the description of the generator 100 for generating a machine-readable image shown in FIG. 1, there is now provided a description of possible implementations of the generator 100 for generating a machine-readable image shown in FIG. 1 on computer hardware.

According to examples of certain embodiments of the presently disclosed subject matter, the generator 100 for generating a machine-readable image of FIG. 1 can be implemented on a general purpose computer or on a special purpose computer. In another example of a certain embodiment of the presently disclosed subject matter, the components of the generator 100 for generating a machine-readable image of FIG. 1 can be of a general purpose computer combined with dedicated components of a generator 100 for generating a machine-readable image shown in FIG. 1 to form a special purpose computer. For example, the components of the generator 100 for generating a machine-readable image of FIG. 1 can be realized by running a computer readable software code on general purpose computer hardware.

Those versed in the art will readily appreciate that the teachings of the presently disclosed subject matter are not bound by the system illustrated in FIG. 1. Equivalent and/or modified functionality can be consolidated or divided in another manner and can be implemented in any appropriate combination of software, firmware and hardware.

Reference is now made to FIG. 2, which is a block diagram illustration of a computer, or a system of computers, which may be used to generate a machine-readable image, according to examples of the presently disclosed subject matter. According to examples of certain embodiments of the presently disclosed subject matter, the computer 200 can include a communication interface 210, such as a modem, an input unit 220, such as an I/O interface, a memory 230, such as RAM memory, a display 218 such as a PC monitor, a database 260, such as a database server equipped with database software and a processing unit or a processor 240, such as a CPU.

According to examples of certain embodiments of the presently disclosed subject matter, the computer 200 can receive an input image 280, e.g., through the cloud, using the communication interface 210, receive electronic data 282 to be associated with the output machine-readable image 290, e.g., through the cloud or through the input device 220, and can process them, using generator 100, to provide a machine-readable image 290, possibly in the form of a digital image, or in any other suitable form. The machine-readable image 290 can be communicated to a destination, possibly a remote destination which can be the source of the input image or any other remote computer, or the machine-readable image 290 can be stored locally in the computer 200, e.g. in memory 230. In some cases the electronic data 282 can be encoded in the machine-readable image 290, e.g. as a data string, or, alternatively, it can be fully or partially stored in the database unit 260 while the actual data encoded in the machine-readable image represents a pointer pointing to that electronic data 282. As mentioned above, the computer 200 can implement the components of the generator 100 shown in FIG. 1.

It is appreciated that the computer shown in FIG. 2 and described here with reference to FIG. 2, and/or the generator shown in FIG. 1 and described here with reference to FIG. 1 can be a distributed device or system, which includes several components which reside on different devices and are controlled by a control layer as a virtual entity to perform the operations described herein.

Figure 3A:
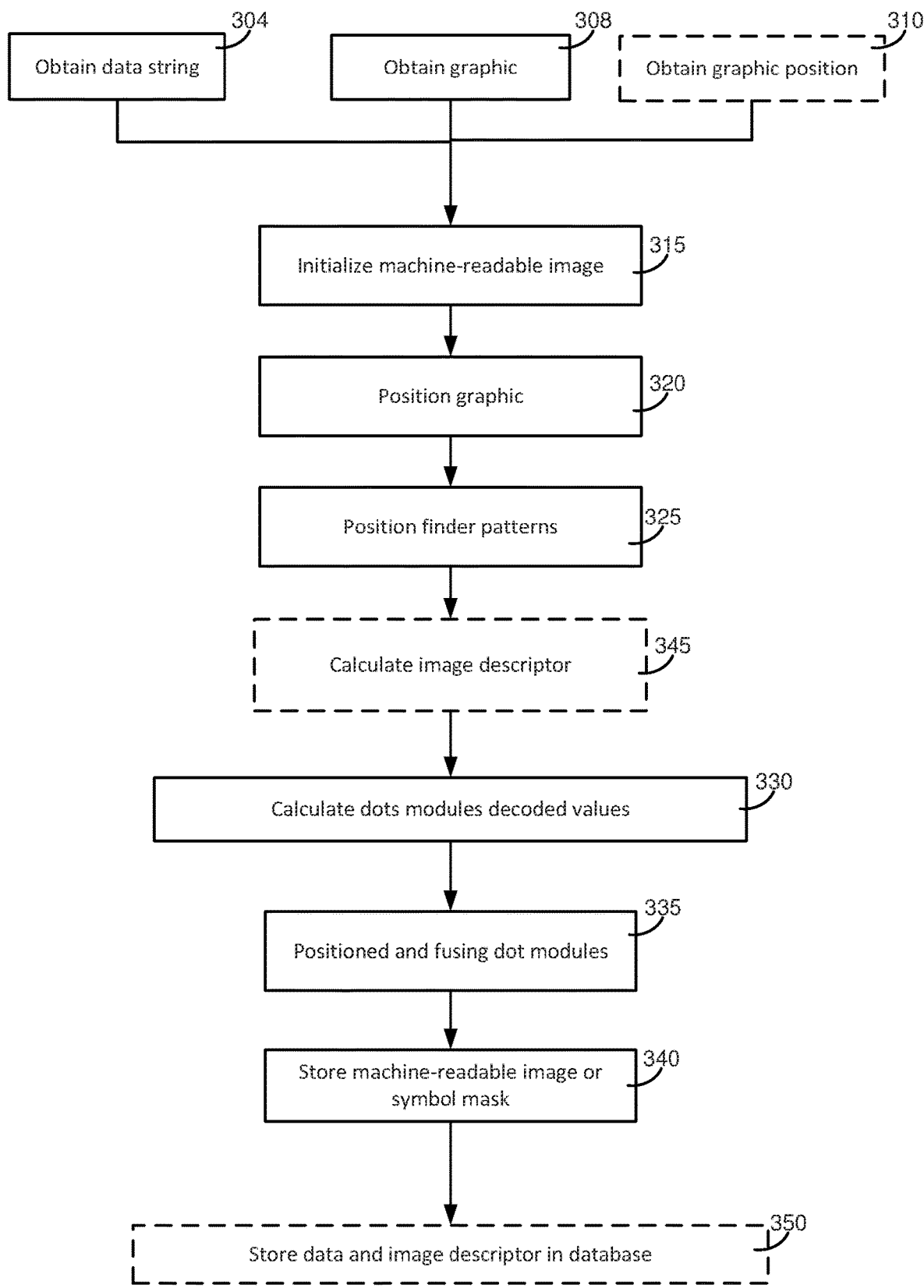
FIG. 3A shows a possible flow chart for generating a machine-readable image, in accordance with one embodiment of this aspect of the disclosed subject matter.

FIG. 3A shows a flowchart illustration of a method of generating a machine-readable image, according to examples of certain embodiments of the presently disclosed subject matter. According to examples of certain embodiments of the presently disclosed subject matter, the method of generating a machine-readable image shown in FIG. 3A, and described herein with reference thereto, can be implemented on the device shown in FIG. 1 and described above with reference to FIG. 1, or on a general purpose computer, such as is shown in FIG. 2 and described above with reference to FIG. 2. However, it is appreciated that the method of generating a machine-readable image that is shown in FIG. 3A, and described below with reference to FIG. 3A can be implemented on any other suitable hardware, and/or possibly on suitable hardware in combination with software which provide a special purpose computer that is configured to perform the operations set forth in FIG. 3A and described below. It is appreciated that the above is true also for other methods of generating a machine-readable image that are described herein and their corresponding Figures, such as, e.g., FIG. 3B.

FIG. 4 shows possible embodiments for a sub-method 330 shown in FIG. 3A, in accordance with certain embodiments of this aspect of the disclosed subject matter. This shall be discussed in further detail below.

Figure 5:
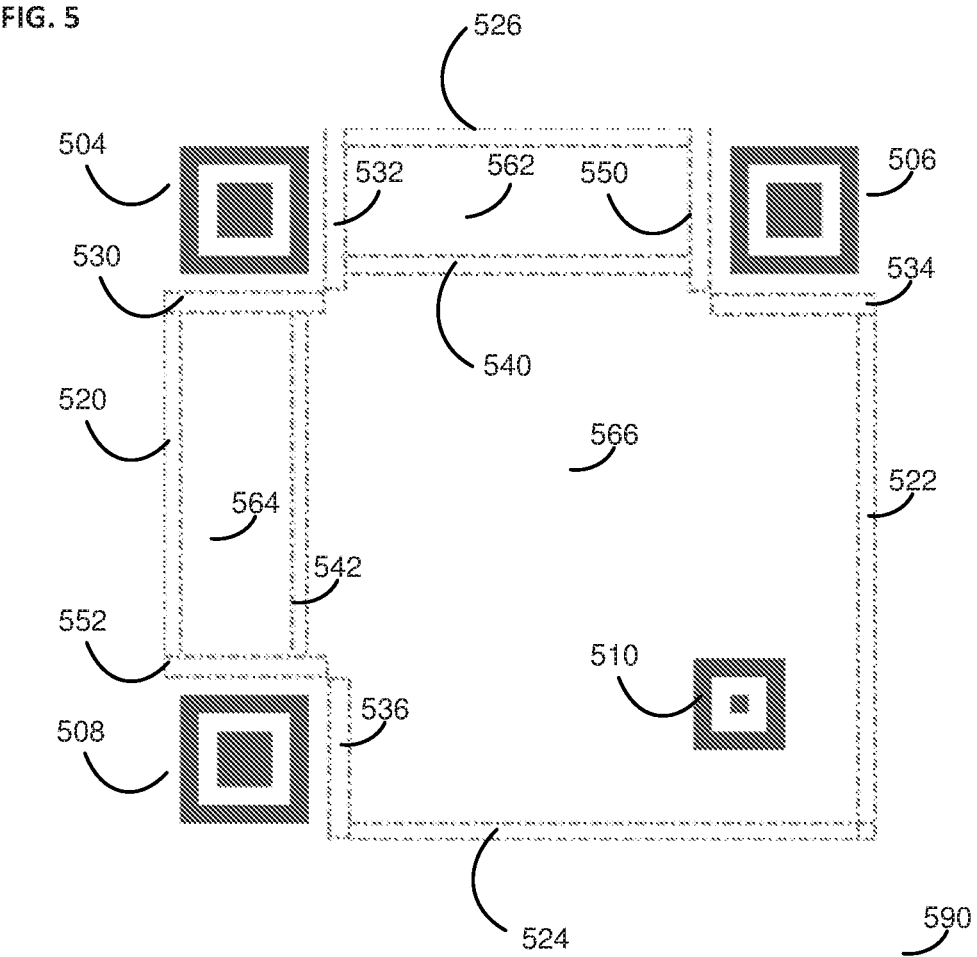
FIG. 5 shows a possible structure of the machine-readable image of a machine-readable image, in accordance with a few embodiments of this aspect of the disclosed subject matter.

Reference is now made to FIG. 5, which shows a possible structure of the machine-readable image, according to examples of the presently disclosed subject matter.

Throughout the description and the claims, reference is made to the term "function pattern(s)", "function module(s)" or "function cell(s)" which are used herein interchangeably. The terms, function pattern, function module or function cells, are known in the art of machine-readable coding, and the following definition is provided as a non-limiting example only, for convenience purposes. Accordingly, interpretation of the term function pattern, function module or functions cell in the claims, unless stated otherwise, is not limited to the definitions below and should be given its broadest reasonable interpretation. Function pattern, function module or function cell as used herein relate to a group of matrix code cells or a set of shapes that are defined in a corresponding matrix code specification or a machine-readable image specification and which serve a predefined ancillary function which can be used in the imaging, scanning and/or decoding process of the date that is encoded in the matrix code or machine-readable image. For example, function patterns can be used for indicating the location of the matrix code or to specify certain characteristics of the matrix code. For example the QR Code specification includes provisions for the following function patterns: finder, separator, timing patterns, and alignment patterns.

According to examples of certain embodiments of the presently disclosed subject matter, finder patterns are used in the machine-readable image presented in the disclosed subject matter. In FIG. 5 three finder patterns 504,506 and 508 are presented. They are intended to assist in location of position, size and inclination of the machine-readable image or symbol. This shall be discussed in further detail below.

According to examples of certain embodiments of the presently disclosed subject matter, one or more alignment patterns can be used in the machine-readable image presented in the disclosed subject matter. In FIG. 5 one alignment pattern 510 is presented. The one or more alignment patterns are intended to assist in location of position, size and inclination of the machine-readable image. This shall be discussed in further detail below.

Throughout the description and the claims, reference is made to the term "encoding region". The term encoding region is known in the art of machine-readable coding, and the following definition is provided as a non-limiting example only for convenience purposes. Accordingly, interpretation of the term encoding region in the claims, unless stated otherwise, is not limited to the definitions below and should be given its broadest reasonable interpretation. The term encoding region as used herein relates to a region of the matrix code or machine-readable image or symbol that is not occupied by function patterns and is available for encoding of data and error correction code words. Encoding region can be also used for encoding metadata, which provide optional information which is not essential in order to decode the encoded data in the process of reading the machine-readable image. Encoding region can be also used for encoding essential information including format information of the machine-readable image or symbol, and other characteristics of the encoded data.

According to examples of certain embodiments of the presently disclosed subject matter, a module of a two-dimensional code or a machine-readable image is considered as essential in a process of reading a two-dimensional code or a machine-readable image if, by applying changes to the module, its associated decoded value is changed from its original associated decoded value, which will increase an error rate of reading the two-dimensional code or machine-readable image. According to examples of certain embodiments of the presently disclosed subject matter, a pattern of a two-dimensional code or a machine-readable image is considered as essential in a process of reading a two-dimensional code or a machine-readable image if, by applying changes to the pattern, it de-facto cannot serve its functionality, which will increase an error rate of reading the two-dimensional code or machine-readable image. According to examples of certain embodiments of the presently disclosed subject matter, essential information is information encoded in essential modules. According to examples of certain embodiments of the presently disclosed subject matter, when a two-dimensional code serves as a graphic embedded in the machine-readable image, as above exemplified, a region of the two-dimensional code is considered as essential in a process of reading the two-dimensional code if applying dot modules of a machine-readable image on modules of the two-dimensional code in the said region increases an error rate of reading the two-dimensional code.

According to examples of certain embodiments of the presently disclosed subject matter, encoding regions are used in the machine-readable image presented in the disclosed subject matter. According to certain embodiments of the disclosed subject matter, in FIG. 5 regions 520, 522, 524, 526, 530, 532, 534, 536, 540, 542, 550, 552, 562, 564 and 566 can be used as encoding regions. This shall be discussed in further detail below.

Throughout the description and the claims, reference is made to the term "code-word" or "code-words". The terms code word or code words are known in the art of machine-readable coding, and the following definition is provided as a non-limiting example only for convenience purposes. Accordingly, interpretation of the term code-word in the claims, unless stated otherwise, is not limited to the definitions below and should be given its broadest reasonable interpretation. The term code-word as used herein relates to a stream of data (including e.g., bit-stream, byte-stream, character-stream or similar) that is used in a readable matrix code and/or machine-readable image to structure data into words. A readable matrix code specification usually suggests (or requires) a certain structure for the code-word or enables a selection of one of a plurality of predefined structures. For example, in the QR Code specification a code-word is usually defined by an 8-bit array. A code-word can structure one or more of the following: data, an error correction string, and metadata, etc.

The final full code-word comprises a set of code-words and possibly some metadata that are to be encoded in the encoding region of the readable matrix code or machine-readable image symbol. By way of example, the final full code-word can include data code-words, error correction code-words, and format code-words.

Throughout the description and the claims, reference is made to the term "format information". The term format information is known in the art of machine-readable coding, and the following definition is provided as a non-limiting example only for convenience purposes. Accordingly, interpretation of the term format information in the claims, unless stated otherwise, is not limited to the definitions below and should be given its broadest reasonable interpretation. The term format information, as used herein, relates to information about the characteristics of the encoded data. The format information can be encoded in modules in the encoding region. The format information facilitates the decoding of the remainder of the encoding region. By way of example, the format information can include the version, error correction level and methods that were used in the process of generating the machine-readable image or two-dimension code embedding the format information.

According to examples of certain embodiments of the presently disclosed subject matter illustrated in FIG. 3A, an input graphic (also termed "graphic") and input data (also termed "data") (e.g., data string) that will be associated with the machine-readable image can be obtained (blocks 308 and 304 respectively). According to examples of certain embodiments of the presently disclosed subject matter, the input graphic can be obtained via the communication interface 210 from a remote computer through the Internet. Further by way of example, the input data can be entered by a user of the computer 200 through the input device 220. It is appreciated that the source of the input graphic and the input data can be local or remote and can be obtained in different ways and using different technologies. Thus, for example, the input graphic can be received from a first remote computer and the input data can be received from a second remote computer that is different from the first remote computer. In a further example, the input graphic and the input data are received from the same source. In still a further example, one or both of the input graphic and the input data are stored locally in the device where the process of generating a machine-readable image is implemented.

According to examples of certain embodiments of the presently disclosed subject matter illustrated in FIG. 2, the input graphic 280 and the input data 282 can be electronically received through an Internet cloud service.

Continuing with the description of FIG. 3A, in addition to the input graphic and the input message, a position for the input graphic can be obtained (block 310). By way of example, the position for the input graphic can be stored in the device and can be loaded to the memory unit 230, when necessary. By way of example, the position for the input graphic can be in the form of a pair of numeric coordinates for the most top-left point of the input graphic and width and height of the input graphic. Still further by way of example, the position for the input graphic can be in the form of computer software instructions.

It is appreciated that the process of generating a machine-readable image, according to examples of certain embodiments of the presently disclosed subject matter, can include more than one input graphic, and, accordingly, more than one position for these input graphics.

It is appreciated that the process of generating a machine-readable image, according to examples of certain embodiments of the presently disclosed subject matter, can include further inputs, such as tolerances and other characteristics and/or parameters which are associated with a decoder or decoders of the machine-readable image or matrix code. For example, certain characteristics of the hardware and/or the software that is involved in the imaging, scanning and/or decoding of the matrix code can also be provided as input to the process of generating a machine-readable image.

It is appreciated that when referring to an image or a graphic throughout the description and claims, the image can be represented and saved in any known appropriate format. By way of example, an image can be represented and stored as a raster graphic format (including GIF, JPG and PNG formats). Another representation can be a vector representation including the Scalable Vector Graphics (SVG) open standard. The SVG is a family of specifications of an XML-based file format for two-dimensional vector graphics, both static and dynamic (i.e., interactive or animated). Another example for a representation can be the EPS file format. EPS is a DSC-conforming PostScript document with additional restrictions which is intended to be usable as a graphics file format.

In some embodiments, editing of any image, e.g., the input graphic, or the machine-readable image to be generated, or any other images as described in the generating process may be involved along the process. For example any allocation, initialization, cropping, resizing, sharpening or rotating effect can be done upon the image. By way of example, the editing can be done by the image editing module 106.

Continuing with the description of FIG. 3A, a canvas on which the machine-readable image will be created is allocated and initialized (block 315). By way of example, a memory unit for the canvas can be allocated in memory 230. By way of example, the canvas can be represented by an image According to examples of certain embodiments of the presently disclosed subject matter, the width and heights of the canvas can be bigger, smaller or identical to the measures of the input graphic.

Then, according to examples of certain embodiments of the presently disclosed subject matter, the input graphic, obtained in block 308, can be added (e.g. by using a superimposition method) on the canvas in block 320. This can be done using the image editing module 106. By way of example, the position of the input graphic may be predetermined or may be at a random position. By way of example, the position may be according to the input graphic's position obtained in block 310. By way of example, the position may be calculated such that the input graphic is superimposed on the largest area possible in region 566 as presented in FIG. 5.

According to examples of certain embodiments of the presently disclosed subject matter illustrated in FIG. 6A, the input graphic 680 can be positioned and added in region 566, as presented in FIG. 5. By way of another example, as illustrated in FIG. 6I, the input graphic 682 can be positioned and added over all regions shown in FIG. 5 excluding region 590. Region 590 can be a region that is outer of the symbol, i.e. not part of the machine readable image symbol. In still in a further example, as illustrated in FIG. 6J, the input graphic 684 can be positioned and added over all regions shown in FIG. 5.

It is appreciated that when referring to a superimposition method throughout the description and claims, any method for superimposing an image, graphic or machine-readable image patterns and modules on another graphic or image may be used. For example, the superimposition may be a translucent linear combination of a graphic and a portion of the image, in accordance with the values of the alpha channel of the graphic. In another example, superimposition may be overlaying one image element on another image element. As another example, dot modules of the machine-readable image having specific colors may be made transparent or superimposed differently than others. In another example, areas in a graphic or image having specific colors may be made transparent or superimposed differently than others.

It is appreciated that throughout the description and claims, the terms fusing and superimposing are used interchangeably.

It is appreciated that the in process of initializing, a machine-readable image in block 315, according to examples of certain embodiments of the presently disclosed subject matter, the input graphic itself (which can be represented as an image) may serve as the canvas upon which the machine-readable image is initialized to be generated. Then, all positions may be adapted accordingly.

Continuing with the description of FIG. 3A, according to examples of certain embodiments of the presently disclosed subject matter, a number of finder patterns (e.g., three finder patterns) are superimposed on the canvas (block 325). By way of example, this process may be conducted by the finder patterns processing module 102 and using the image editing module 106.

According to examples of certain embodiments of the presently disclosed subject matter illustrated in FIG. 5, the finder patterns may be superimposed on regions 504, 506 and 508 which may be in the three corners of the machine-readable symbol. By way of example, the finder patterns are capable of gaining a predefined frequency component ratio irrespective of orientation of the scanning line when a scanning line passes through the center of each positioning during a scanning process of the machine-readable image. It is, hence, not necessary to repeat the scanning operation extensively, changing its scanning angle when a scanner device tries to read the machine-readable image.

According to examples of certain embodiments of the presently disclosed subject matter, once the predetermined three finder patterns are detected, in the process of scanning and reading the machine-readable image, the position and a rotational angle of the whole machine-readable image symbol are easily calculated based on the distance and angle between them. Then the position of the encoding regions and the function patterns within the symbol can be estimated. This shall be further explained below when relating to examples of how to read the machine-readable image in accordance to the disclosed subject matter.

According to examples of certain embodiments of the presently disclosed subject matter, the frequency component ratio gained by a finder pattern can be according to its hue, saturation, lightness, brightness and/or intensity values. By way of example, the frequency component ratio may be gained according to a light-and-dark pattern which may be approximately similar, regardless of the direction of the scanning angle when the scanning line passes through the center of the pattern. For example, such a pattern can include concentric successively overlapped similar figures. More specifically, one typical pattern, as shown in FIG. 7A, comprises a large square 702 with light color values, a middle concentric square 704 with dark color values, another smaller concentric middle square 706 with light color values, and a small concentric square 708 with dark color values. This pattern gains a frequency dark-and-light component ratio of 1:1:1:3:1:1:1. The figures are not limited to squares only, and circles, polygons and various other figures may be used. FIG. 7B and FIG. 7C show such examples.

According to examples of certain embodiments of the presently disclosed subject matter, the frequency component ratio gained by a finder pattern can be obtained after performing an image processing method, for example a smoothing or thresholding process. An example of a finder pattern seen in FIG. 7D is applicable in accordance with the disclosed subject matter—this pattern possibly gains a frequency of dark-and-light component ratio of 1:1:1:3:1:1:1 after performing a thresholding process on an image that contains it. This shall be further explained below when relating to examples of how to read the machine-readable image in accordance with the disclosed subject matter.

According to other examples of certain embodiments of the presently disclosed subject matter, the pattern in FIG. 7D possibly gains a frequency of dark-and-light component ratio of 1:1:1:3:1:1 or 1:1:3:1:1:1 after performing a thresholding process on an image that contains it, where the component ratio depends on the direction of scanning. Further examples are presented in FIG. 7E1, FIG. 7E2 and FIG. 7E3 where the machine-readable image is symmetric and the frequency of component ratio is exemplified as, e.g., 1:1:1:3:1:1:1. This shall be further explained below when relating to examples of how to read the machine-readable image in accordance with the disclosed subject matter.

According to certain embodiments of the disclosed subject matter, a plurality of regions of the machine-readable image symbol can serve as a reference area which provides at least three predefined colors or shade values that can be used to calibrate or estimate the colors and shades values of various parts of the machine-readable image. A region which has certain functionality may be used as a reference area while still serving its functionality. For example, such regions may be the finder patterns. For example, FIG. 7E1 shows an example where the finder pattern is colored with four different color and shades: Black, Yellow, Blue and White. In another example, FIG. 7E2 shows an example where the finder pattern is colored with four different color and shades: Black, Magenta, Green and White. Yet in another example, FIG. 7E3 shows an example where the finder pattern is colored with four different color and shades: Black, Cyan, Red and White.

FIG. 6K shows an example of a machine-readable image which embeds the three finder patterns illustrated in FIG. 7E1, FIG. 7E2 and FIG. 7E3. Such an embodiment of the disclosed subject matter provides in the reference area colors and shades which are considered to represent two color models: CMYK and RGB. CMYK is highly used in the print industry. RGB is highly used in the digital display industry. During the reading process of a machine-readable image, these colors can be captured and sampled, and then used to estimate the original colors or shade of a plurality of other image elements or cells of the captured machine-readable image. For example, if a camera equipped mobile phone was used to capture and read a machine-readable image presented on a digital screen of a second mobile device, then the RGB reference areas can be sampled and used as follows. Assuming that the digital original instance of the machine-readable image which is presented in the digital screen is similar to that illustrated in FIG. 6K, then the original Red value is r=[190, 0, 0], the original Green value is g=[0, 100, 0] and the original Blue value is b=[0, 0, 200]. Assuming that the sample RGB values are α·r=[170, 0, 0] (α=170/190), β·g=[0, 110, 0] (β=110/100) and γ·b=[0, 0, 198] (α=198/200), then any other color value sampled from the machine-readable image can be represented with RGB color components and then be estimated using [α, β, γ]. For example, for a sample color value [r̃, g̃, b̃] the estimated color value can be $$\left[\frac{\tilde{r}}{\alpha}, \frac{\tilde{g}}{\beta}, \frac{\tilde{b}}{\gamma}\right].$$

Throughout the description and the claims, reference is made to the term "descriptor", "graphic descriptor" or "image descriptor". The term descriptor is known in the art of computer vision, and the following definition is provided as a non-limiting example only for convenience purposes. Accordingly, interpretation of the term descriptor in the claims, unless stated otherwise, is not limited to the definitions below and should be given its broadest reasonable interpretation. The term image descriptor, as used herein, relates to visual features of the contents in an image. It may describe characteristics such as shapes, colors, textures and among others, more complex properties of the image. The descriptor may relate to a chosen area or region or a plurality of parts of the image, or to the entire image. The chosen area or region can be selected in different ways. According to certain embodiments, the chosen area can be indicated by version information included in format information of the dot modules. Alternatively, the chosen area can be determined in accordance with a position indicated by coordinate information included in format information of the dot modules. According to further embodiments, the chosen area can be determined in accordance with relative positions of the function patterns. Specifically, in some cases, the chosen area can be determined in accordance with a relative position of an alignment pattern with respect to positions of finder patterns. The above mentioned ways of selecting the chosen area will be further described in detail below.

It is appreciated that a certain image descriptor can be composed from several image descriptors. It is appreciated that when referring to an image descriptor throughout the description and claims, the image descriptor can be represented and saved in any known appropriate format. By way of example, an image descriptor can be represented and stored as a raster graphic format (including GIF, JPG and PNG formats). Another exemplified representation may be a vector representation. Another exemplified representation may be an array of integers, floats or vectors. Another exemplified representation may be a byte or bit stream.

Continuing with the description of FIG. 3A, according to certain embodiments of the disclosed subject matter, an image descriptor can be computed in block 345 for the input graphic positioned in block 320. By way of example, this process may be conducted by the graphic descriptor calculator module 114. According to examples of the presently disclosed subject matter, the image descriptor may be calculated in accordance with the input graphic before being positioned in the canvas. In one embodiment, the descriptor can be computed in accordance with the input graphic after being positioned in the canvas. In the latter case, other patterns or cells of the machine-readable image may be considered. For example, in FIG. 6B in addition to the input graphic 680, the alignment pattern 610 can be considered as well when computing the image descriptor.

According to examples of the presently disclosed subject matter, the image descriptor computed in block 345 can be calculated for a plurality of areas of the machine-readable image symbol. These areas can be predefined or can vary between machine-readable images. In the latter case, data indicating the position of the chosen area should be encoded in the machine-readable image symbol, for example in the encoding regions. This shall be discussed in further detail below.

Reference is now made to FIGS. 8A1, 8B1, 8C and 8D, which include illustrations of possible areas from which the image descriptor is computed in block 345. In FIG. 8A1 an area 810 is surrounded with a dashed line for illustration purposes. According to an example of a certain embodiment of the presently disclosed subject matter, from this area 810 the image descriptor will be calculated. Area 810 can be predefined to be the chosen area for calculating the image descriptor. In FIG. 8B1 areas 812, 814 and 816 are each surrounded with a dashed line for illustration purposes. According to an example of a certain embodiment of the presently disclosed subject matter, from these areas 812, 814 and 816 the image descriptor will be calculated. Areas 812, 814 and 816 can be predefined to be the chosen area for calculating the image descriptor. In FIG. 8C an area 818 is surrounded with a dashed line for illustration purposes. According to an example of a certain embodiment of the presently disclosed subject matter, from this area 818 the image descriptor will be calculated and the position of area 818 can be part of the encoded data. In FIG. 8D an area 808 is surrounded with a dashed line for illustration purposes. According to an example of a certain embodiment of the presently disclosed subject matter, from this area 808 the image descriptor will be calculated and the position of area 808, which is defined according to the position of the alignment pattern 806 in respect to the finder patterns positions, can also be part of the encoded data. By way of example, this enables to generate different machine-readable images with the same input data and the same graphic. By way of yet another example, different chosen areas of the same input graphic can result in respectively different machine-readable images, which can lead to different entries in a database when decoded.

According to examples of certain embodiments of the presently disclosed subject matter, the image descriptor computed in block 345 can be any image descriptor known in the art of image processing or computer vision, including but not limiting to the following: color histograms, gradient histograms, edge histograms, texture descriptors, dominant color descriptors, counter descriptors and any other image descriptors or combinations thereof.

Reference is now made to FIG. 8A2-4, which shows illustrations of examples of possible descriptors, represented as images, computed in block 345 using graphic descriptor calculator module 114. In FIG. 8A2 the computed image descriptor 820 is a grayscale resized representation of the area 810 of the symbol presented in FIG. 8A1. By way of example, this image descriptor 820 can be represented as an array of bytes or byte stream. In FIG. 8A3 the computed image descriptor is a grayscale resized representation of the area 810 of the symbol presented in FIG. 8A1, further quantizing the grayscale values to four values. In FIG. 8A4 the computed image descriptor is a black and white resized representation of the area 810 of the symbol presented in FIG. 8A1.

Reference is now made to FIG. 8B2, illustrating an example of a possible descriptor, represented as two images (Gradient Y and Gradient X), which can be computed in block 345 using graphic descriptor calculator module 114. This illustration also includes the dashed grids 830 and 840 for convenience purposes. FIG. 8B1 shows a possible embodiment of a symbol according to the disclosed subject matter, where regions 812, 814 and 816 are the chosen areas that are used to compute the image descriptors. In FIG. 8B2 the computed image descriptor, a combination of 832, 834, 836, 842, 844 and 846, is a gradient representation of the regions 812, 814 and 816. Image parts 832, 834 and 836 represent a horizontal gradient corresponding to a numerical gradient computation done on regions 812, 814, 816 respectively. Image parts 842, 844 and 846 represent a vertical gradient corresponding to a numerical gradient computation done on regions 812, 814, 816 respectively. According to an embodiment of the disclosed subject matter, the image descriptor can be represented as Histograms of Gradients, which includes several histograms, one for each part as divided by grids 830 and 840.

According to certain embodiments of the disclosed subject matter, the image descriptor can be computed or converted to a code-words representation. For example, if initially the descriptor was computed as a bit-stream and the code-words are represented by a byte-stream, then each eight bits in the byte-stream can be combined to one byte in order to compute a byte-stream from the bit-stream.

Continuing with the description of FIG. 3A, dot modules decoded values are computed in block 330. By way of example, this process may be conducted by the dot modules positioning and fusing module 108 and the data processing module 116. According to examples of certain embodiments of the presently disclosed subject matter, the dot modules decoded value can be computed in accordance with the data obtained or calculated in block 304. According to examples of certain embodiments of the presently disclosed subject matter, the decoded values of some dots modules, e.g., the error correction dot modules, can be computed in accordance with the image descriptor calculated in block 345.

According to certain embodiments of the disclosed subject matter, dot modules occupy encoding regions and can serve as data dots, format dots and metadata dots. The data dots can be used for encoding of data and error correction code-words. The format dots can be used for encoding format information including, for example, control information for the machine-readable image and encoding process, including error-correction level used in the process of generating the error correction code-words, error-correction mode, the symbol's version, image descriptor method used to calculate the image descriptor and any other information essential to enable the remainder of the encoding region to be decoded.

According to examples of certain embodiments of the presently disclosed subject matter, the format information may further provide position information for encoding regions. By way of example, position information can be provided by providing a version number from predefined version options. Each version may imply predefined positions of encoding regions. For example, version 'A' may define that the encoding regions are 530, 532, 534, 536, 542, and 540 as divided in FIG. 5. An embodiment of such option is presented in FIG. 6C. For example, version 'B' may define that the encoding regions are 540, 542, 520, 522, 524 and

526 as divided in FIG. 5. An embodiment of such an option is presented in FIG. 6E. The order in which the data is encoded in these regions may be predefined for each version. It is appreciated that some encoding regions can take part in all possible versions. It is appreciated that the position information can be also be provided by providing coordinates information encoded in the format dots.

According to examples of certain embodiments of the presently disclosed subject matter, the format information may provide position information for a chosen area or a chosen region which is used as part of the process of calculating the image descriptor. An embodiment of such an option is presented in FIG. 8C. Such a region 818 may be defined according to a position provided in the format information encoded in format dot modules. By way of example, the position can be provided by providing four numbers to mark a rectangle as the position of the encoding region: [top-left-x, top-left-y, width, height], where top-left-x and top-left-y can be the position of the top-left corner of the rectangle, and width and height are the width and height of the rectangle.

According to certain embodiments of the disclosed subject matter, the decoded value can be from a set of N values. By way of example, N may be equal to two, which means two values are allowed as possible decoded values. For example, these two values may be one and zero, and may be visually represented by light and dark colors. By way of another example, N may be equal to four, which means four values are allowed as possible decoded values. For example, these four values may be zero, one, two and three, and may be visually represented by Black, Cyan, Magenta, and Yellow colors. In another example, these four values may be '25', '80', '140', '210' and 230, and may be visually represented by ranges of grayscale values: 0 to 50 for value '50', 51 to 110 for value '80', 111 to 170 for value '140' and 171 to 255 for value '210'.

Figure 4A:
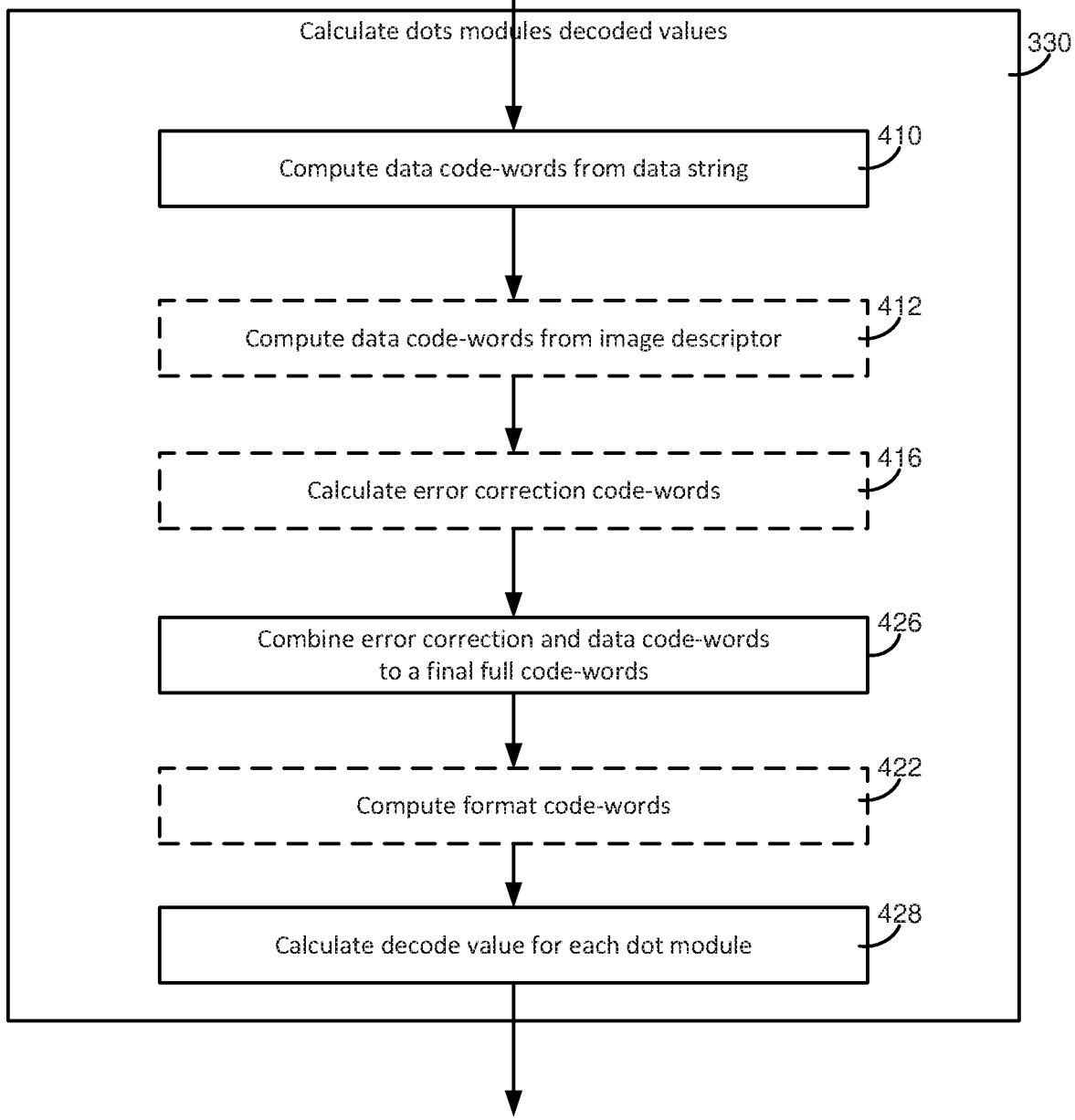
FIG. 4A shows a possible flow chart for calculating the dots modules decoded value to be used in the process of generating a machine-readable image, in accordance with one embodiment of this aspect of the disclosed subject matter.

Reference is now made to FIG. 4A which shows a flowchart illustration of a method of calculating dot modules decoded values, according to examples of the presently disclosed subject matter. Code-words, in accordance with an embodiment of a machine-readable image specification, are computed from the input data in block 410. According to an embodiment of the disclosed subject matter, the code-words can be represented by a byte-stream. According to an example of the presently disclosed subject matter, the input data can be examined and cast to bytes in order to convert the input data to code-words. By way of example, this process may be conducted by the data processing module 116. In another example of a certain embodiment of the presently disclosed subject matter, the input data can be examined in groups of data items (such as chars) and converted to bytes using a look-up-table or a formula. For example, the ASCII table can serve as the look-up-table. Using the ASCII table, each character can be converted into a byte. In another example, the look-up-table can include groups of characters, each of which can be converted into a byte. In the latter case, either there are no more than 256 of such possible groups such that each group can be converted into a respective byte, or certain groups may be converted to the same byte value.

According to certain embodiments of the disclosed subject matter, additional image descriptor code-words can be computed from the image descriptor in block 412. By way of example, this process may be conducted by the data processing module 116. According to examples of certain embodiments of the presently disclosed subject matter, the image descriptor code-words computed in block 412 can be concatenated in the data code-words computed in block 410. For instance, they can be concatenated following an indicator symbol that can be added after the data code-words or can be mixed with the data code-words computed in block 410. It is appreciated that other merging options may be used in order to merge the data code-words computed in block 410 and image descriptor code-words computed in block 412.

According to certain embodiments of the disclosed subject matter, error correction code-words can be computed for the data code-words, or for the image descriptor code-words or for both in block 416. By way of example, this process may be conducted by the error correction calculator module 112. According to certain embodiments, one or more error correction code-words can be derived from the data code-words. The error correction code-words include error correction information which is used to correct errors occurred in a reading process of the encoded data. According to further embodiments, error correction code-words can be calculated for the image descriptor code-words. Such error correction code-words can include error correction information which is used to correct errors which occurred in a reading process of the image descriptor. One goal of the error correction is to allow a machine-readable image reader to correctly read the machine-readable image even if a portion of the machine-readable image is unclear, damaged or under non-optimal illumination conditions. According to examples of certain embodiments of the presently disclosed subject matter, the error correction code-words can be computed using a Reed-Solomon error correction and coding method or any of its derivatives and improvements. It is appreciated that other error correction and coding methods can also be used in addition, or in lieu, of the above. By way of example, the error correction method can be chosen by the application using the above mentioned or any other error correction method with different error correction levels. In another example the method can be configured by the format information encoded in the machine-readable image, e.g., in the format dot modules. Some error correction methods present different error corrections rates and modes. According to an example of a certain embodiment of the presently disclosed subject matter, the decision of error correction rate and mode can be provided as an input using input device 220. In another example of a certain embodiment of the presently disclosed subject matter, the decision can be provided automatically by the data processing module 116. Such a decision can be computed or determined accordingly such that the chosen rate and/or mode will make final code-words composed from the error correction code-words and the data code-words, which will fit to one of the possible versions of the machine-readable image.

According to certain embodiments of the disclosed subject matter, final code-words can be computed from the data code-words and error correction code-words in block 426. By way of example, this process may be conducted by the data processing module 116. According to examples of certain embodiments of the presently disclosed subject matter, the final code-words may be a concatenation of the data code-words and the error correction code-words (if they exist). For instance, the final code-words may be a concatenation with additions of separation indicator symbol followed by the data code-words and error correction code-words. Or, alternatively, it may be a mix of the data code-words and the error correction code-words. In any case, additional separation indicator symbols, including a termination symbol, starting symbol, length indication and end symbol, can be used for the concatenation. It is appreciated that other merging options and an additional or alternative separation indicator symbol (if they exist) may be used in order to merge the data code-words and the error correction code-words (if they exist).

According to certain embodiments of the disclosed subject matter, format information can be calculated in accordance with configurations chosen or computed during the process of generating a machine-readable image, and format code-words can be computed therefrom to provide such information, as shown in block 422. By way of example, this process may be conducted by the data processing module 116. According to examples of certain embodiments of the presently disclosed subject matter, the format information can include version information, error correction information, region position information and other information as mentioned in the above paragraphs. In addition, the format information can also include information about possible configuration of a XOR mask that can be used in the process of calculating the decoded value of each dot module. The latter will be further described below.

Decoded values are calculated for each dot module in block 428. By way of example, the process of calculating decoded values for the final code-words can be conducted by the data processing module 116. According to certain embodiments, the final code-words can include format code-words. According to some other embodiments, format code-words are not part of the final code-words, and the process of calculating decoded values for the format code-words can be different from the process conducted for the final code-words. According to examples of certain embodiments of the presently disclosed subject matter, each code-word can be represented by a plurality of dot modules. For example, if a code-word is defined by a byte (eight binary bits) and the decoded value can be from a set of two values, then a group of eight dot modules can represent one code-word. In another example, if a code-word is defined by a byte (eight binary bits) and the decoded value can be from a set of four values, then a group of four dot modules can represent one code-word. It is appreciated that in some cases format dot modules and data dots modules can be represented differently.

According to certain embodiments of the disclosed subject matter, and as illustrated in FIG. 4B, calculating the dot modules' decoded values in block 330 may involve computing data code-words from the input data in block 410 and calculating decode values for each dot module in block 428 in accordance with the computed data code-words. By way of example, in certain embodiments of the disclosed subject matter, no error correction code-words are involved in the process of encoding data and calculating the dot modules' decoded values. By way of example, in certain embodiments of the disclosed subject matter an image descriptor is not calculated as part of the process of generating a machine-readable image, and, accordingly, image descriptor code-words are not created.

According to an example of a certain embodiment of the presently disclosed subject matter, the output of the calculation of dot modules decoded values calculated in block 330 may be an array of dot modules decoded values. In another example, the output may be an array of representing colors. It is appreciated that other types of structures can also represent the decoded values including but not limited to vectors, chains, strings, set of variables or a single variable.

Continuing with the description of FIG. 3A, dot modules are positioned and fused in block 335. By way of example, this process may be conducted by the dot modules positioning and fusing module 108. According to examples of certain embodiments of the presently disclosed subject matter, the encoding regions to position dot modules may be already defined in previous processes of the generation of the machine-readable image, or may be defined in block 335.

According to examples of certain embodiments of the presently disclosed subject matter, in an embodiment where the encoding regions are determined in block 335 then a decision can be made in accordance with the amount of data encoded in the machine-readable image or symbol, or amount of required dot modules. According to certain embodiments, the encoding regions for positioning the dot modules can be relative to the function patterns and a chosen area of the graphic. As aforementioned, the chosen area is the area based on which an image descriptor is calculated. The relative position of the encoding regions with respect to the function patterns and the chosen area of the graphic can be implemented in many ways. By way of example, the encoding regions can be disjoint from the chosen area. As exemplified in FIG. 8C and FIG. 8D, the chosen area of the graphic can be the region marked as 818, or 808, and the encoding regions for the dot modules can be one or more of the regions 526, 532, 550, 540, 530, 520, 542, 552, 536, 534, 522 and 524 which are positioned in between the function patterns and surrounding the graphic as illustrated in FIG. 5. As shown, these regions are disjoint from the chosen area. In another example, the relative position can be determined such that the encoding regions will not have a mutual area with the graphic, or the area upon which the graphic was superimposed. In another example, the relative position can be determined such that the encoding regions will have a certain mutual area with the graphic or the area upon which the input graphic was superimposed. The mutual area can be chosen based on saliency values computed for the graphic. Saliency values may score the likelihood to attract the attention of human observers for a certain area of a given image for which it was computed. Saliency map may be an image presenting saliency values for respective areas of an image. In one example this mutual area can have low saliency values with respect to a computed saliency map computed for the input graphic.

Figure 9A:
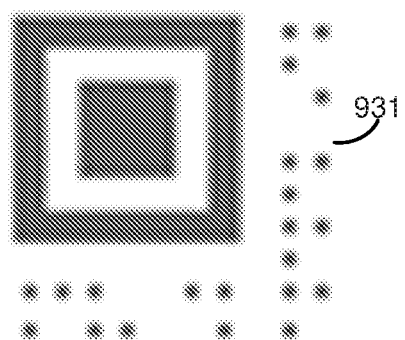
FIGS. 9A-9F show illustrations of dot modules fusing methods that can be used in the process of generating a machine-readable image, in accordance with a few embodiments of this aspect of the disclosed subject matter.
Figure 9B:
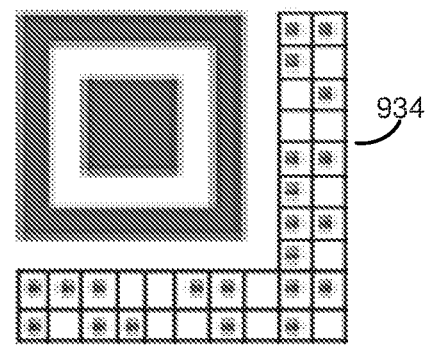
Figure 9D:
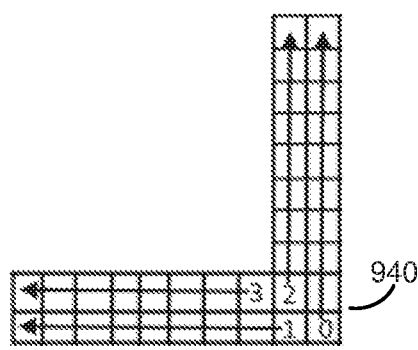
Figure 9C:
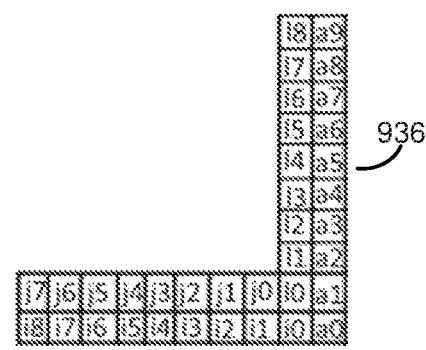
Figure 9F:
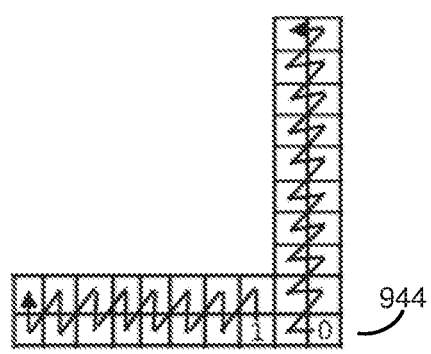
Figure 9E:
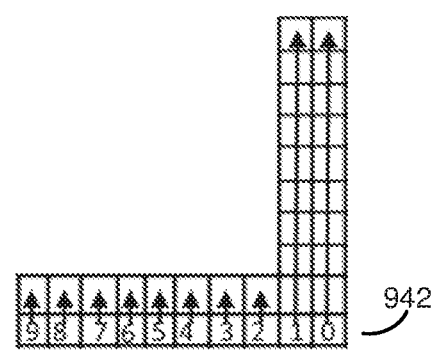

According to certain embodiments of the disclosed subject matter, the position of dot modules in an encoding region may be predefined. Such positioning may be, for example, a pre-defined grid that defines cells where the dot modules can be positioned and fused. According to examples of certain embodiments of the presently disclosed subject matter, the order of positioning dot modules within a grid can be according to a pre-defined formula or method. Reference is now made to FIG. 9A-F, which shows a part 931 of a machine-readable image or symbol according to an embodiment of the disclosed subject matter (for example a zoom view on part 631 of symbol presented in FIG. 6G). A possible grid 934 is overlaid over a copy of part 931 for illustration purposes, the grid with cells numbering 936 and illustrations for possible positioning orders 940, 942 and 944. FIG. 9C shows a possible grid associated with a plurality of encoding regions. For example, in one possible embodiment of the disclosed subject matter, all marked cells in 936, which are cells a0-9, i0-8, l0-8 and j0-7, are associated with one encoding region. By way of example, the ordering of the positioning of dot modules may be as illustrated in FIG. 9E, where the ordering method begins bottom-right and runs upwards until the end of the column, and then continues with the column to the left. This is illustrated in 942 where the ordering is according to lines 0 to 9. By way of another example, the ordering of the positioning of dot modules may be as illustrated in FIG. 9F, where the ordering method begins bottom-right and runs alternately upwards and downwards from the right to the left in two-module wide columns. This is illustrated in 944 where the ordering is according to lines 0 to 1. In another possible embodiment of the disclosed subject matter, the marked cells in 936, which are cells a0-9, i0-8, l0-8 and j0-7, are associated with two encoding regions. For example, cells a0-9 and i0-8 are associated with an encoding region that provides data code-words, and cells l0-8 and j0-7 are associated with another encoding region that provides format code-words. By way of example, the ordering of the positioning of dot modules may be as illustrated in FIG. 9D, where the ordering method begins bottom-right and runs upwards until the end of the column, and then continues with the column to the left. This is illustrated in 940 where the ordering of the cells which are associated with data code-words is according to lines 0 to 1, and the ordering of the cells which are associated with the format code-words is according to lines 2 to 3. It is appreciated that different encoding regions may have different positioning formulas and methods. For example, encoding regions containing dot modules associated with format information may have different positioning formulas compared to encoding regions containing dot modules associated with data code-words.

Once a dot module position is defined, it can be fused, such that the cell associated with the dot module will visually provide the dot module decode value.

In accordance with examples of certain embodiments of the presently disclosed subject matter, the fusing process may include assigning colors or shades values to all image elements in the machine-readable image that associate with a cell according to the associated dot module decoded value.

In accordance with examples of certain embodiments of the presently disclosed subject matter, a description of some computations which can be implemented as part of the fusing operation is provided below. It is appreciated that the fusing operation can include one or more of the below described computations. It is also appreciated that, for convenience purposes, that which is described below is designed to be especially effective when the decoded value is from a set of two possible values associated with dark or light colors or a range of colors, however that described below can be adapted to other possible embodiments of the disclosed subject matter. A purpose/goal of the below computations (such as, e.g., shifting operation) as part of the fusing operation may be to combine the graphic and the symbol parts such that joint areas will be at least partly visually present the graphic while at once also present a valid readable symbol parts.

As part of the fusing operation, the machine-readable image or canvas can be copied to memory (e.g., to memory unit 230). For convenience, the machine-readable image or canvas which resides in the memory and is processed as part of the fusing operation shall be referred to herein as the "temporary image". It is appreciated, that all the images referenced in the description of examples of the presently disclosed subject matter, including the machine-readable image, may be in the form of digital data that is stored on a tangible computer readable medium.

According to examples of certain embodiments of the presently disclosed subject matter, further as part of the fusing operation, luminance fusing thresholds can be defined or calculated. Still further by way of example, two luminance fusing thresholds can be defined, a dark-threshold and a light-threshold. Yet further by way of example, and for illustration purposes, in a luminance scale of [0, 255] a dark-threshold upper bound can be a value in the order of 80 and a light-threshold lower bound can be in the order of 170. Still further by way of example, the luminance values can be provided as L*a*b* channels. A L*a*b* color space is a color-component space with dimension L* for lightness and a* and b* for the color-component dimensions, based on nonlinearly compressed CIE XYZ color space coordinates.

According to further examples of certain embodiments of the presently disclosed subject matter, a global threshold can be determined by taking a reflectance/intensity/luminance value midway between the maximum reflectance/intensity/luminance and minimum reflectance/intensity/luminance of a certain image (e.g., the temporary image) or part of it. The global threshold for the temporary image can be calculated, and the computation of the luminance fusing thresholds can be calculated subsequently and can be based on the calculated global threshold. For example, the luminance fusing thresholds can be calculated such that that there will be a gap between the global threshold and the luminance fusing thresholds. The purpose of the gap is to enable a decoder to decode the cells with high probability as valid machine-readable dot modules and with the correct decoded value, according to an embodiment of the disclosed subject matter and/or implementation (possibly after optical reading and signal processing and any further processing that may take place before decoding).

According to examples of certain embodiments of the presently disclosed subject matter, following computation of the luminance fusing thresholds, for each pixel in the temporary image, the luminance value of the pixel can be shifted according to a selected one from the luminance fusing thresholds. For example, if a luminance value for a given pixel is below the global threshold, the dark-threshold can be applied to the pixel value, and the luminance value for the pixel can be shifted accordingly. Shifting relates to any allowed operation on a pixel, such as adding or subtracting a value to or from the pixel's value.

According to further examples of certain embodiments of the presently disclosed subject matter, the global threshold for the temporary image is initially in the form of a provisional global image. The provisional global image can be re-evaluated after each of one or more pixel shifting operations, and, based on the results of the re-evaluation, the global threshold can be updated. For example, the re-evaluation of the provisional global threshold can include re-sampling the maximum reflectance and minimum reflectance of the temporary image. Further by way of example, the computation of the updated provisional global threshold can include re-computing the midway value between the maximum reflectance and minimum reflectance.

According to examples of certain embodiments of the presently disclosed subject matter, following completion of the pixel shifting operation (in one or more iterations), the computed luminance values for all the pixels can be used to convert the temporary image to a desired color representation, and the temporary image may be copied into the output image.

In a further example of a certain embodiment of the presently disclosed subject matter, and as part of the fusing operation, the average luminance value of the cell can be shifted according to the luminance fusing threshold that is appropriate according to the average luminance value of the cell. Thus, for example, if the average luminance value of a given cell is below the global threshold (e.g., it is a "dark" cell), the average value of the cell is shifted according to the dark luminance fusing threshold.

According to examples of certain embodiments of the presently disclosed subject matter, shifting the average luminance value of the cell can include, for example, shifting a sub-group of pixels of the entire group of pixels that belong to the cell. Hence, for example, if the decoded value that was computed for the cell as part of the process of generating a symbol indicates that the cell is dark (e.g., below the global threshold), then some of the pixels that are associated with the cell are shifted, and others are maintained at the computed value (or at least shifted to a different extent, or even made "lighter") according to the process of generating a readable matrix code representation, such that the average for the cell drops below the threshold.

According to further examples of certain embodiments of the presently disclosed subject matter, the shifting operation can be based on a shifting value, which corresponds to a difference between the average value and the appropriate global threshold of the corresponding symbol cell. Further by way of example, the shifting operation can include shifting all the pixels that are associated with a given cell by the calculated difference value, while clipping values of the pixels under the minimum presentable value (i.e. dark cells). For example in the [0, 255] range, which is a common range for many color channels, any shift that would result in a value that is under 0 (a negative value) can be clipped to 0. The clipping operation can interfere with the process of averaging a value of a cell to below (or above) a certain threshold, and, therefore, according to examples of the presently disclosed subject matter, clipping should be considered when determining the difference value. In a further example, the effect of clipping can be evaluated after the shifting process, and a second shifting process can be implemented to overcome the clipping effect.

According to yet further examples of certain embodiments of the presently disclosed subject matter, the shifting values can be computed using an optimization function that takes into account: (a) a visual similarity measure between the corresponding cell/pixels within the temporary image; and (b) a readability measure for a given cell and a given light or dark threshold. Further by way of example, the altering arguments of the optimization function can be the luminance or color values of the pixels of the cell. In general, a readability function is a function that (a) gives high grades to color values which enables a decoder to decode the cells with low probability as valid and with the correct value, according to an embodiment of the disclosed subject matter and/or implementation (possibly after optical reading and signal processing and any further processing that may take place before decoding) and (2) gives low grades to colors which enables a decoder to decode the cells with high probability as valid and with the correct value, according to a readable matrix code specification and/or implementation (possibly after optical reading and signal processing and any further processing that may take place before decoding). Thus, the suggested function encourages the mentioned optimization function to choose colors with high probability to be scanned and decoded correctly, while the optimization function also considers visual similarity measures.

For example, a visual similarity measure can be a L2 norm between the temporary luminance value and the luminance value in the associated area before the fusing process. The readability measure can be a sigmoid function pushing temporary color values far and away from regions that contain color values that enable a decoder to decode the cells with low probability as valid and with the correct value, according to an embodiment of the disclosed subject matter and/or implementation, and encouraging temporary color values to be assigned with color values that enable a decoder to decode the cells with high probability as valid and with the correct value, according to an embodiment of the disclosed subject matter and/or implementation.

According to yet further examples of certain embodiments of the presently disclosed subject matter, the shifting value can be computed using the optimization function that was mentioned above, and further taking into account, in the optimization function, the appearance of neighboring cells and the visual effect of a neighboring cell on the appearance and the visual similarity of each cell. Further by way of example, the neighboring cells can include any number of cells and are not necessarily limited to cells that have a common edge with the cell to which the optimization function is being applied, in this regard, by way of example, the optimization function can even take into account the entire image.

Figure 10:
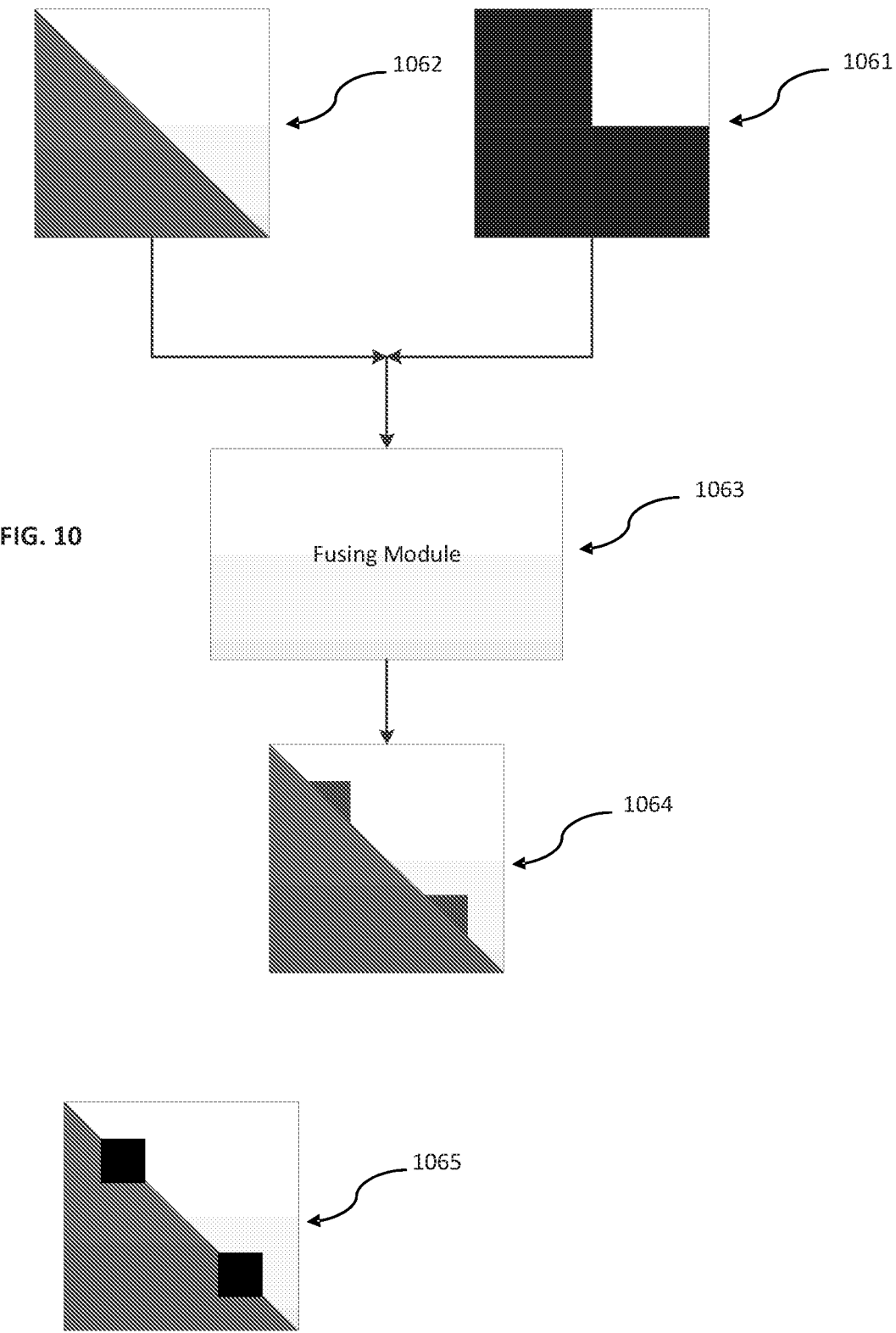
FIG. 10 shows a graphical illustration of a fusing operation according to examples of the presently disclosed subject matter.

Reference is now additionally made to FIG. 10, which is a graphical illustration of a fusing operation according to examples of the presently disclosed subject matter. For convenience, the fusing operation shown in FIG. 10 is carried out with respect to a relatively small area, which represents the temporary image (this region is referenced 1062) and an illustration of dot modules in an image representation that are generated according to an embodiment of the disclosed subject matter to be fused in the 1062 area, according to examples of the presently disclosed subject matter (this area is referenced 1061). In FIG. 10, the dot modules 1061 represent a possible 2×2 data cell. However it is appreciated that the process described herein below with reference to FIG. 10 can be readily expanded to the entire machine-readable image.

According to examples of certain embodiments of the presently disclosed subject matter, the fusing operation in FIG. 10 receives as input the dot modules 1061 and the cells area 1062. The fusing module 1063 can be configured to implement an algorithm which creates an image 1064 which can be saved in a new location in the memory, or can replace the cells 1061 or used temporary images in the memory. The image 1064 resulting from the fusing operation can be the output image of the process of generating a valid dot modules representation. However, in further examples of certain embodiments of the presently disclosed subject matter, the image 1064 can be an intermediate image in case the fusing operation includes multiple iterations (two, three, . . . , n iterations).

According to examples of certain embodiments of the presently disclosed subject matter, taking advantage of the tolerances included in the machine-readable image symbol, and/or taking advantage of tolerances, characteristics, configurations and/or capabilities of the decoders, scanners or imagers, a cell in the output image 1064, which represents a cell of a machine-readable image or symbol, can be interpreted with the same value as the respective value of the dot modules 1061, if a certain amount of pixels in the cell are assigned with intensity values that pass a certain threshold, as implemented by the scanner.

According to examples of certain embodiments of the presently disclosed subject matter, the fusing module 1063 can be configured to assign a group of pixels in the image 1064 (or in the temporary image) with values that are expected to enable a decoder (possibly after optical reading and signal processing and any further processing that takes place before decoding) to decode the cell as a valid cell with the correct associated decode value (regardless of the value of other pixels in the cell). Further by way of example, the group of pixels of the cell, whose values enable a decoder to read the cell as a valid cell, constitute only part of the cell's pixels. Still further by way of example, the rest of the cell's pixels can be assigned with the value of the respective pixels in the input image 1062. By way of example, center pixels of each cell can be assigned with values close to the value of the respective cells in dot modules image representation 1061. These values can be, for example, the average of the values of neighboring pixels in the input image 1062 that are considered to present a higher level of visual similarity to the respective values in 1061. This latter computation differs from the computation that was used to generate the cell 1065, in which the center pixels of the cell were assigned with the value of the respective cells in 1061.

According to a further example, the fusing operation can include copying the images to memory while converting them to a different color space including HSV representation. The image in the memory shall be referred to herein as the temporary image.

Further by way of example, for convenience purposes, most of the description above of the fusing process was described for two color ranges and can be defined as a dark-range and a light-range. Still further by way of example, the range can be selected to match requirements of a CMYK representation of the input and resulting output image. Still further by way of example, the range can be selected according to a criterion that is based on a high probability measure of a likelihood that a printed version of the output image can have a smaller color MSE distance to the digital image. For example, in an HSV scale of $[0,100]^3$ the dark-range can be selected as $[S,V]<[25, 25]$ upper bound, and a light-range can be selected $[S,V]>[85, 85]$. In another example, the current global threshold of the temporary image can be first calculated, and subsequently the light and dark ranges can be computed according to valid dark and light ranges. In yet another example, the $[S,V]$ pairs denote an upper and a lower bound, and the upper and lower bounds define a range, as explained above, which can be computed as a function of H. By way of example, in an embodiment where more than two decoded values are possible, then more than two ranges can be defined.

According to further examples of certain embodiments of the presently disclosed subject matter, the fusing operation can include: for each pixel in the temporary image, computing its HSV value by both (1) choosing an HSV value within an HSV color range, which enables a decoder to decode the cell with high probability as valid and with the correct value, according to an embodiment of the disclosed subject matter and/or implementation (possibly after optical reading and signal processing and any further processing that may take place before decoding), and (2) choosing the closest value within the range which is the closest to the HSV value of the corresponding pixel in the input image. For example, in an embodiment that defines that such ranges should represent either dark or light, the measure for defining such distances between colors, in order to compute the said closest value, can be for example, any L norm distance. Thus, for example, if the value of the pixel's corresponding matrix code cell is dark, then the pixel's HSV value can be shifted into the dark-range; and if the value of the pixel's corresponding matrix code cell is light, then the pixel's HSV value can be shifted into the light-range. The resulting values can be used to update the temporary image, the temporary image can optionally be converted to any desired color representation, and the temporary image can be copied to give rise to the output image.

It is appreciated that this implementation of the fusing operation can also be implemented at the cells level, rather than at the pixel level. This can be done, for example, while considering the average color value of the cell using the methods described above in the pixel level.

According to examples of certain embodiments of the presently disclosed subject matter, following completion of the shifting operation (in one or more iterations), the computed luminance values for all the pixels (whether computed on a per-pixel basis or on a per-cell or cells-group basis) can be used to convert the temporary image to a desired color representation, and the temporary image can be copied to give rise to an output image.

The term "image mask" is used herein to refer to a two-dimensional image that includes (1) one or more color channels, and (2) a translucency channel, (a so-called alpha channel); all channels represented as matrices or by any other common representations known for image standards, including vectors. This type of image is sometimes called a transparent image or a translucent image. It is appreciated that the image mask can be represented in vector format where a plurality of vectors is associated with color and translucency values.

In certain embodiments of the disclosed subject matter, this image mask can be used to mask a symbol and may be superimposed on a graphic to generate a machine-readable image. According to certain embodiments, the graphic which is to be superimposed on, can be a non-functional graphic that simply serves as a background image to be superimposed on by the image mask and no image descriptor will be calculated therefrom, in comparison with the graphic 280, which serves as a part of the machine-readable image and a basis to calculate an image descriptor associated therewith. The term "symbol mask" is used herein to refer to such an image mask that may be used to generate a machine-readable image when superimposed over an image. By way of example, the values of the color channels and the translucency channel may be set such that when superimposing the symbol mask over a given image, the result of such superimposition is a machine-readable image. According to certain embodiments, the superimposing can be performed by using a linear combination of color values of at least one color channel of the non-functional graphic and the symbol mask according to alpha values of one alpha channel of the symbol mask.

Figure 11A:
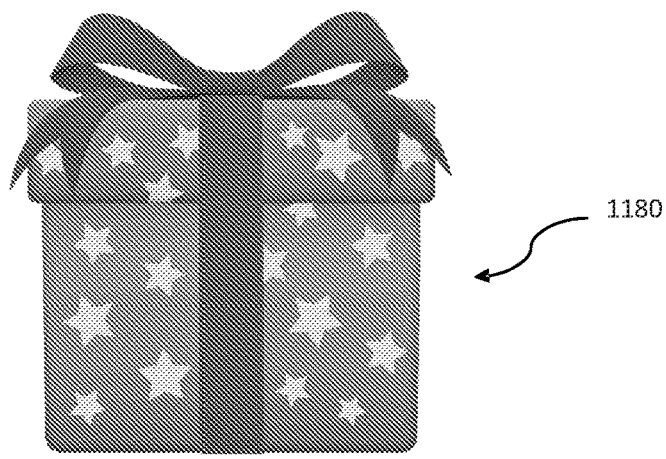
FIG. 11A-C shows illustrations of a possible embodiment of a symbol and symbol mask, in accordance with one embodiment of this aspect of the disclosed subject matter.
Figure 11B:
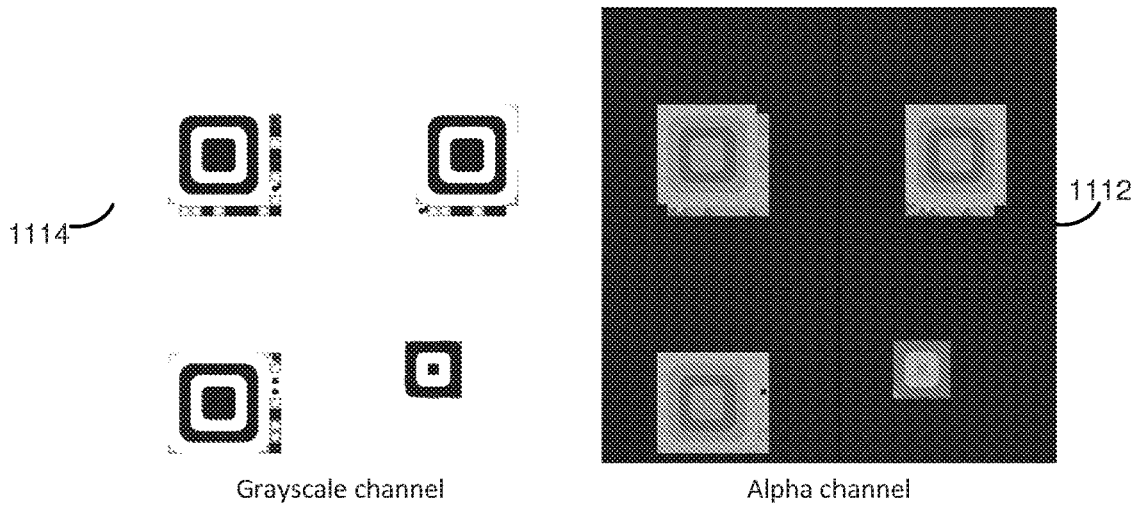
Figure 11C:
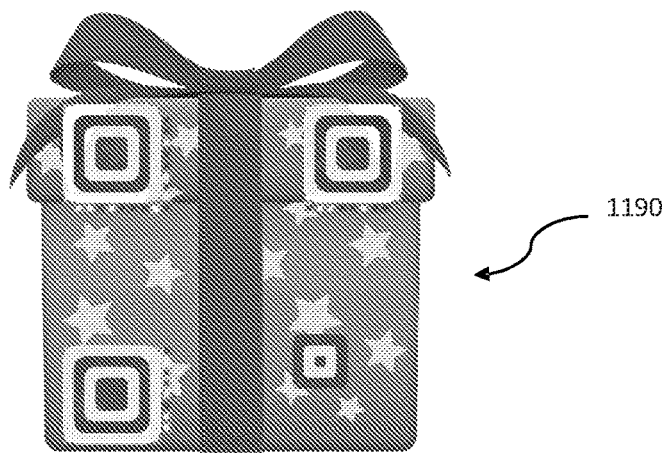

According to certain embodiments of the disclosed subject matter, a process of generating a machine-readable image may be the process illustrated in FIG. 3A and described above, where the result is a symbol mask if transparency values are applied to the generated machine-readable image. Reference is now made to FIGS. 11A-C, which show illustrations of a possible embodiment of a symbol 1190 in FIG. 11C, an input image 1180 in FIG. 11A and a possible embodiment of a symbol mask in FIG. 11B that can be superimposed on image 1180 to create the symbol 1190.

According to certain embodiments of the disclosed subject matter, the symbol mask may be represented with two image channels: a grayscale channel and an alpha channel. An example of an embodiment is presented in FIG. 11C. The symbol mask used to generate the symbol 1190 is represented with a grayscale channel 1114 and an alpha channel 1112. By way of example, a superimposition of the symbol mask presented in FIG. 11B with the image 1180 can be carried out using a linear combination of the grayscale channel 1114 with the image 1180 in accordance with the alpha values of the alpha channel 1112. For example, if a certain image element in 1180 has the RGB value [ř, g̃, b̃], the associated grayscale image element in 1114 has the grayscale value [g] and the associated alpha image element in 1112 has the alpha value [α] then the computed image element in 1190 may be: $(1-\alpha) \cdot [\check{r}, \tilde{g}, \tilde{b}] + \alpha \cdot [g, g, g]$. It is appreciated that in case the decoded values are represented by color or shades not in the grayscale spectrum, for example four decoded values represented by CMYK colors, then the grayscale channel can be replaced with a set of channels representing color channels, including CMYK or RGB.

According to certain embodiments of the disclosed subject matter, the symbol mask can be generated to fit many images. This means that the symbol mask can be superimposed on a large group of images with different color values in order to generate a valid machine-readable image for each image. In order to ensure a high readability of the machine-readable image formed by the symbol mask which can be used to be superimposed on many images, and not necessarily on a certain image, the color and alpha values assigned in the symbol mask should be harsh. By way of example, the values assigned in the symbol mask should force a low transparency value, since the machine-readable image formed by superimposing the symbol mask with any image, or at least many images, should be readable. However, when taking into consideration visual properties and values of the image, these transparency values can be adjusted wisely in a similar method presented in the fusing process mentioned above.

According to certain embodiments of the disclosed subject matter, the symbol mask can be located, overlaid, merged, stitched or superimposed over physical media (such as printed media on physical products) and digital media. Such digital media may include: an image, an animation, a video, a website and a document.

The entire process, as described in FIG. 3A, may be executed on a processor 240 of computer 200 as shown in FIG. 2, or by several processors. The final result, the machine-readable image or the symbol mask, may be stored in the memory 230 in block 340, and the process may be terminated. Other temporary structures and variables, such as the channel matrices, can be stored in the memory 230. The final results, or any intermediate results, can be shown on a display 218.

According to further examples of certain embodiments of the presently disclosed subject matter, any of the following may be stored on the database 260 in block 350: the input data 304, the obtained input graphic 308, the input graphic position 310 and any derivatives of these, including the image descriptor calculated in block 345.

Figure 3B:
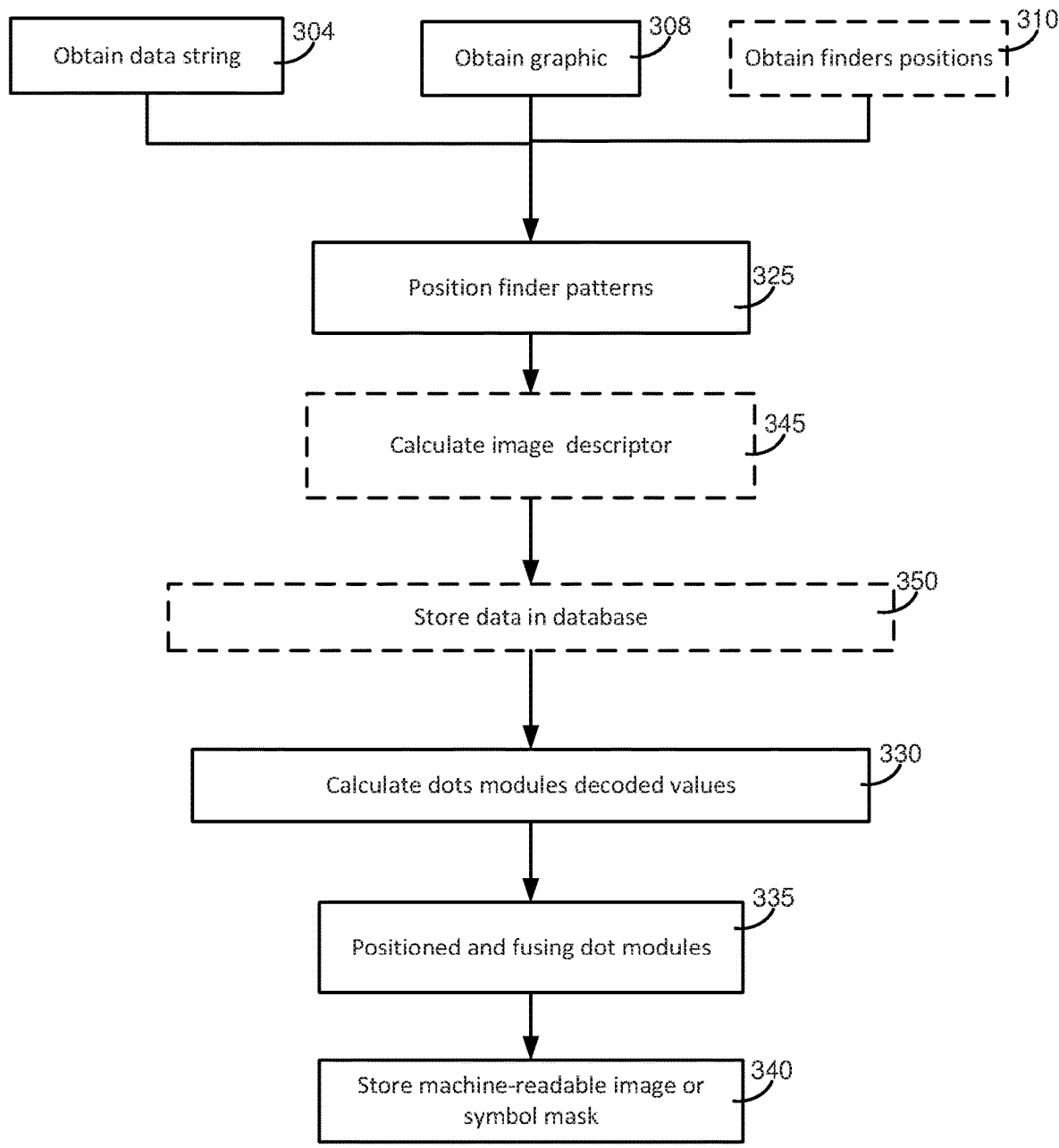
FIG. 3B shows another possible flow chart for generating a machine-readable image, in accordance with one embodiment of this aspect of the disclosed subject matter.

Reference is now made to FIG. 3B, which shows another possible flow chart for generating a machine-readable image, in accordance with certain embodiments of this aspect of the disclosed subject matter. The process is mostly similar to the process described above for the flow chart presented in FIG. 3A. However, in block 310 the finder pattern positions are obtained. In this case, by way of example, the image containing the input graphic can serve as the canvas upon which the machine-readable image is created on, and the obtained finder pattern positions relate to the position to superimpose the finder patterns on the canvas. Another difference lies in that data may be stored in database 260 in block 350 before the final machine-readable image is generated.

According to certain embodiments of the disclosed subject matter, the machine-readable image may combine a matrix code (as an example of a two-dimensional code) or part thereof as part of the machine-readable image or symbol such that both the matrix code and the machine-readable image can each be detected and decoded by an apt reader. By way of example, this is possible in embodiments where the matrix code and the machine-readable image symbol have common or mutual patterns which are the same or at least similar and/or dot modules which are the same or at least similar, while patterns and dot modules that are not common do not interfere in the actual reading of both. In the latter case, for example, patterns, dot modules and other parts of the machine-readable image may not interfere in the actual reading of the matrix code if they do not cover parts of the matrix code that are used in the detection or decoding process of the matrix code. In another example, patterns, dot modules and other parts of the machine-readable image may not interfere in the actual reading of the matrix code if they do not cover parts of the matrix code that are essential in the detection or decoding process of the matrix code such that an error rate of reading the matrix code is not increased. And yet in another example, patterns, dot modules and other parts of the machine-readable image may not interfere in the actual reading of the matrix code if they do cover parts or merge with parts of the matrix code that are essential in the detection or decoding process of the matrix code, but a matrix code reader can still read those parts correctly. And still yet in another example, patterns, dot modules and other parts of the machine-readable image may not interfere in the actual reading of the matrix code if they do cover parts or merge with parts of the matrix code that are essential in the detection or decoding process of the matrix code, but a matrix code reader can still detect and decode the matrix code utilizing the error correction mechanism included in the matrix code.

According to further examples of certain embodiments of the presently disclosed subject matter, the readability or eligibility of the matrix code is determined according to the ability, possibly the de-facto ability, of a certain decoding device or devices to decode a given matrix code representation that is generated based on a given matrix code specification and the tolerances and/or deviations that are supported or corrected by the decoding device or devices.

Reference is now made to FIG. 6K, which shows such an example of a QR Code combined with a machine-readable image symbol in accordance with an embodiment of the disclosed subject matter. According to an example of a certain embodiment of the presently disclosed subject matter, the finder patterns 604 and 606 are mutual to both the QR Code and the machine-readable image symbol. According to another example of a certain embodiment of the presently disclosed subject matter, a plurality of dot modules (seen as black and white dot modules in FIG. 6K) is mutual to both the QR Code and the machine-readable image symbol. By way of example, for the machine-readable image, a plurality of such dot modules can represent the input graphic, and a plurality can serve as dot modules with respective decode values. According to another example of the presently disclosed subject matter, for the QR Code, a plurality of dot modules which serve as a timing pattern (in accordance with the QR Code specification) can serve as dot modules of the machine-readable image while maintaining the matrix code readable by an apt reader. This is possible since the timing pattern is de-facto not essential for decoding the matrix code. Such an example is presented in cell 640 which serves as part of the timing pattern of the matrix code and as a dot module in an encoding region of the machine-readable image. Although the cell dominant color is light, and, according to a QR Code specification, this cell which is part of a timing pattern should mostly be dark, the matrix code can still be read by an apt reader.

According to further examples of certain embodiments of the presently disclosed subject matter, the following are examples of parts in the QR-Code (used here as an example of a readable matrix code) that can be changed to have different decode values or frequencies while maintaining the de-facto ability for an apt reader to detect and decode the QR-Code: a plurality of remainder bits, a plurality of remainder code-words, timing patterns, parts of the quiet-zone and a plurality of dot modules representing format information.

According to further examples of certain embodiments of the presently disclosed subject matter, the QR-Code specification (used here as an example of a matrix code specification) defines the color values of cells as dark and light. By way of example, a QR-Code reader, that is a matrix code reader that is configured to scan and decode matrix codes that are compatible with the QR-Code specification, can convert an image which includes dark and light colors which represent a matrix code, to a set of dark and light pixels using a global threshold, and thus the colored image provides a readable matrix code. By way of example, the global threshold that is implemented by the QR-Code reader can be determined by taking a reflectance value midway between the maximum reflectance and minimum reflectance in the image. This means that an image which represents a readable matrix code, according to examples of the presently disclosed subject matter, can have a wide range of color choices for areas which represent matrix code cells for which the matrix code specification suggests a light or a dark value. According to examples of certain embodiments of the presently disclosed subject matter, the above mentioned can be exploited such that dot modules, which should be dark in accordance the QR-Code, can be colored with dark shades so as to represent additional information for the machine-readable image which is combined with the matrix code.

In this sense, according to examples of certain embodiments of the presently disclosed subject matter, a matrix code can be considered to be a readable matrix code, even when the colors that are used in the matrix code, or in the image which represents the matrix code, are not explicitly compatible with the corresponding readable matrix code specification, but are such that when read and processed by the reader/decoder, the resulting color values are compatible with the readable matrix code specification. In such cases, the colors that are used in the matrix code, or in the image which represents the matrix code, can be based on the readable matrix code specification, but additional processing can be applied to take advantage, inter-alia, of the tolerances, characteristics, configurations and/or capabilities of the decoders, scanners or imagers, while meeting, de-facto the requirements of the readable matrix code specification following imaging, scanning, processing, etc.

In another example, the QR-Code specification suggests that a reader apparatus reads and defines the colors of certain cells or areas of a QR-Code representation by sampling a small group of pixels around the center of each cell and comparing the sampled values to the global threshold. This means that in certain cells it is not necessary that all pixels meet the conditions that are suggested or required by the matrix code specification with respect to the global threshold, and the colors of the matrix code representation can be varied, such that through the imaging or processing of the captured image, the resulting colors of the cells are compatible with the QR-Code specification, rendering the matrix code representation being considered according to examples of the presently disclosed subject matter, to be a readable matrix code, or in this particular example, a readable QR-Code. According to examples of certain embodiments of the presently disclosed subject matter, the abovementioned can be exploited such that pixels that do not meet the conditions that are suggested or required by the matrix code specification, can be colored with colors and shades which represent additional information for the machine-readable image which is combined with the matrix code.

In yet another example, the QR-Code specification includes a tolerance with respect to the width of a certain function, such as the finder pattern, and certain cells. Therefore, for example, when a reader apparatus reads and localizes the finder patterns, it can be configured to search for a range of frequency patterns. Thus, readable matrix code specifications which support this feature can allow some freedom with regard to the width and height of the function pattern, within the tolerance, and a matrix code which includes functions areas, which represent function patterns, whose width and height are within the allowed range can be regarded as a readable matrix code and compatible with the corresponding readable matrix code specification. According to examples of certain embodiments of the presently disclosed subject matter, the abovementioned can be exploited to represent additional information for the machine-readable image which is combined with the matrix code. For example, for a certain main frequency, four slightly different frequencies can be defined to encode four different states of the machine-readable image. Such states can indicate information related to the version or error correction level of the machine-readable image.

Figure 12:
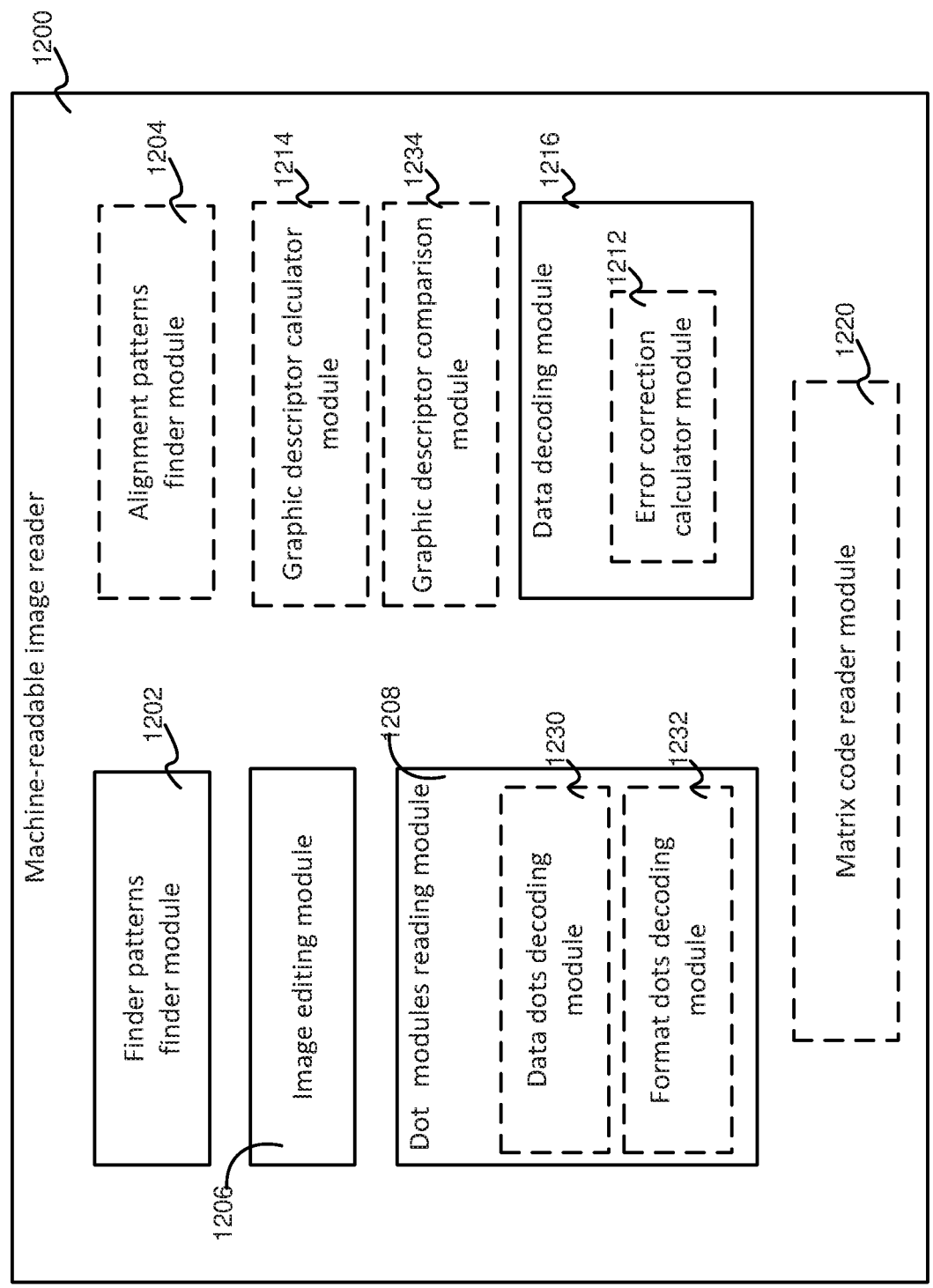
FIG. 12 shows a block diagram illustration of a reader for reading a machine-readable image, according to examples of the presently disclosed subject matter.

Reference is now made to FIG. 12, which is a block diagram illustration of a reader for reading a machine-readable image, according to examples of the presently disclosed subject matter. According to examples of certain embodiments of the presently disclosed subject matter, a reader 1200 for reading a machine-readable image can include: a finder patterns finder module 1202, a dot modules reading module 1208, an image editing module 1206 and a data decoding module 1216.

In examples of certain embodiments of the presently disclosed subject matter, a reader 1200 for reading a machine-readable image can also include some or all of the following modules: an alignment patterns finder module 1204, a matrix code reader module 1220, a graphic descriptor calculator module 1214, and a graphic descriptor comparison module 1234.

In examples of certain embodiments of the presently disclosed subject matter, the data decoding module 1216 can include an error correction calculator module 1212. In some cases the matrix code reader module 1220 can include a sub-module such as a matrix code specification module which can be used to read or decode the matrix code that in some cases serves as an input graphic in the machine-readable image.

In examples of certain embodiments of the presently disclosed subject matter, dot modules reading module 1208 can include a data dots decoding module 1230 and format dots decoding module 1232.

An example of the process of the reader 1200 shown in FIG. 12 reading a machine-readable image shall be discussed in further detail below. Before continuing with the description of the reader 1200 for reading a machine-readable image, there is now provided a description of possible implementations of the reader 1200 for reading a machine-readable image on computer hardware.

According to examples of certain embodiments of the presently disclosed subject matter, the reader 1200 of FIG. 12 for reading a machine-readable image can be implemented on a general purpose computer or on a special purpose computer. In another example of the presently disclosed subject matter, the components of the reader 1200 of FIG. 12 for reading a machine-readable image can constitute a general purpose computer combined with dedicated components of a reader 1200 for reading a machine-readable image to form a special purpose computer. For example, the components of the reader 1200 for reading a machine-readable image can be realized by running a computer readable software code on general purpose computer hardware, including but not limited to a smartphone.

Those versed in the art will readily appreciate that the teachings of the presently disclosed subject matter are not bound by the system illustrated in FIG. 12, equivalent and/or modified functionality can be consolidated or divided in another manner and can be implemented in any appropriate combination of software, firmware and hardware.

Reference is now made to FIG. 13, which is a block diagram illustration of computer 1300, or a system of computers, which may be used to read a machine-readable image, according to examples of certain embodiments of the presently disclosed subject matter. According to examples of certain embodiments of the presently disclosed subject matter, the computer 1300 can include a communication interface 1310, such as a modem or WiFi, an input device 1320, such as an I/O interface, a memory 1330, such as RAM memory, a display 1318 such as a smartphone display, a database 1360, such as a database server equipped with database software, a processor 1340, such as a smartphone's CPU and an image acquisition device 1322 such as a smartphone's camera.

According to examples of certain embodiments of the presently disclosed subject matter, the computer 1300 can acquire an acquired image 1390, e.g., through the cloud using the communication interface 1310 or through an image acquisition device 1322. The computer 1300 can process it, using reader 1200, to provide the decoded data associated with the image 1390, possibly in the form of a string, or in any other suitable form. The machine-readable image 1390 can be communicated to a destination, or the machine-readable image 1390 can be stored locally in the computer 1300, e.g. in memory 1330. Electronic data can be decoded from the machine-readable image 1390, e.g. as a data string. The electronic data can be used by the device when performing a certain associated action, such as, by way of example, presenting to a person information in case the electronic data contains such information, opening a URL in a web browser in case the electronic data contains a URL, or presenting text on the display 1318 in case the electronic data contains text data. In another example, the electronic data can represent a pointer pointing to at least one additional electronic data stored in database 1360. As mentioned above, the computer 1300 can implement the components of the reader 1200 shown in FIG. 12.

It is appreciated that the computer shown in FIG. 13 and described here with reference to FIG. 13, and/or the reader shown in FIG. 12 and described here with reference to FIG. 12 can be a distributed device or system, which includes several components which reside on different devices and are controlled by a control layer as a virtual entity to perform the operations described herein.

FIG. 14, FIG. 17, FIG. 18A and FIG. 18B show flowchart illustrations of methods of reading a machine-readable image, according to examples of certain embodiments of the presently disclosed subject matter. FIG. 15, FIG. 16 and other Figures referenced below such as FIG. 7D1-2, show additional various aspects relating to possible methods for reading a machine-readable image, according to examples of certain embodiments of the presently disclosed subject matter. This shall be discussed in further detail below. It should be appreciated that many aspects relating to reading a machine-readable image were already described above with respect to generating the machine-readable image and the below may contain additional description.

According to examples of certain embodiments of the presently disclosed subject matter, the method of reading a machine-readable image shown in FIG. 14, FIG. 17, FIG. 18A and FIG. 18B, and described herein with reference thereto, can be implemented on the reader shown in FIG. 12 and described above with reference to FIG. 12, or on a general purpose computer, such as is shown in FIG. 13 and described above with reference to FIG. 13. However, it is be appreciated that the method of reading a machine-readable image can be implemented on any other suitable hardware, and/or possibly on suitable hardware in combination with software which provides a special purpose computer that is configured to perform the operations set forth in FIG. 14, FIG. 17, FIG. 18A and FIG. 18B and described below. It is appreciated that the above is true also for other methods of reading a machine-readable image that are described.

Figure 14:
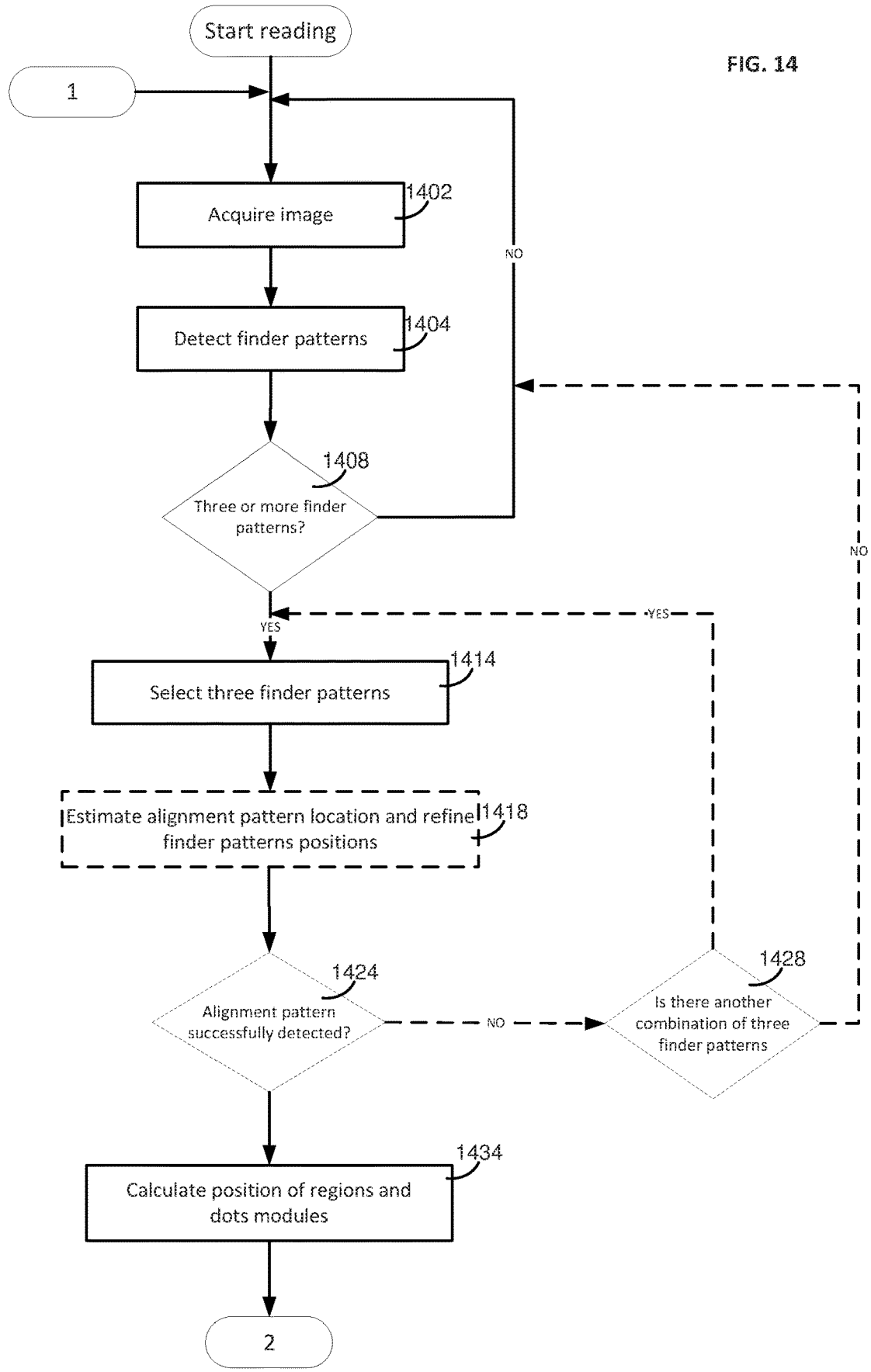
Figure 15:
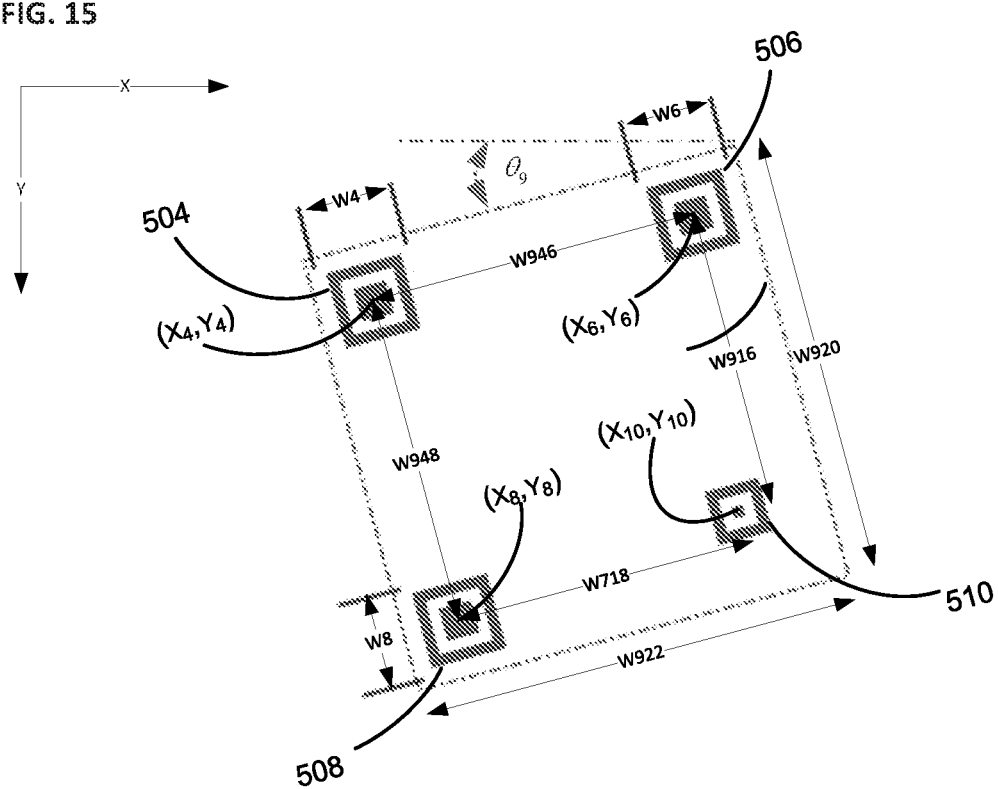
FIG. 15 shows an exemplified partial structure of the machine-readable image, according to examples of the presently disclosed subject matter.

According to examples of certain embodiments of the presently disclosed subject matter illustrated in FIG. 14, an image that includes a machine-readable image can be obtained in block 1402 via the communication interface 1310 from a remote computer through the Internet. In another example, the image can be obtained from the image acquisition device, such as, but not limited to, a smartphone's camera. Further by way of example, the image can be obtained from the memory 1330.

It is appreciated that the process of reading a machine-readable image, according to certain embodiments of the presently disclosed subject matter, can include further inputs, such as, but not limited to, tolerances and other characteristics and/or parameters which are associated with a decoder or decoders of the machine-readable image or matrix code.

Continuing with the description of FIG. 14, finder patterns are detected in block 1404. By way of example, this process may be conducted by the finder patterns finder module 1202 and may use the image editing module 1206. By way of example, the canvas can be represented by an image. According to certain embodiments of the presently disclosed subject matter, the width and heights of the canvas that the machine-readable image resides on can be bigger, smaller or identical to the measures of the input graphic.

According to certain embodiments of the presently disclosed subject matter, the characteristic of the frequency component ratio is known and the finder pattern can be easily detected by executing only one scanning operation in a predetermined direction. In other words, it is not necessary to repeatedly execute the scanning operation by changing the angle of the straight scanning line until the pattern is detected. Accordingly, the central position of the finder pattern can be found.

FIG. 7D1 shows an illustration of a scanning line result 722, possibly conducted with the computer 1300 scanning over the finder pattern presented in FIG. 7D. FIG. 7D2 shows an illustration of a thresholding process result 724, possibly conducted by the finder patterns finder module 1202 or the image editing module 1206 over the scanning line result 722. According to examples of certain embodiments of the presently disclosed subject matter, the thresholding process result 724 can be achieved using a threshold with a value of 0.5. According to examples of certain embodiments of the presently disclosed subject matter, the finder patterns finder module 1202 can deduce that an approximated frequency ratio of 1-white:1-black:1-white:3-black:1-white:1-black:1-white was found, hence a finder pattern was found.

According to examples of certain embodiments of the presently disclosed subject matter, the finder patterns finder 1202 can continue searching for more finder patterns in the acquired image even if one has already been found. According to examples of certain embodiments of the presently disclosed subject matter, finder patterns can be searched for in the entire acquired image or in part of it.

Continuing with the description of FIG. 14, a check whether three or more finder patterns were detected in block 1404 is conducted in block 1408. If less than three finder patterns were found, the process may return to the starting point. In case three or more finder patterns were found, the process may continue to block 1414. It is appreciated that in certain embodiments more than three finder patterns are required, and, accordingly, the check conducted in block 1408 can be adjusted.

Then, three finder patterns can be selected from the overall finder patterns found in block 1404. According to examples of certain embodiments of the presently disclosed subject matter, the selection can be done randomly. According to examples of certain embodiments of the presently disclosed subject matter, the selection can be done according to a probability criterion. Such a probability criterion can be, for example, that the three selected finder patterns are part of one valid symbol with high probability to be correctly decoded. By way of example, if the locations of the three selected finder patterns are positioned on one line, then the probability is low (in accordance with the example structure suggested in FIG. 5). According to examples of certain embodiments of the presently disclosed subject matter, three selected finder patterns can be selected according to their color values. For example, a certain finder pattern can be colored in a certain way in order to be distinguished. This will be further discussed below.

Then, according to certain embodiments of the disclosed subject matter, where an alignment pattern is used, an estimation of the location of the alignment pattern can be calculated in block 1418 by the alignment patterns finder module 1204 and finder pattern positions can be refined accordingly.

According to examples of certain embodiments of the presently disclosed subject matter, the machine-readable image region positions, including pattern positions such as the alignment pattern, can be determined according to the positions of the finder patterns and their properties. For example, such property could be their width.

Reference is now made to FIG. 15, which shows a possible partial structure of the machine-readable image, which includes three finder patterns 504, 506 and 508, and the alignment pattern 510, according to examples of certain embodiments of the presently disclosed subject matter. FIG. 15 additionally illustrates coordinates and measures of some of the patterns. By a way of example, the position of the alignment pattern can be calculated using the following equations:

$$M = (W_4 + W_6 + W_8)/(3 \cdot 9) \quad (1)$$

$$\theta_9 = \tan^{-1}\left(\frac{Y_6 - Y_8}{X_6 - X_8}\right) \quad (2)$$

$$X_{10} = X_8 + (X_6 - X_4) - 3 \cdot \sqrt{2} \cdot M \cdot \sin(\theta_9) \quad (3)$$

$$Y_{10} = Y_8 + (Y_6 - Y_4) - 3 \cdot \sqrt{2} \cdot M \cdot \cos(\theta_9) \quad (4)$$

For example, equation (1) may be used to compute a cell width M.

According to examples of certain embodiments of the presently disclosed subject matter, after estimating the position of a certain pattern or module, a position refinement process can be executed to refine the position of the pattern or module. By way of example, for refining the position of the alignment pattern, a scan of the outline of the white square in the alignment pattern 510 can be performed in order to find the center of it.

It is appreciated that other symbol structures are possible, according to examples of certain embodiments of the disclosed subject matter. And accordingly, equations with different results comparing to the equations (1-4) mentioned above may be used.

Figure 16A:
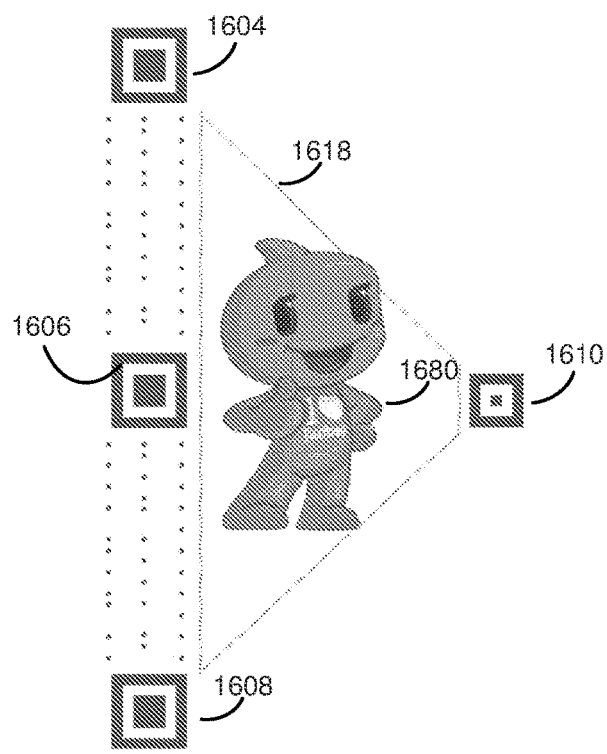
FIGS. 16A-C show three illustrations of presenting a different symbol structure according to examples of the presently disclosed subject matter.
Figure 16B:
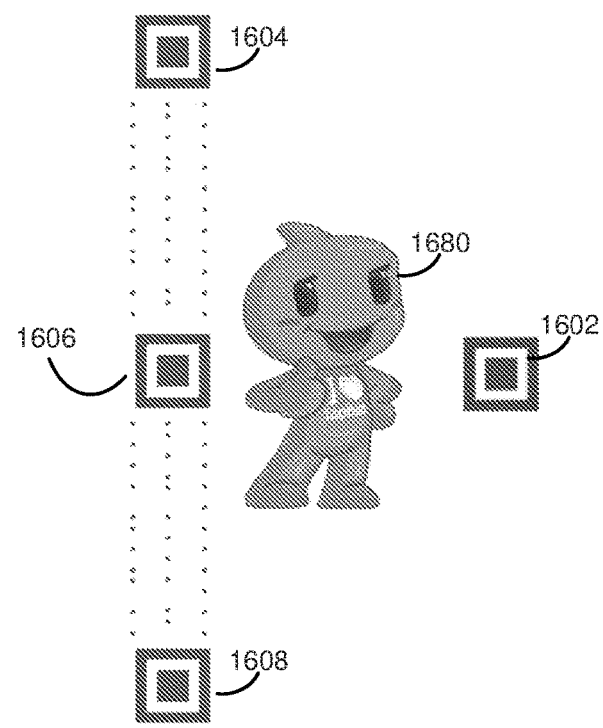
Figure 16C:
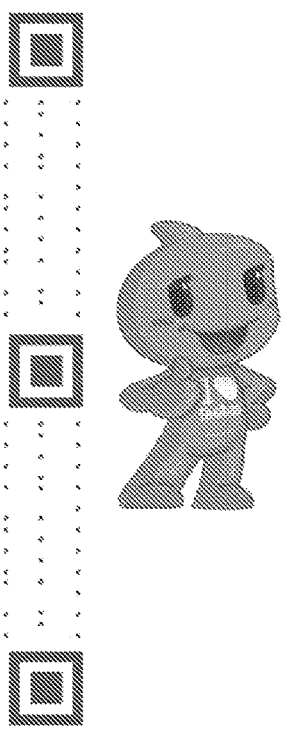

Reference is now made to FIG. 16A-C which shows three illustrations of embodiments according to the disclosed subject matter presenting a different symbol structure from that presented in FIG. 5. FIG. 16A illustrates an embodiment where the three finder patterns 1604, 1606 and 1608 are aligned on one line. A cell width M can be computed using equation (1), where $W_4$, $W_6$ and $W_8$ are the width of the finder patterns 1604, 1606 and 1608 respectively. According to examples of certain embodiments of the presently disclosed subject matter, the alignment pattern 1610 can be used to determine the chosen area, from which the image descriptor is calculated as marked by the dotted line 1618. It is appreciated that a different type of pattern, such as the finder pattern 1602 presented in FIG. 16B, can be used in order to determine the encoding region from which the image descriptor may be calculated. By way of example, in case this additional pattern has a frequency similar to other patterns used in the process of reading the symbol, it can be distinguished using an additional property such as the colors or shades of which it is composed. According to certain embodiments of the disclosed subject matter, in case such an additional pattern is not found, then an image descriptor may not be computed and may not take part in the process of reading the machine-readable image. Such an example is presented in FIG. 16C.

Continuing with the description of FIG. 14, according to certain embodiments of the disclosed subject matter, a check whether the alignment pattern was successfully detected is conducted in block 1424. If the alignment pattern is successfully detected, the process may continue to block 1434 in order to calculate the position of required regions. In case the alignment pattern was not successfully detected, the process may continue to block 1428 in order to check whether there is another combination of three finder patterns found in block 1404. If no other combination exists, then the process may return to the starting point. In case another combination exists, the process may return to block 1414.

Continuing with the description of FIG. 14, a calculation of regions' positions as well as dot module positions of the candidate machine-readable image or symbol is conducted in block 1434.

According to examples of certain embodiments of the presently disclosed subject matter, the machine-readable image regions' positions can be determined or recalculated after first aligning the machine-readable image or part of it (for example, all parts or regions illustrated in FIG. 5 excluding 590). By a way of example, the rotation can be calculated according to Eq. 2 mentioned above. By a way of another example, a homography transformation (e.g. using transformation 3×3 matrix) can be estimated according to the position of the three finder patterns and the alignment pattern with respect to their expected position in a aligned machine-readable image as presented in FIG. 5. The homography transformation matrix can then be used to align the machine-readable image. A homography transformation matrix can overcome a projective transformation. A projective transformation is useful in reading machine-readable images or matrix codes since a user is not expected to hold a device equipped with a camera exactly in front of a machine-readable image or matrix code.

According to further examples of certain embodiments of the presently disclosed subject matter, dot module positions can be calculated in block 1434. In certain embodiments of the disclosed subject matter, the encoding regions may be defined according to the format information encoded in the symbol. The decoded value of the format dot modules can be read by the dot modules reading module 1208, and further format information can be decoded using the format dots decoding module 1232. During the process of decoding the format information, other essential information for the decoding process can be extracted, for example, the version of the symbol and the error correction level and/or error correction method used in the process of generating the symbol.

Reference is now made to FIG. 17, which shows a flowchart illustration of a method of reading a machine-readable image continuing the possible methods illustrated in FIG. 14, according to examples of the presently disclosed subject matter.

According to examples of certain embodiments of the presently disclosed subject matter, dot module decoded values can be read in block 1704 in accordance with positions calculated in block 1434, by the dot modules reading module 1208, data dots decoding module 1230 and/or format dots decoding module 1232.

Then, according to examples of certain embodiments of the presently disclosed subject matter, a bit-stream containing the information of the dot modules decoded value is calculated in block 1710 by the data dots decoding module 1230. It should be appreciated that other data structures rather than bit-stream can be used.

Then, according to certain embodiments of the disclosed subject matter, where an image descriptor is used in the process of generating the candidate machine-readable image or symbol, a calculation of the image descriptor can be calculated in block 1714 by the graphic descriptor calculator module 1214.

Reference is now made to FIG. 18A, which shows a flowchart illustration of a method of reading a machine-readable image continuing the possible methods illustrated in FIG. 17, according to examples of certain embodiments of the presently disclosed subject matter.

According to examples of certain embodiments of the presently disclosed subject matter, electronic data encoded in the machine-readable image or symbol can be decoded in block 1804 in accordance with the bit-stream calculated in block 1710 and possibly also in accordance with the image descriptor calculated in block 1714, by the data decoding module 1216 and error correction calculator module 1212. It is appreciated that as part of the decoding process the bit-stream and image descriptor can be converted to another data structure such as code-words, according to examples of certain embodiments of the presently disclosed subject matter.

According to examples of certain embodiments of the presently disclosed subject matter, even if the dot module decoded values read in the process of reading the candidate machine-readable image or symbol are not equal to the dot module decoded values assigned to the dot modules in the process of generating the symbol, it is possible that the error correction method is able to correct the electronic data as if no error occurred in the process of reading the decoded values. According to examples of certain embodiments of the presently disclosed subject matter, even if the image descriptor read in the process of reading the candidate symbol is not equal to the image descriptor calculated in the process of generating the symbol, it is possible that the error correction method is able to correct the electronic data as if no error occurred in the process of reading the decoded values. By way of example, the bit-stream obtained from the error correction dot modules can be used to correct reading errors of the obtained image descriptor.

Continuing with the description of FIG. 18A, a check whether the electronic data was obtained correctly is conducted in block 1810. If the electronic data was not obtained correctly, then the process may return to the starting point. In case the electronic data was obtained correctly, the electronic data can be used by the reader in various ways, including those mentioned herein.

According to certain embodiments of the disclosed subject matter, the electronic data can be used to extract a pointer from the database 1360 in block 1814.

Figure 18B:
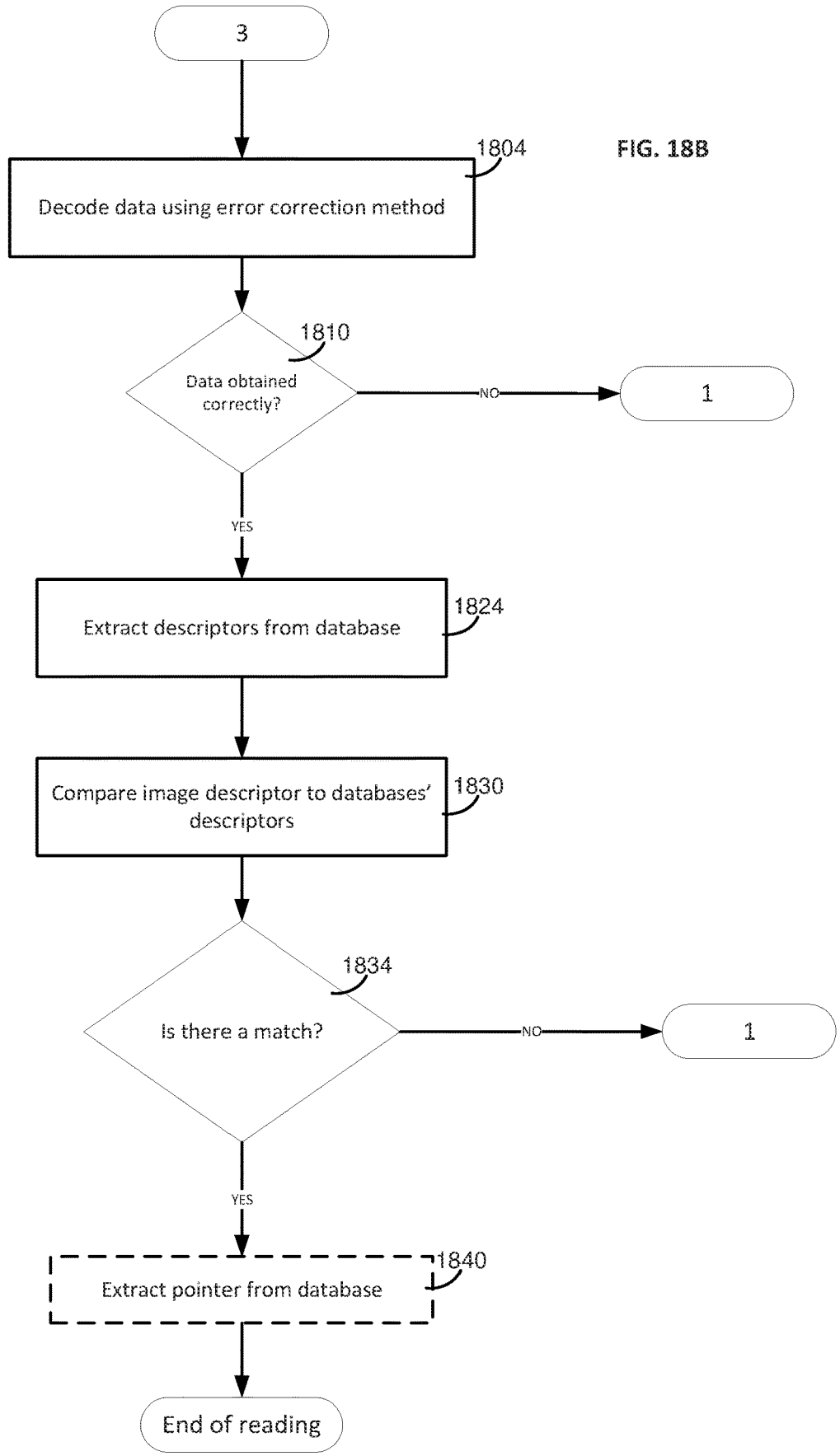

Reference is now made to FIG. 18B, which shows a flowchart illustration of another method of reading a machine-readable image continuing the possible methods illustrated in FIG. 17, according to examples of certain embodiments of the presently disclosed subject matter.

Following the description of blocks 1804 and 1810, wherein the electronic data can be decoded using the error correction mechanism, and can further be checked if the data is obtained correctly, as aforementioned in FIG. 18A, the process may continue to block 1824 in case the electronic data is obtained correctly.

According to examples of certain embodiments of the presently disclosed subject matter, zero, one or more than one of stored descriptors can be extracted from the database 1360 in accordance with the calculated electronic data. By way of example, the corresponding descriptor that corresponds to the image descriptor calculated in block 1714 may have been stored in the database in the generation process of the candidate scanned symbol.

Then, according to examples of certain embodiments of the presently disclosed subject matter, a check whether there is a match between the image descriptor calculated in block 1714 to one of the stored descriptors is conducted in block 1834 by the graphic descriptor comparison module 1214. According to examples of certain embodiments of the presently disclosed subject matter, a comparison between two descriptors in block 1830 can be conducted using a predefined matching criterion. For example, such a criterion can be that two descriptors are the same. In another example, a criterion can be that the distance between the two descriptors is smaller than a predefined or adaptable threshold. It is appreciated that various appropriate distance functions can be used. For example, if the descriptors are defined in the hamming space then the hamming distance function can be used. If there is no match between the image descriptor and any of descriptors from the stored descriptors, then the process may return to the starting point. In case there is a match, the electronic data can be used by the reader in various ways, including those mentioned herein.

According to certain embodiments of the disclosed subject matter, a pointer can be extracted from the database 1360 in block 1840 in accordance with the electronic data verified in block 1810. According to examples of certain embodiments of the presently disclosed subject matter, a different pointer can be selected according to the electronic data and/or the matched image descriptor in block 1834.

According to certain embodiments of the disclosed subject matter, a matrix code, such as the QR Code, which is combined in the machine-readable image symbol, can be read together with the machine-readable image using the matric code reader module 1220. Optionally, two pointers can be extracted separately for the matrix code and the machine-readable image.

It is to be noted that the method and system of reading the machine-readable image described herein with respect to FIGS. 14-18B are illustrated for exemplified purposes only and should not be construed as limiting the present disclosure in any way. Various reading processes of the machine-readable image and corresponding systems thereof can be constructed to read respectively any machine-readable images as described above or appropriate combinations thereof, and correspond to the respective generation processes of the machine-readable images.

According to certain embodiments of the disclosed subject matter, a hologram can be used in the process of generating, printing or assembling a machine-readable image. According to examples of certain embodiments of the disclosed subject matter, the hologram can serve as the input graphic used in the process of generating the symbol. For example, the obtained input graphic that will be used in the process of generating the symbol may be a simplified 2D version of the hologram in accordance with one view of the hologram. The hologram itself can be used in the printing or assembling process. By way of example, there is provided a printed medium having a machine-readable image printed thereon where the printed medium can be a hologram. By way of another example, the hologram can be a part of the printed medium and can be attached to or assembled on the printed medium, e.g., it can serve as the input graphic or a chosen area thereof.

Reference is now made to FIG. 19, which shows illustrations of two viewpoints of a machine-readable image which includes a hologram, according to examples of certain embodiments of the presently disclosed subject matter. By way of example, the hologram may present different graphics or appearances when looking at it from different viewpoints. For example, illustration 1905 illustrates the machine-readable image embedding the hologram from one viewpoint from which certain parts of the symbol are revealed, while illustration 1910 illustrates the machine-readable image, which includes the same hologram, from a different viewpoint from which different parts of the symbol are revealed. According to examples of certain embodiments of the presently disclosed subject matter, the input graphic used in the process of generating the symbol may be one of the graphics or appearances (e.g., a first appearance) that can be obtained from one of the viewpoints of the hologram. Accordingly, the appearances other than the first appearance do not enable a reader to decode the encoded data while performing a reading process of the machine-readable image. By way of example, this first appearance can be a graphic obtained from the hologram when taking a viewpoint which is slightly different from the perpendicular viewpoint. Then, a simple photo-copy of the final printed or assembled machine-readable image or symbol (that contains the 3D-like hologram) may produce a copy of the symbol which may not be machine-readable since the graphic presented in the copy of the symbol is too different from the one that was used in the process of generating the symbol.

According to certain embodiments of the disclosed subject matter, the encoded data can be used in order to check whether a certain product, on which the symbol was printed, or assembled, or embedded, is likely to be genuine or likely to be fake. According to examples of certain embodiments of the presently disclosed subject matter, the encoded data can be used in order to access an anti-counterfeit system including a database. The anti-counterfeit system can return an answer with an estimation with regard to whether the symbol is fake or is genuine.

Reference is now made to FIG. 20, which shows illustrations of two viewpoints of a machine-readable image which includes a hologram, according to examples of certain embodiments of the presently disclosed subject matter. By way of example, the hologram may present different graphics when viewed from different viewpoints. For example, illustration 2005 illustrates the machine-readable image embedding the hologram from one viewpoint from which certain parts of the symbol are revealed, while illustration 2010 illustrates the machine-readable image, which includes the same hologram, from a different viewpoint, from which different parts of the symbol are revealed. According to examples of certain embodiments of the presently disclosed subject matter, one of the viewpoints of the hologram includes the input graphic and a function pattern, as illustrated in 2005 such that the image is machine-readable.

According to certain embodiments, there is provided a printed medium or printed substrate having a machine-readable image printed thereon, the machine-readable images generated as described above with respect to various embodiments of the presently disclosed subject matter. By way of example, such a printed medium or substrate can be a tangible medium including one or more of the following: coupon, paper, cardboard, fabric, plastic, label, package, sticker, metal or the like. The machine-readable image may be deposited or embedded onto such printed medium, for example by printing, engraving, burning, cutting, spraying, vaporizing or other appropriate ways, such that the deposited machine-readable image can be detected and read by a reader/scanner, and provide relevant information to the user.

According to certain embodiments, there is provided a non-transitory computer readable storage medium tangibly embodying a machine-readable image, the machine-readable images generated as described above with respect to various embodiments of the presently disclosed subject matter.

The computer readable storage medium referred herein can be a tangible device that can retain and store information such as a digital format of a machine-readable image. The computer readable storage medium may be, for example, but is not limited to, an electronic storage device, a magnetic storage device, an optical storage device, an electromagnetic storage device, a semiconductor storage device, or any suitable combination of the aforementioned. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the aforementioned. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

It will also be understood that the system according to the presently disclosed subject matter can be implemented, at least partly, as a suitably programmed computer. Likewise, the presently disclosed subject matter contemplates a computer program being readable by a computer for executing the disclosed method. The presently disclosed subject matter further contemplates a machine-readable memory tangibly embodying a program of instructions executable by the machine for executing the disclosed method.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It will be appreciated that the embodiments described above are cited by way of example, and various features thereof and combinations of these features can be varied and modified.

While various embodiments have been shown and described, it will be understood that there is no intent to limit the invention by such disclosure, but rather, it is intended to cover all modifications and alternate constructions falling within the scope of the invention, as defined in the appended claims.

The invention claimed is:

1. A non-transitory computer readable storage medium tangibly embodying a machine-readable image having data encoded therein and embedded with a graphic, the machine-readable image configured to be detected by a reader for decoding said encoded data, the machine-readable image including:
the graphic, selected from a group comprising: a photo, a logo, an icon, an animation, or a hologram, the graphic being positioned within a graphic region of the machine-readable image, the graphic being associated with an image descriptor calculated based on a chosen area of the graphic, the image descriptor encoding information that is decoded by the reader in a reading process of said machine-readable image;
a plurality of function patterns positioned within a respective plurality of function pattern regions of the machine-readable image; and
a plurality of dot modules having decoded values corresponding to at least said encoded data, the dot modules being positioned in one or more encoding regions of the machine-readable image relative to the function patterns and the chosen area of the graphic;
the one or more encoding regions in which the dot modules are positioned being disjoint from the graphic region within which the graphic is positioned and disjoint from the plurality of function pattern regions within which the function patterns are positioned.

2. The storage medium according to claim 1, wherein the function patterns are indicative of characteristics of the machine-readable image including position, size and inclination.

3. The storage medium according to claim 1, wherein the machine-readable image includes a reference area for calibrating color and shade values in a reading process of the machine-readable image.

4. The storage medium according to claim 3, wherein the reference area includes at least three color and shade values that are used to estimate original color and shade values of remaining areas of the machine-readable image.

5. The storage medium according to claim 3, wherein the reference area overlaps a region of a finder pattern.

6. The storage medium according to claim 1, wherein the chosen area is indicated by version information included in format information of the dot modules.

7. The storage medium according to claim 1, wherein the chosen area is determined in accordance with relative positions of the function patterns.

8. The storage medium according to claim 7, wherein the chosen area is determined in accordance with a relative position of an alignment pattern with respect to positions of finder patterns.

9. The storage medium according to claim 1, wherein the chosen area is determined in accordance with a position indicated by coordinate information included in format information of the dot modules.

10. The storage medium according to claim 1, wherein the dot modules includes data dot modules and error correction dot modules.

11. The storage medium according to claim 10, wherein the error correction dot modules are used to correct errors occurring in a reading process of at least one of the encoded data and the image descriptor, the decoded values of said error correction dot modules being derived from the at least one of the encoded data and the image descriptor.

12. The storage medium according to claim 10, wherein the dot modules further includes format dot modules having decoded values indicating format information including: error correction level, error correction mode, version information, and image descriptor method used to calculate the image descriptor.

13. The storage medium according to claim 1, wherein the encoding regions are selected to be disjointed from the chosen area.

14. A computerized method of generating a machine-readable image encoding data, the machine-readable image embedded with a graphic, the method comprising:
positioning the graphic and a plurality of function patterns, the graphic being selected from a group comprising: a photo, a logo, an icon, an animation, or a hologram, the graphic being positioned within a graphic region of the machine-readable image, the plurality of function patterns being positioned within a respective plurality of function pattern regions of the machine-readable image;
calculating an image descriptor based on a chosen area of the graphic, the image descriptor encoding information that is decoded by the reader in a reading process of said machine-readable image;
calculating decoded values for dot modules based on at least said encoded data, and
positioning the dot modules in one or more encoding regions relative to the function patterns and the chosen area of the graphic, the one or more encoding regions in which the dot modules are positioned being disjoint from the graphic region within which the graphic is positioned and disjoint from the plurality of function pattern regions within which the function patterns are positioned.

15. The computerized method according to claim 14, wherein said positioning further includes fusing the graphic and the decoded values of the dot modules to form the machine-readable image.

16. The computerized method according to claim 14, wherein said calculating decoded values for dot modules further includes:
computing data code-words from the encoded data; and
calculating decoded values for the dot modules based on the data code-words.

17. The computerized method according to claim 16, wherein said calculating decoded values for dot modules further includes:
computing one or more error correction code-words derived from the data code-words, said error correction code-words including error correction information which is used to correct errors occurred in a reading process of the encoded data;
combining the data code-words with corresponding error correction code-words, giving rise to full code words; and
calculating decoded values for the dot modules based on the full code-words.

18. The computerized method according to claim 17, wherein said calculating decoded values for dot modules further includes:
computing format code-words; and
calculating decoded values for the dot modules based on the format code-words.

19. A computerized method of generating a machine-readable image encoding data, the machine-readable image embedded with a graphic, the method comprising:
positioning the graphic and a plurality of function patterns;
calculating an image descriptor based on a chosen area of the graphic, the image descriptor being used in a reading process of said machine-readable image;
calculating decoded values for dot modules based on at least said encoded data, and
positioning the dot modules in one or more encoding regions relative to the function patterns and the chosen area of the graphic,
wherein said calculating decoded values for dot modules further includes:
computing data code-words from the encoded data; and
calculating decoded values for the dot modules based on the data code-words,
wherein said calculating decoded values for dot modules further includes:
computing one or more error correction code-words derived from the data code-words, said error correction code-words including error correction information which is used to correct errors occurred in a reading process of the encoded data;
combining the data code-words with corresponding error correction code-words, giving rise to full code words; and
calculating decoded values for the dot modules based on the full code-words,
wherein said calculating decoded values for dot modules further includes:
computing image descriptor code-words from the image descriptor;
wherein said calculating one or more error correction code-words further includes calculating error correction code-words for the image descriptor code-words including error correction information which is used to correct errors occurred in a reading process of the image descriptor.

20. A computerized system for generating a machine-readable image encoding data, the machine-readable image embedded with a graphic, the system comprising a processing unit configured to:
position the graphic and a plurality of function patterns, the graphic being selected from a group comprising: a photo, a logo, an icon, an animation, or a hologram, the graphic being positioned within a graphic region of the machine-readable image, the plurality of function patterns being positioned within a respective plurality of function pattern regions of the machine-readable image, the graphic being associated with an image descriptor that can be calculated based on a chosen area of the graphic, the image descriptor encoding information that is decoded by the reader in a reading process of said machine-readable image;
calculate decoded values for dot modules based on at least said encoded data, and
position the dot modules in one or more encoding regions which are selected to be disjoint from the chosen area of the graphic, the one or more encoding regions in which the dot modules are positioned being disjoint from the graphic region within which the graphic is positioned and disjoint from the plurality of function pattern regions within which the function patterns are positioned.

* * * * *